(12) United States Patent
van Datta et al.

(10) Patent No.: US 10,789,611 B2
(45) Date of Patent: *Sep. 29, 2020

(54) ADVERTISING IMPRESSION DETERMINATION

(71) Applicant: SONY INTERACTIVE ENTERTAINMENT LLC, San Mateo, CA (US)

(72) Inventors: Glen van Datta, San Diego, CA (US); Gary Zalewski, Oakland, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,354

(22) Filed: Oct. 7, 2019

(65) Prior Publication Data

US 2020/0034875 A1 Jan. 30, 2020

Related U.S. Application Data

(63) Continuation of application No. 15/992,014, filed on May 29, 2018, now Pat. No. 10,467,651, which is a
(Continued)

(51) Int. Cl.
*G06Q 30/02* (2012.01)
*A63F 13/61* (2014.01)
(Continued)

(52) U.S. Cl.
CPC ......... *G06Q 30/0244* (2013.01); *A63F 13/50* (2014.09); *A63F 13/5258* (2014.09);
(Continued)

(58) Field of Classification Search
None
See application file for complete search history.

(56) References Cited

U.S. PATENT DOCUMENTS

| 4,521,021 A | 6/1985 | Dixon |
| 4,542,897 A | 9/1985 | Melton et al. |

(Continued)

FOREIGN PATENT DOCUMENTS

| AU | 9959097 | 11/1999 |
| CA | 2106122 | 3/1994 |

(Continued)

OTHER PUBLICATIONS

Andreaux. J.-P.; Copy Protection system for digital home networks; Mar. 2004; IEEE, vol. 21, Issue: 2; pp. 100-108.
(Continued)

*Primary Examiner* — Kevin Y Kim
(74) *Attorney, Agent, or Firm* — Polsinelli LLP

(57) ABSTRACT

Systems and methods for verifying an advertisement impression in a digital environment are provided. In some aspects, methods of the subject technology include operations for defining a portion of the digital environment as an impression area, wherein the impression area is associated with a tagged advertisement area, providing a stream of an advertisement to the tagged advertisement area, and updating advertising impression information stored in memory regarding the advertisement, wherein an advertising impression is based on the identification of the character within the impression area and the availability of an unobstructed line-of-sight between the character and the tagged advertisement area. In some aspects, computer readable media are also provided.

19 Claims, 16 Drawing Sheets

Related U.S. Application Data continuation of application No. 15/285,928, filed on Oct. 5, 2016, now Pat. No. 9,984,388, which is a continuation of application No. 14/336,452, filed on Jul. 21, 2014, now Pat. No. 9,466,074, which is a continuation of application No. 13/939,178, filed on Jul. 10, 2013, now Pat. No. 8,795,076, which is a continuation of application No. 11/241,229, filed on Sep. 30, 2005, now Pat. No. 8,574,074.

(51) Int. Cl.

| | |
|---|---|
| A63F 13/5258 | (2014.01) |
| H04N 7/173 | (2011.01) |
| H04N 21/44 | (2011.01) |
| H04N 21/45 | (2011.01) |
| H04N 21/472 | (2011.01) |
| H04N 21/478 | (2011.01) |
| H04N 21/482 | (2011.01) |
| H04N 21/81 | (2011.01) |
| H04N 21/845 | (2011.01) |
| H04N 21/858 | (2011.01) |
| H04N 21/258 | (2011.01) |
| H04N 21/61 | (2011.01) |
| A63F 13/50 | (2014.01) |

(52) U.S. Cl.
CPC ............ *A63F 13/61* (2014.09); *G06Q 30/02* (2013.01); *G06Q 30/0246* (2013.01); *G06Q 30/0251* (2013.01); *G06Q 30/0257* (2013.01); *G06Q 30/0261* (2013.01); *G06Q 30/0273* (2013.01); *G06Q 30/0276* (2013.01); *G06Q 30/0277* (2013.01); *H04N 7/173* (2013.01); *H04N 21/25841* (2013.01); *H04N 21/44012* (2013.01); *H04N 21/4532* (2013.01); *H04N 21/4781* (2013.01); *H04N 21/47205* (2013.01); *H04N 21/47815* (2013.01); *H04N 21/4825* (2013.01); *H04N 21/6125* (2013.01); *H04N 21/812* (2013.01); *H04N 21/8453* (2013.01); *H04N 21/8583* (2013.01); *A63F 2300/535* (2013.01); *A63F 2300/5506* (2013.01); *A63F 2300/61* (2013.01); *A63F 2300/8017* (2013.01)

(56) References Cited

U.S. PATENT DOCUMENTS

| | | |
|---|---|---|
| 4,734,690 A | 3/1988 | Waller |
| 4,807,158 A | 2/1989 | Blanton et al. |
| 4,905,168 A | 2/1990 | McCarthy et al. |
| 4,926,255 A | 5/1990 | Von Kohorn |
| 4,969,036 A | 11/1990 | Bhanu et al. |
| 5,014,234 A | 5/1991 | Edwards, Jr. |
| 5,083,271 A | 1/1992 | Thacher et al. |
| 5,105,184 A | 4/1992 | Pirani et al. |
| 5,227,874 A | 7/1993 | Von Kohorn |
| 5,231,568 A | 7/1993 | Cohen et al. |
| 5,283,731 A | 2/1994 | Lalonde et al. |
| 5,305,195 A | 4/1994 | Murphy |
| 5,305,389 A | 4/1994 | Palmer |
| 5,319,454 A | 6/1994 | Schutte |
| 5,347,632 A | 9/1994 | Filepp et al. |
| 5,373,440 A | 12/1994 | Cohen et al. |
| 5,377,997 A | 1/1995 | Wilden et al. |
| 5,446,919 A | 8/1995 | Wilkins |
| 5,462,275 A | 10/1995 | Lowe et al. |
| 5,497,479 A | 3/1996 | Hornbuckle |
| 5,512,935 A | 4/1996 | Majeti et al. |
| 5,526,041 A | 6/1996 | Glatt |
| 5,539,450 A | 7/1996 | Handelman |
| 5,548,645 A | 8/1996 | Ananda |
| 5,564,038 A | 10/1996 | Grantz et al. |
| 5,565,909 A | 10/1996 | Thibadeau et al. |
| 5,572,643 A | 11/1996 | Judson |
| 5,574,447 A | 11/1996 | Roylance |
| 5,592,212 A | 1/1997 | Handelman |
| 5,630,757 A | 5/1997 | Gagin et al. |
| 5,636,346 A | 6/1997 | Saxe |
| 5,646,992 A | 7/1997 | Subler et al. |
| 5,663,757 A | 9/1997 | Morales |
| 5,684,526 A | 11/1997 | Yoshinobu |
| 5,697,844 A | 12/1997 | Von Kohorn |
| 5,699,497 A | 12/1997 | Erdahl et al. |
| 5,707,289 A | 1/1998 | Watanabe et al. |
| 5,712,979 A | 1/1998 | Graber et al. |
| 5,721,827 A | 2/1998 | Logan et al. |
| 5,724,521 A | 3/1998 | Dedrick |
| 5,737,619 A | 4/1998 | Judson |
| 5,748,867 A | 5/1998 | Cosman et al. |
| 5,751,956 A | 5/1998 | Kirsch |
| 5,758,068 A | 5/1998 | Brandt et al. |
| 5,758,257 A | 5/1998 | Herz et al. |
| 5,762,553 A | 6/1998 | Takasugi et al. |
| 5,771,347 A | 6/1998 | Grantz et al. |
| 5,774,170 A | 6/1998 | Hite et al. |
| 5,794,210 A | 8/1998 | Goldhaber et al. |
| 5,798,519 A | 8/1998 | Vock et al. |
| 5,805,815 A | 9/1998 | Hill |
| 5,822,523 A | 10/1998 | Rothschild et al. |
| 5,848,396 A | 12/1998 | Gerace |
| 5,855,008 A | 12/1998 | Goldhaber et al. |
| 5,857,149 A | 1/1999 | Suzuki |
| 5,860,073 A | 1/1999 | Ferrel et al. |
| 5,867,208 A | 2/1999 | McLaren |
| 5,876,286 A | 3/1999 | Lee |
| 5,878,135 A | 3/1999 | Blatter et al. |
| 5,879,235 A | 3/1999 | Kaneko et al. |
| 5,883,958 A | 3/1999 | Ishiguro et al. |
| 5,903,816 A | 5/1999 | Broadwin et al. |
| 5,910,987 A | 6/1999 | Ginter et al. |
| 5,911,582 A | 6/1999 | Redford |
| 5,916,024 A | 6/1999 | Von Kohorn |
| 5,917,725 A | 6/1999 | Thacher et al. |
| 5,929,850 A | 7/1999 | Broadwin et al. |
| 5,937,037 A | 8/1999 | Kamel et al. |
| 5,946,646 A | 8/1999 | Schena et al. |
| 5,946,664 A | 8/1999 | Ebisawa |
| 5,948,061 A | 9/1999 | Merriman et al. |
| 5,964,660 A | 10/1999 | James et al. |
| 5,970,143 A | 10/1999 | Schneier et al. |
| 5,974,398 A | 10/1999 | Hanson et al. |
| 5,987,511 A | 11/1999 | Elixmann et al. |
| 5,991,735 A | 11/1999 | Gerace |
| 6,005,602 A | 12/1999 | Matthews, III |
| 6,012,984 A | 1/2000 | Roseman |
| 6,015,348 A | 1/2000 | Lambright et al. |
| 6,016,348 A | 1/2000 | Blatter et al. |
| 6,020,883 A | 2/2000 | Herz et al. |
| 6,024,643 A | 2/2000 | Begis |
| 6,026,368 A | 2/2000 | Brown et al. |
| 6,029,046 A | 2/2000 | Khan et al. |
| 6,036,601 A | 3/2000 | Heckel |
| 6,047,289 A | 4/2000 | Thorne et al. |
| 6,088,722 A | 7/2000 | Herz et al. |
| 6,089,975 A | 7/2000 | Dunn |
| 6,108,637 A | 8/2000 | Blumenau |
| 6,113,494 A | 9/2000 | Lennert |
| 6,119,098 A | 9/2000 | Guyot et al. |
| 6,149,519 A | 11/2000 | Osaki et al. |
| 6,151,631 A | 11/2000 | Ansell et al. |
| 6,165,070 A | 12/2000 | Nolte et al. |
| 6,179,713 B1 | 1/2001 | James et al. |
| 6,181,988 B1 | 1/2001 | Schneider et al. |
| 6,188,398 B1 | 2/2001 | Collins-Rector et al. |
| 6,196,920 B1 | 3/2001 | Spaur et al. |
| 6,199,082 B1 | 3/2001 | Ferrel et al. |
| 6,216,129 B1 | 4/2001 | Eldering |
| 6,236,975 B1 | 5/2001 | Boe et al. |
| 6,238,290 B1 | 5/2001 | Tarr et al. |
| 6,251,017 B1 | 6/2001 | Leason et al. |
| 6,263,360 B1 | 7/2001 | Arnold et al. |

(56) References Cited

U.S. PATENT DOCUMENTS

| | | |
|---|---|---|
| 6,264,555 B1 | 7/2001 | Glazman et al. |
| 6,264,560 B1 | 7/2001 | Goldberg et al. |
| 6,267,672 B1 | 7/2001 | Vance |
| 6,267,675 B1 | 7/2001 | Lee |
| 6,275,854 B1 | 8/2001 | Himmel et al. |
| 6,275,989 B1 | 8/2001 | Broadwin et al. |
| 6,298,348 B1 | 10/2001 | Eldering |
| 6,308,328 B1 | 10/2001 | Bowcutt et al. |
| 6,312,337 B1 | 11/2001 | Edwards et al. |
| 6,320,495 B1 | 11/2001 | Sporgis |
| 6,324,519 B1 | 11/2001 | Eldering |
| 6,343,990 B1 | 2/2002 | Rasmussen et al. |
| 6,346,045 B2 | 2/2002 | Rider et al. |
| 6,366,701 B1 | 4/2002 | Chalom et al. |
| 6,371,850 B1 | 4/2002 | Sonoda |
| 6,379,251 B1 | 4/2002 | Auxier et al. |
| 6,381,362 B1 | 4/2002 | Deshpande et al. |
| 6,385,592 B1 | 5/2002 | Angles et al. |
| 6,385,596 B1 | 5/2002 | Wiser et al. |
| 6,390,922 B1 | 5/2002 | Vange et al. |
| 6,393,574 B1 | 5/2002 | Kashiwagi et al. |
| 6,394,899 B1 | 5/2002 | Walker |
| 6,400,996 B1 | 6/2002 | Hoffberg et al. |
| 6,411,936 B1 | 6/2002 | Sanders |
| 6,434,614 B1 | 8/2002 | Blumenau |
| 6,443,843 B1 | 9/2002 | Walker et al. |
| 6,446,130 B1 | 9/2002 | Grapes |
| 6,446,261 B1 | 9/2002 | Rosser |
| 6,456,234 B1 | 9/2002 | Johnson |
| 6,457,010 B1 | 9/2002 | Eldering et al. |
| 6,460,036 B1 | 10/2002 | Herz |
| 6,468,155 B1 | 10/2002 | Zucker et al. |
| 6,470,138 B1 | 10/2002 | Um et al. |
| 6,484,148 B1 | 11/2002 | Boyd |
| 6,484,149 B1 | 11/2002 | Jammes et al. |
| 6,489,955 B1 | 12/2002 | Newhall, Jr. |
| 6,496,826 B1 | 12/2002 | Chowdhury et al. |
| 6,496,857 B1 | 12/2002 | Dustin et al. |
| 6,513,160 B2 | 1/2003 | Dureau |
| 6,516,338 B1 | 2/2003 | Landsman et al. |
| 6,529,940 B1 | 3/2003 | Humble |
| 6,530,840 B1 | 3/2003 | Cuomo et al. |
| 6,532,448 B1 | 3/2003 | Higginson et al. |
| 6,539,375 B2 | 3/2003 | Kawasaki |
| 6,539,544 B2 | 3/2003 | Ebisawa |
| 6,553,178 B2 | 4/2003 | Abecassis |
| 6,560,578 B2 | 5/2003 | Eldering |
| 6,563,523 B1 | 5/2003 | Suchocki et al. |
| 6,564,217 B2 | 5/2003 | Bunney et al. |
| 6,595,859 B2 | 7/2003 | Lynn |
| 6,606,746 B1 | 8/2003 | Zdepski et al. |
| 6,611,812 B2 | 8/2003 | Hurtado et al. |
| 6,611,813 B1 | 8/2003 | Bratton |
| 6,611,957 B2 | 8/2003 | Ebisawa |
| 6,612,932 B2 | 9/2003 | Stern |
| 6,615,039 B1 | 9/2003 | Eldering |
| 6,616,533 B1 | 9/2003 | Rashkovskiy |
| 6,625,578 B2 | 9/2003 | Spaur et al. |
| 6,632,138 B1 | 10/2003 | Serizawa et al. |
| 6,640,097 B2 | 10/2003 | Corrigan et al. |
| 6,640,335 B2 | 10/2003 | Ebisawa |
| 6,640,336 B1 | 10/2003 | Ebisawa |
| 6,645,068 B1 | 11/2003 | Kelly et al. |
| 6,654,725 B1 | 11/2003 | Langheinrich et al. |
| 6,656,050 B2 | 12/2003 | Busch et al. |
| 6,659,861 B1 | 12/2003 | Faris et al. |
| 6,663,105 B1 | 12/2003 | Sullivan et al. |
| 6,669,562 B1 | 12/2003 | Shiino |
| 6,669,564 B1 | 12/2003 | Young et al. |
| 6,680,746 B2 | 1/2004 | Kawai et al. |
| 6,683,941 B2 | 1/2004 | Brown et al. |
| 6,684,194 B1 | 1/2004 | Eldering et al. |
| 6,687,608 B2 | 2/2004 | Sugimoto et al. |
| 6,697,792 B2 | 2/2004 | Bunney et al. |
| 6,698,020 B1 | 2/2004 | Zigmond et al. |
| 6,699,127 B1 | 3/2004 | Lobb et al. |
| 6,701,363 B1 | 3/2004 | Chiu et al. |
| 6,704,930 B1 | 3/2004 | Eldering et al. |
| 6,709,335 B2 | 3/2004 | Bates et al. |
| 6,712,702 B2 | 3/2004 | Goldberg et al. |
| 6,714,236 B1 | 3/2004 | Wada et al. |
| 6,714,723 B2 | 3/2004 | Abecassis |
| 6,714,917 B1 | 3/2004 | Eldering et al. |
| 6,716,103 B1 | 4/2004 | Eck et al. |
| 6,718,551 B1 | 4/2004 | Swix et al. |
| 6,721,748 B1 | 4/2004 | Knight et al. |
| 6,731,238 B2 | 5/2004 | Johnson |
| 6,738,078 B1 | 5/2004 | Duncombe |
| 6,745,011 B1 | 6/2004 | Hendrickson et al. |
| 6,757,740 B1 | 6/2004 | Parekh et al. |
| 6,758,746 B1 | 7/2004 | Hunter et al. |
| 6,758,754 B1 | 7/2004 | Lavanchy et al. |
| 6,758,755 B2 | 7/2004 | Kelly et al. |
| 6,764,395 B1 | 7/2004 | Guyett |
| 6,764,403 B2 | 7/2004 | Gavin |
| 6,771,290 B1 | 8/2004 | Hoyle |
| 6,783,460 B2 | 8/2004 | Galyean, III et al. |
| 6,785,902 B1 | 8/2004 | Zigmond et al. |
| 6,799,327 B1 | 9/2004 | Reynolds et al. |
| 6,814,663 B2 | 11/2004 | Edwards et al. |
| 6,820,277 B1 | 11/2004 | Eldering et al. |
| 6,826,614 B1 | 11/2004 | Hanmann et al. |
| 6,827,645 B2 | 12/2004 | Morita et al. |
| 6,840,861 B2 | 1/2005 | Jordan et al. |
| 6,863,612 B2 | 3/2005 | Willis |
| 6,874,683 B2 | 4/2005 | Keronen et al. |
| 6,882,978 B2 | 4/2005 | Ebisawa |
| 6,890,256 B2 | 5/2005 | Walker et al. |
| 6,895,170 B1 | 5/2005 | Lambert et al. |
| 6,912,398 B1 | 6/2005 | Domnitz |
| 6,928,414 B1 | 8/2005 | Kim |
| 6,941,574 B1 | 9/2005 | Broadwin et al. |
| 6,942,575 B2 | 9/2005 | Mergler |
| 6,948,062 B1 | 9/2005 | Clapper |
| 6,954,728 B1 | 10/2005 | Kusumoto |
| 6,955,605 B2 | 10/2005 | Young et al. |
| 6,964,608 B1 | 11/2005 | Koza |
| 6,967,566 B2 | 11/2005 | Weston et al. |
| 6,968,567 B1 | 11/2005 | Gordon et al. |
| 6,970,834 B2 | 11/2005 | Martin et al. |
| 6,970,915 B1 | 11/2005 | Partovi et al. |
| 6,973,664 B2 | 12/2005 | Fries |
| 6,987,221 B2 | 1/2006 | Platt |
| 6,995,788 B2 | 2/2006 | James |
| 7,028,082 B1 | 4/2006 | Rosenberg et al. |
| 7,072,849 B1 | 7/2006 | Filepp et al. |
| 7,076,445 B1 | 7/2006 | Cartwright |
| 7,086,187 B2 | 8/2006 | Bandak |
| 7,136,871 B2 | 11/2006 | Ozer et al. |
| 7,305,442 B1 | 12/2007 | Lundy |
| 7,362,999 B2 | 4/2008 | Petschke et al. |
| 7,363,643 B2 | 4/2008 | Drake et al. |
| 7,370,002 B2 | 5/2008 | Heckerman et al. |
| 7,370,073 B2 | 5/2008 | Yen et al. |
| 7,386,127 B2 | 6/2008 | Bar-On |
| 7,401,140 B2 | 7/2008 | Goulden et al. |
| 7,421,454 B2 | 9/2008 | DeShan et al. |
| 7,437,368 B1 | 10/2008 | Kolluri et al. |
| 7,466,823 B2 | 12/2008 | Vestergaard et al. |
| 7,487,112 B2 | 2/2009 | Barnes, Jr. |
| 7,594,189 B1 | 9/2009 | Walker et al. |
| 7,707,485 B2 | 4/2010 | Laksono |
| 7,852,222 B2 | 12/2010 | Johnson et al. |
| 8,005,713 B1 | 8/2011 | Sanz-Pastor et al. |
| 8,024,766 B2 | 9/2011 | Addington |
| 8,060,407 B1 | 11/2011 | Delker et al. |
| 8,074,076 B2 | 12/2011 | Courtois |
| 8,175,921 B1 | 5/2012 | Kopra |
| 8,191,088 B2 | 5/2012 | Edwards et al. |
| 8,267,783 B2 | 9/2012 | van Datta |
| 8,272,964 B2 | 9/2012 | van Datta |
| 8,302,030 B2 | 10/2012 | Soroca et al. |
| 8,406,739 B2 | 3/2013 | Hull et al. |
| 8,574,074 B2 | 11/2013 | van Datta |

(56) References Cited

U.S. PATENT DOCUMENTS

| | | |
|---|---|---|
| 8,626,584 B2 | 1/2014 | van Datta |
| 8,645,992 B2 | 2/2014 | Russell |
| 8,676,900 B2 | 3/2014 | Yruski |
| 8,751,310 B2 | 6/2014 | van Datta |
| 8,763,090 B2 | 6/2014 | Capati |
| 8,763,157 B2 | 6/2014 | Navar |
| 8,769,558 B2 | 7/2014 | Navar |
| 8,795,076 B2 | 8/2014 | van Datta |
| 9,015,747 B2 | 4/2015 | Russell |
| 9,129,301 B2 | 9/2015 | van Datta |
| 9,195,991 B2 | 11/2015 | van Datta |
| 9,367,862 B2 | 6/2016 | Yruski |
| 9,466,074 B2 | 10/2016 | van Datta |
| 9,474,976 B2 | 10/2016 | Capati et al. |
| 9,525,902 B2 | 12/2016 | Navar |
| 9,531,686 B2 | 12/2016 | Navar |
| 9,864,998 B2 | 1/2018 | Yruski |
| 9,873,052 B2 | 1/2018 | van Datta |
| 9,984,388 B2 | 5/2018 | van Datta |
| 10,042,987 B2 | 8/2018 | Navar |
| 10,046,239 B2 | 8/2018 | van Datta |
| 10,298,703 B2 | 5/2019 | Capati |
| 10,390,101 B2 | 8/2019 | Russell |
| 10,410,248 B2 | 9/2019 | Yruski |
| 10,467,651 B2 | 11/2019 | van Datta |
| 2001/0011226 A1 | 8/2001 | Greer et al. |
| 2001/0013009 A1 | 8/2001 | Greening et al. |
| 2001/0014915 A1 | 8/2001 | Blumenau |
| 2001/0021994 A1 | 9/2001 | Nash |
| 2001/0025245 A1 | 9/2001 | Flickinger et al. |
| 2001/0025254 A1 | 9/2001 | Park |
| 2001/0025274 A1 | 9/2001 | Zehr et al. |
| 2001/0027412 A1 | 10/2001 | Son |
| 2001/0032125 A1 | 10/2001 | Bhan et al. |
| 2001/0032132 A1 | 10/2001 | Moran |
| 2001/0032133 A1 | 10/2001 | Moran |
| 2001/0032137 A1 | 10/2001 | Bennett et al. |
| 2001/0032333 A1 | 10/2001 | Flickinger |
| 2001/0034643 A1 | 10/2001 | Acres |
| 2001/0034762 A1 | 10/2001 | Jacobs et al. |
| 2001/0037232 A1 | 11/2001 | Miller |
| 2001/0039210 A1 | 11/2001 | St-Denis |
| 2001/0047297 A1 | 11/2001 | Wen |
| 2001/0049620 A1 | 12/2001 | Blasko |
| 2001/0052123 A1 | 12/2001 | Kawai |
| 2002/0004743 A1 | 1/2002 | Kutaragi et al. |
| 2002/0004744 A1 | 1/2002 | Muyres et al. |
| 2002/0007307 A1 | 1/2002 | Miller et al. |
| 2002/0007310 A1 | 1/2002 | Long |
| 2002/0010626 A1 | 1/2002 | Agmoni |
| 2002/0010628 A1 | 1/2002 | Burns |
| 2002/0010757 A1 | 1/2002 | Granik et al. |
| 2002/0013174 A1 | 1/2002 | Murata |
| 2002/0018076 A1 | 2/2002 | Gianola |
| 2002/0018982 A1 | 2/2002 | Conroy |
| 2002/0019774 A1 | 2/2002 | Kanter |
| 2002/0022476 A1 | 2/2002 | Go |
| 2002/0022516 A1 | 2/2002 | Forden |
| 2002/0023000 A1 | 2/2002 | Bollay |
| 2002/0026345 A1 | 2/2002 | Juels |
| 2002/0026355 A1 | 2/2002 | Mitsuoka et al. |
| 2002/0026638 A1 | 2/2002 | Eldering et al. |
| 2002/0032608 A1 | 3/2002 | Kanter |
| 2002/0032626 A1 | 3/2002 | DeWolf et al. |
| 2002/0032906 A1 | 3/2002 | Grossman |
| 2002/0044687 A1 | 4/2002 | Federman |
| 2002/0046087 A1 | 4/2002 | Hey |
| 2002/0046095 A1 | 4/2002 | Wallace |
| 2002/0046102 A1 | 4/2002 | Dohring et al. |
| 2002/0049679 A1 | 4/2002 | Russell et al. |
| 2002/0049968 A1 | 4/2002 | Wilson et al. |
| 2002/0051521 A1 | 5/2002 | Patrick |
| 2002/0055833 A1 | 5/2002 | Sterling |
| 2002/0055876 A1 | 5/2002 | Gabler |
| 2002/0056107 A1 | 5/2002 | Schlack |
| 2002/0059577 A1 | 5/2002 | Lu et al. |
| 2002/0059590 A1 | 5/2002 | Kitsukawa et al. |
| 2002/0059610 A1 | 5/2002 | Ellis |
| 2002/0061778 A1 | 5/2002 | Acres |
| 2002/0067730 A1 | 6/2002 | Hinderks et al. |
| 2002/0069240 A1 | 6/2002 | Berk |
| 2002/0069405 A1 | 6/2002 | Chapin et al. |
| 2002/0072965 A1 | 6/2002 | Merriman et al. |
| 2002/0072966 A1 | 6/2002 | Eldering et al. |
| 2002/0073235 A1 | 6/2002 | Chen et al. |
| 2002/0077906 A1 | 6/2002 | Remler |
| 2002/0077985 A1 | 6/2002 | Kobata et al. |
| 2002/0078441 A1 | 6/2002 | Drake et al. |
| 2002/0078444 A1 | 6/2002 | Krewin et al. |
| 2002/0080968 A1 | 6/2002 | Olsson |
| 2002/0082077 A1 | 6/2002 | Johnson et al. |
| 2002/0082910 A1 | 6/2002 | Kontogouris |
| 2002/0082913 A1 | 6/2002 | Li |
| 2002/0082941 A1 | 6/2002 | Bird |
| 2002/0083435 A1 | 6/2002 | Blasko et al. |
| 2002/0083439 A1 | 6/2002 | Eldering |
| 2002/0083441 A1 | 6/2002 | Flickinger et al. |
| 2002/0083442 A1 | 6/2002 | Eldering |
| 2002/0083443 A1 | 6/2002 | Eldering et al. |
| 2002/0083444 A1 | 6/2002 | Blasko et al. |
| 2002/0083445 A1 | 6/2002 | Flickinger et al. |
| 2002/0083451 A1 | 6/2002 | Gill et al. |
| 2002/0087402 A1 | 7/2002 | Zustak |
| 2002/0087403 A1 | 7/2002 | Meyers et al. |
| 2002/0087887 A1 | 7/2002 | Busam et al. |
| 2002/0087973 A1 | 7/2002 | Hamilton et al. |
| 2002/0087975 A1 | 7/2002 | Schlack |
| 2002/0087980 A1 | 7/2002 | Eldering et al. |
| 2002/0094868 A1 | 7/2002 | Tuck et al. |
| 2002/0095676 A1 | 7/2002 | Knee et al. |
| 2002/0098891 A1 | 7/2002 | Graham et al. |
| 2002/0099600 A1 | 7/2002 | Merriman et al. |
| 2002/0099611 A1 | 7/2002 | De Souza et al. |
| 2002/0099653 A1 | 7/2002 | De Souza et al. |
| 2002/0100040 A1 | 7/2002 | Bull |
| 2002/0107073 A1 | 8/2002 | Binney |
| 2002/0107075 A1 | 8/2002 | Stephan |
| 2002/0107730 A1 | 8/2002 | Bernstein |
| 2002/0109680 A1 | 8/2002 | Orbanes et al. |
| 2002/0111154 A1 | 8/2002 | Eldering et al. |
| 2002/0111172 A1 | 8/2002 | De Wolf et al. |
| 2002/0111825 A1 | 8/2002 | Martin et al. |
| 2002/0111865 A1 | 8/2002 | Middleton, III et al. |
| 2002/0112035 A1 | 8/2002 | Carey et al. |
| 2002/0112233 A1 | 8/2002 | Cantu Bonilla et al. |
| 2002/0112240 A1 | 8/2002 | Basco et al. |
| 2002/0112249 A1 | 8/2002 | Hendricks et al. |
| 2002/0112250 A1 | 8/2002 | Koplar et al. |
| 2002/0114466 A1 | 8/2002 | Tanaka et al. |
| 2002/0116284 A1 | 8/2002 | Steelman et al. |
| 2002/0120574 A1 | 8/2002 | Ezaki |
| 2002/0120589 A1 | 8/2002 | Aoki |
| 2002/0122052 A1 | 9/2002 | Reich et al. |
| 2002/0123928 A1 | 9/2002 | Eldering et al. |
| 2002/0129362 A1 | 9/2002 | Chang et al. |
| 2002/0129368 A1 | 9/2002 | Schlack et al. |
| 2002/0133398 A1 | 9/2002 | Geller et al. |
| 2002/0136407 A1 | 9/2002 | Denning et al. |
| 2002/0138493 A1 | 9/2002 | Shapiro et al. |
| 2002/0143639 A1 | 10/2002 | Beckett et al. |
| 2002/0143652 A1 | 10/2002 | Beckett |
| 2002/0143782 A1 | 10/2002 | Headings et al. |
| 2002/0143901 A1 | 10/2002 | Lupo et al. |
| 2002/0144262 A1 | 10/2002 | Plotnick et al. |
| 2002/0144263 A1 | 10/2002 | Eldering et al. |
| 2002/0147633 A1 | 10/2002 | Rafizadeh |
| 2002/0147638 A1 | 10/2002 | Banerjee et al. |
| 2002/0147645 A1 | 10/2002 | Alao et al. |
| 2002/0152117 A1 | 10/2002 | Cristofalo et al. |
| 2002/0155878 A1 | 10/2002 | Lert, Jr. et al. |
| 2002/0155891 A1 | 10/2002 | Okada et al. |
| 2002/0157002 A1 | 10/2002 | Messerges et al. |
| 2002/0159304 A1 | 10/2002 | Morita et al. |
| 2002/0161625 A1 | 10/2002 | Brito-Valladares et al. |

(56) References Cited

U.S. PATENT DOCUMENTS

| | | |
|---|---|---|
| 2002/0161639 A1 | 10/2002 | Goldstein |
| 2002/0164977 A1 | 11/2002 | Link, II et al. |
| 2002/0164999 A1 | 11/2002 | Johnson |
| 2002/0165026 A1 | 11/2002 | Perkins et al. |
| 2002/0165764 A1 | 11/2002 | Wade et al. |
| 2002/0173349 A1 | 11/2002 | Ach, III |
| 2002/0173359 A1 | 11/2002 | Gallo et al. |
| 2002/0175936 A1 | 11/2002 | Tenembaum |
| 2002/0178442 A1 | 11/2002 | Williams |
| 2002/0178445 A1 | 11/2002 | Eldering et al. |
| 2002/0178447 A1 | 11/2002 | Plotnick et al. |
| 2002/0184047 A1 | 12/2002 | Plotnick et al. |
| 2002/0184086 A1 | 12/2002 | Linde |
| 2002/0184088 A1 | 12/2002 | Rosenberg |
| 2002/0184130 A1 | 12/2002 | Blasko |
| 2002/0184642 A1 | 12/2002 | Lude et al. |
| 2002/0193066 A1 | 12/2002 | Connelly |
| 2002/0194058 A1 | 12/2002 | Eldering |
| 2002/0194585 A1 | 12/2002 | Connelly |
| 2002/0194590 A1 | 12/2002 | Pong |
| 2002/0194598 A1 | 12/2002 | Connelly |
| 2002/0194607 A1 | 12/2002 | Connelly |
| 2003/0004810 A1 | 1/2003 | Eldering |
| 2003/0009762 A1 | 1/2003 | Hooper et al. |
| 2003/0014307 A1 | 1/2003 | Heng |
| 2003/0014312 A1 | 1/2003 | Fleisher |
| 2003/0014414 A1 | 1/2003 | Newman |
| 2003/0014754 A1 | 1/2003 | Chang |
| 2003/0018527 A1 | 1/2003 | Filepp et al. |
| 2003/0018797 A1 | 1/2003 | Dunning et al. |
| 2003/0028433 A1 | 2/2003 | Merriman et al. |
| 2003/0033405 A1 | 2/2003 | Perdon et al. |
| 2003/0035075 A1 | 2/2003 | Butler et al. |
| 2003/0036944 A1 | 2/2003 | Lesandrini et al. |
| 2003/0046148 A1 | 3/2003 | Rizzi et al. |
| 2003/0048293 A1 | 3/2003 | Werkhoven |
| 2003/0054888 A1 | 3/2003 | Walker et al. |
| 2003/0060247 A1 | 3/2003 | Goldberg et al. |
| 2003/0066092 A1 | 4/2003 | Wagner et al. |
| 2003/0070167 A1 | 4/2003 | Holtz et al. |
| 2003/0073496 A1 | 4/2003 | D'Amico et al. |
| 2003/0074252 A1 | 4/2003 | Chandler-Pepelnjak et al. |
| 2003/0074661 A1 | 4/2003 | Krapf et al. |
| 2003/0076347 A1 | 4/2003 | Barrett et al. |
| 2003/0079226 A1 | 4/2003 | Barrett |
| 2003/0084449 A1 | 5/2003 | Chane et al. |
| 2003/0084456 A1 | 5/2003 | Ryan et al. |
| 2003/0093311 A1 | 5/2003 | Knowlson |
| 2003/0100375 A1 | 5/2003 | Wakae et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0103644 A1 | 6/2003 | Klayh |
| 2003/0104867 A1 | 6/2003 | Kobayashi et al. |
| 2003/0110131 A1 | 6/2003 | Alain et al. |
| 2003/0110171 A1 | 6/2003 | Ozer et al. |
| 2003/0110499 A1 | 6/2003 | Knudson et al. |
| 2003/0115074 A1 | 6/2003 | Freeman et al. |
| 2003/0115318 A1 | 6/2003 | Wueste |
| 2003/0115587 A1 | 6/2003 | Kendall et al. |
| 2003/0120940 A1 | 6/2003 | Vataja |
| 2003/0126150 A1 | 7/2003 | Chan |
| 2003/0135513 A1 | 7/2003 | Quinn et al. |
| 2003/0139966 A1 | 7/2003 | Sirota et al. |
| 2003/0144044 A1 | 7/2003 | Piarsky |
| 2003/0144048 A1 | 7/2003 | Silva |
| 2003/0149618 A1 | 8/2003 | Sender et al. |
| 2003/0149623 A1 | 8/2003 | Chen |
| 2003/0149938 A1 | 8/2003 | McElfresh et al. |
| 2003/0149975 A1 | 8/2003 | Eldering et al. |
| 2003/0158872 A1 | 8/2003 | Adams |
| 2003/0163369 A1 | 8/2003 | Arr |
| 2003/0163482 A1 | 8/2003 | Bunney et al. |
| 2003/0171988 A1 | 9/2003 | Sugihara |
| 2003/0171990 A1 | 9/2003 | Rao et al. |
| 2003/0172374 A1 | 9/2003 | Vinson et al. |
| 2003/0172376 A1 | 9/2003 | Coffin, III |
| 2003/0177490 A1 | 9/2003 | Hoshino et al. |
| 2003/0182567 A1 | 9/2003 | Barton et al. |
| 2003/0182663 A1 | 9/2003 | Gudorf et al. |
| 2003/0187719 A1 | 10/2003 | Brocklebank |
| 2003/0190961 A1 | 10/2003 | Seidman |
| 2003/0191690 A1 | 10/2003 | McIntyre et al. |
| 2003/0191742 A1 | 10/2003 | Yonezawa et al. |
| 2003/0195021 A1 | 10/2003 | Yamashita et al. |
| 2003/0195801 A1 | 10/2003 | Takakura et al. |
| 2003/0195837 A1 | 10/2003 | Kostic et al. |
| 2003/0199292 A1 | 10/2003 | Greenberg |
| 2003/0200452 A1 | 10/2003 | Tagawa et al. |
| 2003/0204632 A1 | 10/2003 | Willebeek-LeMair et al. |
| 2003/0208680 A1 | 11/2003 | Byrne et al. |
| 2003/0212608 A1 | 11/2003 | Cliff |
| 2003/0215211 A1 | 11/2003 | Coffin, III |
| 2003/0216961 A1 | 11/2003 | Barry |
| 2003/0221100 A1 | 11/2003 | Russ et al. |
| 2003/0221113 A1 | 11/2003 | Kupka et al. |
| 2003/0226141 A1 | 12/2003 | Krasnow et al. |
| 2003/0226142 A1 | 12/2003 | Rand |
| 2003/0229893 A1 | 12/2003 | Sgaraglino |
| 2004/0002380 A1 | 1/2004 | Brosnan et al. |
| 2004/0003396 A1 | 1/2004 | Babu |
| 2004/0014454 A1 | 1/2004 | Burgess et al. |
| 2004/0015397 A1 | 1/2004 | Barry et al. |
| 2004/0015398 A1 | 1/2004 | Hayward |
| 2004/0015608 A1 | 1/2004 | Ellis et al. |
| 2004/0019521 A1 | 1/2004 | Birmingham |
| 2004/0025174 A1 | 2/2004 | Cerrato |
| 2004/0030595 A1 | 2/2004 | Park |
| 2004/0034536 A1 | 2/2004 | Hughes |
| 2004/0034686 A1 | 2/2004 | Guthrie |
| 2004/0039648 A1 | 2/2004 | Candelore et al. |
| 2004/0039796 A1 | 2/2004 | Watkins |
| 2004/0043817 A1 | 3/2004 | Willis |
| 2004/0043819 A1 | 3/2004 | Willis |
| 2004/0044567 A1 | 3/2004 | Willis |
| 2004/0044569 A1 | 3/2004 | Roberts et al. |
| 2004/0044571 A1 | 3/2004 | Bronnimann et al. |
| 2004/0044574 A1 | 3/2004 | Cochran et al. |
| 2004/0054589 A1 | 3/2004 | Nicolas et al. |
| 2004/0057348 A1 | 3/2004 | Shteyn et al. |
| 2004/0059625 A1 | 3/2004 | Schrader |
| 2004/0060060 A1 | 3/2004 | Carr |
| 2004/0064833 A1 | 4/2004 | Lee et al. |
| 2004/0068483 A1 | 4/2004 | Sakurai et al. |
| 2004/0068552 A1 | 4/2004 | Kotz et al. |
| 2004/0073482 A1 | 4/2004 | Wiggins et al. |
| 2004/0076404 A1 | 4/2004 | Nakano et al. |
| 2004/0078263 A1 | 4/2004 | Altieri |
| 2004/0078266 A1 | 4/2004 | Kim |
| 2004/0078292 A1 | 4/2004 | Blumenau |
| 2004/0078809 A1 | 4/2004 | Drazin |
| 2004/0083133 A1 | 4/2004 | Nicholas et al. |
| 2004/0088170 A1 | 5/2004 | Nakanishi et al. |
| 2004/0088583 A1 | 5/2004 | Yoon et al. |
| 2004/0102248 A1 | 5/2004 | Young et al. |
| 2004/0103024 A1 | 5/2004 | Patel et al. |
| 2004/0103429 A1 | 5/2004 | Carlucci et al. |
| 2004/0107136 A1 | 6/2004 | Nemirofsky et al. |
| 2004/0110565 A1 | 6/2004 | Levesque |
| 2004/0111317 A1 | 6/2004 | Ebisawa |
| 2004/0111484 A1 | 6/2004 | Young et al. |
| 2004/0116183 A1 | 6/2004 | Prindle |
| 2004/0117272 A1 | 6/2004 | Shehab |
| 2004/0121835 A1 | 6/2004 | Willis et al. |
| 2004/0121842 A1 | 6/2004 | Willis et al. |
| 2004/0126747 A1 | 7/2004 | Fujisawa et al. |
| 2004/0133467 A1 | 7/2004 | Siler |
| 2004/0133480 A1 | 7/2004 | Domes |
| 2004/0133518 A1 | 7/2004 | Dryall |
| 2004/0137980 A1 | 7/2004 | Aenlle |
| 2004/0139465 A1 | 7/2004 | Matthews, III et al. |
| 2004/0140352 A1 | 7/2004 | Walker et al. |
| 2004/0143478 A1 | 7/2004 | Ward |
| 2004/0143495 A1 | 7/2004 | Koenig |

(56) References Cited

U.S. PATENT DOCUMENTS

| | | |
|---|---|---|
| 2004/0148221 A1 | 7/2004 | Chu |
| 2004/0148424 A1 | 7/2004 | Berkson et al. |
| 2004/0148625 A1 | 7/2004 | Eldering et al. |
| 2004/0152517 A1 | 8/2004 | Hardisty et al. |
| 2004/0152518 A1 | 8/2004 | Kogo |
| 2004/0153360 A1 | 8/2004 | Schumann |
| 2004/0153363 A1 | 8/2004 | Stehling |
| 2004/0153385 A1 | 8/2004 | Allibhoy et al. |
| 2004/0153453 A1 | 8/2004 | Brodie et al. |
| 2004/0158858 A1 | 8/2004 | Paxton |
| 2004/0162758 A1 | 8/2004 | Willis |
| 2004/0162759 A1 | 8/2004 | Willis |
| 2004/0163101 A1 | 8/2004 | Swix et al. |
| 2004/0163134 A1 | 8/2004 | Willis |
| 2004/0168063 A1 | 8/2004 | Revital et al. |
| 2004/0168188 A1 | 8/2004 | Bennington et al. |
| 2004/0168202 A1 | 8/2004 | Ebihara |
| 2004/0169678 A1 | 9/2004 | Oliver |
| 2004/0172324 A1 | 9/2004 | Merriman et al. |
| 2004/0172331 A1 | 9/2004 | Merriman et al. |
| 2004/0172332 A1 | 9/2004 | Merriman et al. |
| 2004/0172343 A1 | 9/2004 | Allibhoy et al. |
| 2004/0176170 A1 | 9/2004 | Eck et al. |
| 2004/0176995 A1 | 9/2004 | Fusz |
| 2004/0177001 A1 | 9/2004 | Salinas |
| 2004/0181808 A1 | 9/2004 | Schaefer et al. |
| 2004/0186766 A1 | 9/2004 | Fellenstein et al. |
| 2004/0186771 A1 | 9/2004 | Squires |
| 2004/0186993 A1 | 9/2004 | Risan et al. |
| 2004/0193488 A1 | 9/2004 | Khoo et al. |
| 2004/0193902 A1 | 9/2004 | Vogler et al. |
| 2004/0194123 A1 | 9/2004 | Fredlund et al. |
| 2004/0194128 A1 | 9/2004 | McIntyre et al. |
| 2004/0201629 A1 | 10/2004 | Bates et al. |
| 2004/0204238 A1 | 10/2004 | Aoki |
| 2004/0204247 A1 | 10/2004 | Walker et al. |
| 2004/0205157 A1 | 10/2004 | Bibelnieks et al. |
| 2004/0205508 A1 | 10/2004 | Wecker et al. |
| 2004/0205807 A1 | 10/2004 | Wilcoxson et al. |
| 2004/0210472 A1 | 10/2004 | Lew et al. |
| 2004/0210489 A1 | 10/2004 | Jackson et al. |
| 2004/0210661 A1 | 10/2004 | Thompson |
| 2004/0210824 A1 | 10/2004 | Shoff et al. |
| 2004/0219977 A1 | 11/2004 | Ebisawa |
| 2004/0220850 A1 | 11/2004 | Ferrer et al. |
| 2004/0221018 A1 | 11/2004 | Ji |
| 2004/0224772 A1 | 11/2004 | Canessa et al. |
| 2004/0225562 A1 | 11/2004 | Turner |
| 2004/0225715 A1 | 11/2004 | Gottfried |
| 2004/0230593 A1 | 11/2004 | Rudin et al. |
| 2004/0230994 A1 | 11/2004 | Urdang et al. |
| 2004/0234932 A1 | 11/2004 | Hughes et al. |
| 2004/0236585 A1 | 11/2004 | Kohnke et al. |
| 2004/0243455 A1 | 12/2004 | Smith |
| 2004/0243466 A1 | 12/2004 | Trzybinski et al. |
| 2004/0243470 A1 | 12/2004 | Ozer et al. |
| 2004/0243623 A1 | 12/2004 | Ozer et al. |
| 2004/0248649 A1 | 12/2004 | Arai et al. |
| 2004/0249786 A1 | 12/2004 | Dabney et al. |
| 2004/0252051 A1 | 12/2004 | Johnson |
| 2004/0254831 A1 | 12/2004 | Dean |
| 2004/0254957 A1 | 12/2004 | Hyotyniemi et al. |
| 2004/0255148 A1 | 12/2004 | Monteiro et al. |
| 2004/0259553 A1 | 12/2004 | Delaney et al. |
| 2004/0260609 A1 | 12/2004 | Loeb et al. |
| 2004/0261125 A1 | 12/2004 | Ellis et al. |
| 2004/0266535 A1 | 12/2004 | Reeves |
| 2004/0266537 A1 | 12/2004 | Morris |
| 2004/0267611 A1 | 12/2004 | Hoerenz |
| 2004/0267806 A1 | 12/2004 | Lester |
| 2005/0005242 A1 | 1/2005 | Hoyle |
| 2005/0015267 A1 | 1/2005 | Barringer et al. |
| 2005/0021387 A1 | 1/2005 | Gottfurcht |
| 2005/0021396 A1 | 1/2005 | Pearch et al. |
| 2005/0021397 A1 | 1/2005 | Cui et al. |
| 2005/0021403 A1 | 1/2005 | Ozer et al. |
| 2005/0021465 A1 | 1/2005 | Segerstrom |
| 2005/0021470 A1 | 1/2005 | Martin et al. |
| 2005/0021853 A1 | 1/2005 | Parekh et al. |
| 2005/0022019 A1 | 1/2005 | Medvinsky et al. |
| 2005/0027587 A1 | 2/2005 | Latona et al. |
| 2005/0027595 A1 | 2/2005 | Ha et al. |
| 2005/0027699 A1 | 2/2005 | Awadallah et al. |
| 2005/0028188 A1 | 2/2005 | Latona et al. |
| 2005/0028195 A1 | 2/2005 | Feinleib et al. |
| 2005/0032577 A1 | 2/2005 | Blackburn et al. |
| 2005/0033700 A1 | 2/2005 | Vogler et al. |
| 2005/0038698 A1 | 2/2005 | Lukose et al. |
| 2005/0038702 A1 | 2/2005 | Merriman et al. |
| 2005/0050070 A1 | 3/2005 | Sheldon |
| 2005/0055725 A1 | 3/2005 | Stewart |
| 2005/0060264 A1 | 3/2005 | Shrock et al. |
| 2005/0075155 A1 | 4/2005 | Sitrick |
| 2005/0075172 A1 | 4/2005 | Coleman |
| 2005/0076051 A1 | 4/2005 | Carobus et al. |
| 2005/0088320 A1 | 4/2005 | Kovach |
| 2005/0091107 A1 | 4/2005 | Blum |
| 2005/0091108 A1 | 4/2005 | Frost |
| 2005/0091111 A1 | 4/2005 | Green et al. |
| 2005/0096975 A1 | 5/2005 | Moshe |
| 2005/0096983 A1 | 5/2005 | Werkhoven |
| 2005/0097622 A1 | 5/2005 | Zigmond et al. |
| 2005/0101386 A1 | 5/2005 | Lavanchy et al. |
| 2005/0102177 A1 | 5/2005 | Takayama |
| 2005/0102202 A1 | 5/2005 | Linden et al. |
| 2005/0107158 A1 | 5/2005 | Kanisawa et al. |
| 2005/0108095 A1 | 5/2005 | Perlmutter |
| 2005/0113170 A1 | 5/2005 | McHugh |
| 2005/0114526 A1 | 5/2005 | Aoyama |
| 2005/0125286 A1 | 6/2005 | Crippen et al. |
| 2005/0125528 A1 | 6/2005 | Burke et al. |
| 2005/0130725 A1 | 6/2005 | Creamer et al. |
| 2005/0143174 A1 | 6/2005 | Goldman et al. |
| 2005/0144063 A1 | 6/2005 | Spector |
| 2005/0144073 A1 | 6/2005 | Morrisroe et al. |
| 2005/0144251 A1 | 6/2005 | Slate |
| 2005/0149396 A1 | 7/2005 | Horowitz et al. |
| 2005/0149397 A1 | 7/2005 | Morgenstern et al. |
| 2005/0153760 A1 | 7/2005 | Varley |
| 2005/0154640 A1 | 7/2005 | Kolluri et al. |
| 2005/0154717 A1 | 7/2005 | Watson et al. |
| 2005/0155056 A1 | 7/2005 | Knee et al. |
| 2005/0155083 A1 | 7/2005 | Oh et al. |
| 2005/0160442 A1 | 7/2005 | Kaplowitz |
| 2005/0164757 A1 | 7/2005 | Ebisawa |
| 2005/0165640 A1 | 7/2005 | Kotorov |
| 2005/0165644 A1 | 7/2005 | Beyda et al. |
| 2005/0171865 A1 | 8/2005 | Beardow |
| 2005/0177413 A1 | 8/2005 | Blumberg et al. |
| 2005/0177430 A1 | 8/2005 | Willis |
| 2005/0177431 A1 | 8/2005 | Willis et al. |
| 2005/0177461 A1 | 8/2005 | Rosefelt et al. |
| 2005/0177853 A1 | 8/2005 | Williams et al. |
| 2005/0178940 A1 | 8/2005 | Granick |
| 2005/0179685 A1 | 8/2005 | Kake et al. |
| 2005/0182693 A1 | 8/2005 | Alivandi |
| 2005/0182737 A1 | 8/2005 | Brown |
| 2005/0185825 A1 | 8/2005 | Hoshino et al. |
| 2005/0192071 A1 | 9/2005 | Matsuno et al. |
| 2005/0192864 A1 | 9/2005 | Ganz |
| 2005/0193411 A1 | 9/2005 | Funston |
| 2005/0193425 A1 | 9/2005 | Sull et al. |
| 2005/0195157 A1 | 9/2005 | Kramer et al. |
| 2005/0202385 A1 | 9/2005 | Coward et al. |
| 2005/0203804 A1 | 9/2005 | Suzuki et al. |
| 2005/0203811 A1 | 9/2005 | David |
| 2005/0203849 A1 | 9/2005 | Benson |
| 2005/0204381 A1 | 9/2005 | Ludvig et al. |
| 2005/0216346 A1 | 9/2005 | Kusumoto et al. |
| 2005/0216348 A1 | 9/2005 | Martin et al. |
| 2005/0216581 A1 | 9/2005 | Blumenau et al. |
| 2005/0216932 A1 | 9/2005 | Danker |
| 2005/0222908 A1 | 10/2005 | Altberg et al. |
| 2005/0223100 A1 | 10/2005 | Chen et al. |

(56) References Cited

U.S. PATENT DOCUMENTS

| | | |
|---|---|---|
| 2005/0227749 A1 | 10/2005 | Bender et al. |
| 2005/0228797 A1 | 10/2005 | Koningstein et al. |
| 2005/0235030 A1 | 10/2005 | Lauckhart et al. |
| 2005/0235199 A1 | 10/2005 | Adams |
| 2005/0235310 A1 | 10/2005 | Bies |
| 2005/0235318 A1 | 10/2005 | Grauch et al. |
| 2005/0240476 A1 | 10/2005 | Bigott |
| 2005/0240961 A1 | 10/2005 | Jerding et al. |
| 2005/0246736 A1 | 11/2005 | Beyda et al. |
| 2005/0247769 A1 | 11/2005 | Potter et al. |
| 2005/0251539 A1 | 11/2005 | Parekh et al. |
| 2005/0254366 A1 | 11/2005 | Amar |
| 2005/0255914 A1 | 11/2005 | McHale et al. |
| 2005/0256768 A1 | 11/2005 | Robinson |
| 2005/0261062 A1 | 11/2005 | Lewin et al. |
| 2005/0261962 A1 | 11/2005 | Chuah |
| 2005/0266906 A1 | 12/2005 | Stevens |
| 2005/0266907 A1 | 12/2005 | Weston et al. |
| 2005/0270537 A1 | 12/2005 | Mian et al. |
| 2005/0273618 A1 | 12/2005 | Takemura et al. |
| 2005/0283395 A1 | 12/2005 | Lesandrini et al. |
| 2005/0283401 A1 | 12/2005 | Swix et al. |
| 2005/0283797 A1 | 12/2005 | Eldering et al. |
| 2005/0286860 A1 | 12/2005 | Conklin |
| 2005/0288999 A1 | 12/2005 | Lerner et al. |
| 2006/0007312 A1 | 1/2006 | James |
| 2006/0031405 A1 | 2/2006 | Goldman et al. |
| 2006/0031551 A1 | 2/2006 | Agresta et al. |
| 2006/0080702 A1 | 4/2006 | Diez et al. |
| 2006/0085517 A1 | 4/2006 | Kaurila |
| 2006/0085816 A1 | 4/2006 | Funk et al. |
| 2006/0090186 A1 | 4/2006 | Santangelo et al. |
| 2006/0129917 A1 | 6/2006 | Volk et al. |
| 2006/0130095 A1 | 6/2006 | Willis et al. |
| 2006/0135232 A1 | 6/2006 | Willis |
| 2006/0143650 A1 | 6/2006 | Tanikawa et al. |
| 2006/0150249 A1 | 7/2006 | Gassen et al. |
| 2006/0167747 A1 | 7/2006 | Goodman |
| 2006/0193471 A1 | 8/2006 | Stehle |
| 2006/0195859 A1 | 8/2006 | Konig et al. |
| 2006/0195860 A1 | 8/2006 | Eldering et al. |
| 2006/0195902 A1 | 8/2006 | King et al. |
| 2006/0206912 A1 | 9/2006 | Klarfeld et al. |
| 2006/0212347 A1 | 9/2006 | Fang et al. |
| 2006/0212350 A1 | 9/2006 | Ellis et al. |
| 2006/0224951 A1 | 10/2006 | Burke et al. |
| 2006/0230141 A1 | 10/2006 | Willis |
| 2006/0242667 A1 | 10/2006 | Peterson et al. |
| 2006/0242703 A1 | 10/2006 | Abeni |
| 2006/0248209 A1 | 11/2006 | Chiu |
| 2006/0248569 A1 | 11/2006 | Lienhart et al. |
| 2006/0248595 A1 | 11/2006 | Kelly et al. |
| 2006/0253323 A1 | 11/2006 | Phan et al. |
| 2006/0253330 A1 | 11/2006 | Maggio et al. |
| 2006/0265503 A1 | 11/2006 | Jones et al. |
| 2006/0268667 A1 | 11/2006 | Jellison, Jr. et al. |
| 2006/0287915 A1 | 12/2006 | Boulet et al. |
| 2006/0294566 A1 | 12/2006 | Zlattner |
| 2007/0027771 A1 | 2/2007 | Collins et al. |
| 2007/0038508 A1 | 2/2007 | Jain et al. |
| 2007/0038516 A1 | 2/2007 | Apple et al. |
| 2007/0038931 A1 | 2/2007 | Allaire et al. |
| 2007/0050254 A1 | 3/2007 | Driscoll |
| 2007/0050256 A1 | 3/2007 | Walker et al. |
| 2007/0055980 A1 | 3/2007 | Mageid et al. |
| 2007/0061204 A1 | 3/2007 | Ellis et al. |
| 2007/0061711 A1 | 3/2007 | Bodin et al. |
| 2007/0061838 A1 | 3/2007 | Grubbs et al. |
| 2007/0066287 A1 | 3/2007 | Papulov |
| 2007/0072676 A1 | 3/2007 | Baluja |
| 2007/0073756 A1 | 3/2007 | Manhas et al. |
| 2007/0078706 A1 | 4/2007 | Datta et al. |
| 2007/0078712 A1 | 4/2007 | Ott et al. |
| 2007/0078714 A1 | 4/2007 | Ott |
| 2007/0078989 A1 | 4/2007 | van Datta |
| 2007/0079326 A1 | 4/2007 | Datta et al. |
| 2007/0079331 A1 | 4/2007 | Datta et al. |
| 2007/0079335 A1 | 4/2007 | McDonough |
| 2007/0083611 A1 | 4/2007 | Farago et al. |
| 2007/0089151 A1 | 4/2007 | Moore et al. |
| 2007/0094081 A1 | 4/2007 | Yruski |
| 2007/0094082 A1 | 4/2007 | Yruski |
| 2007/0094083 A1 | 4/2007 | Yruski |
| 2007/0094363 A1 | 4/2007 | Yruski |
| 2007/0101360 A1 | 5/2007 | Gutta et al. |
| 2007/0118425 A1 | 5/2007 | Yruski |
| 2007/0130012 A1 | 6/2007 | Yruski |
| 2007/0130594 A1 | 6/2007 | Hidary et al. |
| 2007/0146812 A1 | 6/2007 | Lawton |
| 2007/0150919 A1 | 6/2007 | Morishita |
| 2007/0157220 A1 | 7/2007 | Cordray et al. |
| 2007/0162945 A1 | 7/2007 | Mills |
| 2007/0168288 A1 | 7/2007 | Bozeman |
| 2007/0174471 A1 | 7/2007 | Van Rossum |
| 2007/0225047 A1 | 9/2007 | Bakos |
| 2007/0244760 A1 | 10/2007 | Bodnar et al. |
| 2007/0276926 A1 | 11/2007 | LaJoie et al. |
| 2007/0294740 A1 | 12/2007 | Drake et al. |
| 2007/0294773 A1 | 12/2007 | Hydrie et al. |
| 2007/0299935 A1 | 12/2007 | Plastina et al. |
| 2008/0046917 A1 | 2/2008 | de Heer |
| 2008/0046948 A1 | 2/2008 | Verosub |
| 2008/0097872 A1 | 4/2008 | Peckover |
| 2008/0102947 A1 | 5/2008 | Hays et al. |
| 2008/0104106 A1 | 5/2008 | Rosenberg et al. |
| 2008/0109844 A1 | 5/2008 | Baldeschwieler et al. |
| 2008/0114861 A1 | 5/2008 | Gildred |
| 2008/0120407 A1 | 5/2008 | Chen et al. |
| 2008/0126476 A1 | 5/2008 | Nicholas et al. |
| 2008/0127244 A1 | 5/2008 | Zhang |
| 2008/0137645 A1 | 6/2008 | Skog |
| 2008/0140239 A1 | 6/2008 | Rosenberg et al. |
| 2008/0140717 A1 | 6/2008 | Rosenberg et al. |
| 2008/0141372 A1 | 6/2008 | Massey et al. |
| 2008/0195664 A1 | 8/2008 | Maharajh et al. |
| 2008/0207137 A1 | 8/2008 | Maharajh et al. |
| 2008/0307454 A1 | 12/2008 | Ahanger et al. |
| 2009/0083788 A1 | 3/2009 | Russell |
| 2009/0094160 A1 | 4/2009 | Webster et al. |
| 2009/0183081 A1 | 7/2009 | Rodriguez |
| 2009/0199230 A1 | 8/2009 | Kumar et al. |
| 2009/0204481 A1 | 8/2009 | Navar |
| 2009/0254430 A1 | 10/2009 | Cherenson |
| 2010/0022310 A1 | 1/2010 | van Datta |
| 2010/0030640 A1 | 2/2010 | van Datta |
| 2010/0043022 A1 | 2/2010 | Kaftan |
| 2010/0169467 A1 | 7/2010 | Shukla et al. |
| 2010/0169910 A1 | 7/2010 | Collins et al. |
| 2010/0269138 A1 | 10/2010 | Krikorian et al. |
| 2011/0004669 A1 | 1/2011 | Navar |
| 2011/0010545 A1 | 1/2011 | Kill et al. |
| 2011/0015975 A1 | 1/2011 | Yruski et al. |
| 2011/0029383 A1 | 2/2011 | Engel et al. |
| 2011/0041161 A1 | 2/2011 | Capati |
| 2011/0125582 A1 | 5/2011 | Datta et al. |
| 2011/0138058 A1 | 6/2011 | Ishida |
| 2011/0307339 A1 | 12/2011 | Russell |
| 2013/0232000 A1 | 9/2013 | van Datta |
| 2013/0232001 A1 | 9/2013 | van Datta |
| 2013/0297411 A1 | 11/2013 | van Datta |
| 2014/0019229 A1 | 1/2014 | van Datta |
| 2014/0019249 A1 | 1/2014 | Nicholas et al. |
| 2014/0089081 A1 | 3/2014 | Yruski |
| 2014/0215224 A1 | 7/2014 | Navar |
| 2014/0304328 A1 | 10/2014 | Capati |
| 2014/0324576 A1 | 10/2014 | van Datta |
| 2014/0337882 A1 | 11/2014 | Navar |
| 2015/0294368 A1 | 10/2015 | Russell |
| 2016/0027053 A1 | 1/2016 | van Datta |
| 2016/0292736 A1 | 10/2016 | Yruski |
| 2017/0091804 A1 | 3/2017 | van Datta |
| 2017/0164030 A1 | 6/2017 | Navar |
| 2017/0206341 A1 | 7/2017 | Navar |

(56) References Cited

U.S. PATENT DOCUMENTS

| | | |
|---|---|---|
| 2017/0208145 A1 | 7/2017 | Capati |
| 2018/0225676 A1 | 8/2018 | Yruski |
| 2018/0374116 A1 | 12/2018 | van Datta |

FOREIGN PATENT DOCUMENTS

| | | |
|---|---|---|
| CA | 2250680 | 4/2000 |
| CN | 1 653 819 | 8/2005 |
| CN | 103279874 | 9/2013 |
| EP | 0 337 539 | 10/1989 |
| EP | 0 405 776 | 1/1991 |
| EP | 0 620 688 | 10/1994 |
| EP | 0 625 760 | 11/1994 |
| EP | 0 743 595 | 10/1996 |
| EP | 0 905 928 | 3/1999 |
| GB | 2 141 907 | 1/1985 |
| GB | 2 194 369 | 3/1988 |
| JP | 12-20925 | 9/1989 |
| JP | 63-35569 | 12/1994 |
| JP | 81-17445 | 5/1996 |
| JP | 81-73634 | 7/1996 |
| JP | 82-80934 | 10/1996 |
| JP | 2001-111921 | 4/2001 |
| JP | 2001-321556 | 11/2001 |
| JP | 2002-259433 | 9/2002 |
| JP | 2002-358455 | 12/2002 |
| JP | 2002-366971 | 12/2002 |
| JP | 2003-248844 | 9/2003 |
| JP | 2004-102475 | 4/2004 |
| JP | 2004-298469 | 10/2004 |
| WO | WO 1993/14462 | 7/1993 |
| WO | WO 1993/19427 | 9/1993 |
| WO | WO 1993/22017 | 11/1993 |
| WO | WO 1993/23125 | 11/1993 |
| WO | WO 1995/12442 | 5/1995 |
| WO | WO 1995/12853 | 5/1995 |
| WO | WO 98/51384 | 11/1998 |
| WO | WO 2003/032127 | 4/2003 |
| WO | WO 2004/100010 | 11/2004 |
| WO | WO 2005/086969 | 9/2005 |
| WO | WO 2007/041022 | 4/2007 |
| WO | WO 2007/041028 | 4/2007 |
| WO | WO 2007/130681 | 11/2007 |

OTHER PUBLICATIONS

Business Wire, "Juno launches America's first free Internet e-mail service; Initial advertisers include Land's End, Miramax and Snapple," Apr. 19, 1996.
Business Wire, "RTIME Announces First 100-Person Twitch Game for Internet; "RTIME Rocks!" Demonstrates the Power of the RTIME Interactive Networking Engine to Support Large Scale, High Performance, Internet Game Play," Apr. 14, 1997.
Cohen, Josh, "A General Overview of Two New Technologies for Playing Protected Content on Portable or Networked Devices," Microsoft Windows Media, Jun. 2004, 1-8.
Courtois N et al: An Algebraic Masking Method to Protect AES Against Power Attacks, 'Online! XP002344150 Retrieved from the Internet: URL:eprint.iacr.org/2005/204.pdf> 'retrieved on Sep. 8, 2005.
Fontijn, Willem; AmbientDB: P2P Data Management Middleware for Ambient Intelligence; Year: 2004; IEEE; pp: 1-5.
Microsoft Corporation, "A Technical Overview of Windows Media DRM 10 for Devices," Microsoft Windows Media, Sep. 2004, 1-16.
Microsoft Corporation, "Architecture of Windows Media Rights Manager," www.microsoft.com/windows/windowsmedia/howto/articles/drmarchitecture.aspc, May 2004.
PricewaterhouseCoopers, "Lab Online Ad Measurement Study," Dec. 2001.
Recording Industry Association of America, "Frequently Asked Questions—Webcasting," www.riaa.com/issues/licensing/webcasting_faq.asp. (acc. 2004).
Statement in Accordance with the Notice from the European Patent Office dated Oct. 1, 2007 Concerning Business Methods Nov. 1, 2007, XP002456252.
U.S. Copyright Office, "The Digital Millennium Copyright Act of 1998," Oct. 1998, 1-18.
What TV Ratings Really Mean (and Other Frequently-Asked Questions). Nielsen Media Research. Web. <http:!/ documents.chelmsford. k 12. ma.us/dsweb/GeUDocument-14983/nielsenmedia.htm>, Jun. 2005.
PCT/US06/037018, International Search Report and Written Opinion dated Aug. 7, 2007.
PCT/US06/036958, International Search Report and Written Opinion dated Apr. 27, 2007.
PCT/US07/11059, International Search Report and Written Opinion dated May 30, 2008.
EP 06815173.7, First Examination Report dated Feb. 23, 2016.
EP 06815173.7, Extended European Search Report dated Oct. 5, 2011.
EP 18207669.5, Extended European Search Report dated Mar. 25, 2019.
JP 2009-509786, Decision of Refusal dated Oct. 30, 2012.
JP 2009-509786, Decision of Refusal dated Aug. 2, 2011.
JP 2009-509786, Decision of Refusal dated Jul. 28, 2011.
JP 2013-039681, Decision of Refusal dated Feb. 3, 2015.
JP 2013-039681, Notification of Reason for Refusal dated Feb. 12, 2014.
CN 200780016268.2, First Office Action dated Jan. 4, 2012.
CN 201310051520.0, First Office Action dated Sep. 1, 2015.
EP 07776856.2, Extended European Search Report dated Jun. 9, 2011.
U.S. Appl. No. 11/241,229 Final Office Action dated Apr. 23, 2010.
U.S. Appl. No. 11/241,229 Office Action dated Nov. 19, 2009.
U.S. Appl. No. 13/939,178 Office Action dated Oct. 10, 2013.
U.S. Appl. No. 14/336,452 Office Action dated Jan. 8, 2016.
U.S. Appl. No. 15/285,928 Office Action dated Sep. 13, 2017.
U.S. Appl. No. 15/992,014 Office Action dated Feb. 13, 2019.
U.S. Appl. No. 12/571,204 Office Action dated Feb. 28, 2012.
U.S. Appl. No. 12/571,225 Office Action dated Feb. 2, 2012.
U.S. Appl. No. 11/240,655 Final Office Action dated Nov. 14, 2013.
U.S. Appl. No. 11/240,655 Office Action dated Aug. 5, 2013.
U.S. Appl. No. 11/240,655 Final Office Action dated Jan. 27, 2010.
U.S. Appl. No. 11/240,655 Office Action dated Apr. 16, 2009.
U.S. Appl. No. 13/857,080 Office Action dated Jul. 28, 2017.
U.S. Appl. No. 13/857,080 Final Office Action dated Feb. 24, 2017.
U.S. Appl. No. 13/857,080 Office Action dated Aug. 2, 2016.
U.S. Appl. No. 13/857,080 Final Office Action dated Aug. 19, 2015.
U.S. Appl. No. 13/857,080 Office Action dated Apr. 29, 2015.
U.S. Appl. No. 13/857,082 Final Office Action dated Feb. 28, 2017.
U.S. Appl. No. 13/857,082 Office Action dated Aug. 18, 2016.
U.S. Appl. No. 13/857,082 Final Office Action dated Aug. 11, 2015.
U.S. Appl. No. 13/857,082 Office Action dated Apr. 16, 2015.
U.S. Appl. No. 12/190,323 Final Office Action dated Feb. 25, 2013.
U.S. Appl. No. 12/190,323 Office Action dated May 7, 2012.
U.S. Appl. No. 12/190,323 Office Action dated Jun. 8, 2011.
U.S. Appl. No. 12/190,323 Final Office Action dated Nov. 14, 2011.
U.S. Appl. No. 14/691,404 Office Action dated Sep. 18, 2018.
U.S. Appl. No. 14/691,404 Final Office Action dated Jan. 30, 2018.
U.S. Appl. No. 14/691,404 Office Action dated Sep. 21, 2017.
U.S. Appl. No. 14/691,404 Final Office Action dated Mar. 22, 2017.
U.S. Appl. No. 14/691,404 Office Action dated Oct. 27, 2016.
U.S. Appl. No. 14/691,404 Final Office Action dated Mar. 25, 2016.
U.S. Appl. No. 14/691,404 Office Action dated Nov. 13, 2015.
U.S. Appl. No. 13/191,398 Final Office Action dated Jun. 10, 2014.
U.S. Appl. No. 13/191,398 Office Action dated Dec. 3, 2013.
U.S. Appl. No. 13/191,398 Final Office Action dated Jun. 7, 2013.
U.S. Appl. No. 13/191,398 Office Action dated Mar. 22, 2012.
U.S. Appl. No. 11/535,370 Final Office Action dated Jun. 8, 2010.
U.S. Appl. No. 11/535,307 Office Action dated Dec. 10, 2009.
U.S. Appl. No. 11/535,307 Final Action dated Sep. 8, 2009.
U.S. Appl. No. 11/535,307 Office Action dated Apr. 16, 2009.
U.S. Appl. No. 13/013,789 Office Action dated Feb. 19, 2019.
U.S. Appl. No. 13/013,789 Final Office Action dated Oct. 3, 2018.
U.S. Appl. No. 13/013,789 Office Action dated May 24, 2018.

(56) References Cited

OTHER PUBLICATIONS

U.S. Appl. No. 13/013,789 Final Office Action dated Aug. 25, 2017.
U.S. Appl. No. 13/013,789 Office Action dated May 4, 2017.
U.S. Appl. No. 13/013,789 Final Office Action dated Jun. 17, 2016.
U.S. Appl. No. 13/013,789 Office Action dated Feb. 12, 2016.
U.S. Appl. No. 13/013,789 Final Office Action dated Jul. 28, 2014.
U.S. Appl. No. 13/013,789 Office Action dated Dec. 20, 2013.
U.S. Appl. No. 13/013,789 Final Office Action dated Feb. 27, 2013.
U.S. Appl. No. 13/013,789 Office Action dated Oct. 9, 2012.
U.S. Appl. No. 11/452,848 Final Office Action dated Apr. 7, 2015.
U.S. Appl. No. 11/452,848 Office Action dated Oct. 23, 2014.
U.S. Appl. No. 11/452,848 Final Office Action dated Jun. 5, 2014.
U.S. Appl. No. 11/452,848 Office Action dated Nov. 18, 2013.
U.S. Appl. No. 11/452,848 Final Office Action dated Feb. 15, 2011.
U.S. Appl. No. 11/452,848 Office Action dated Sep. 15, 2010.
U.S. Appl. No. 11/452,848 Final Office Action dated Apr. 21, 2010.
U.S. Appl. No. 11/452,848 Office Action dated Oct. 20, 2009.
U.S. Appl. No. 11/452,848 Final Office Action dated Jul. 9, 2009.
U.S. Appl. No. 11/452,848 Office Action dated Jan. 27, 2009.
U.S. Appl. No. 14/028,327 Final Office Action dated Mar. 19, 2015.
U.S. Appl. No. 14/028,327 Office Action dated Oct. 8, 2014.
U.S. Appl. No. 14/028,327 Final Office Action dated Jun. 9, 2014.
U.S. Appl. No. 14/028,327 Office Action dated Nov. 7, 2013.
U.S. Appl. No. 14/875,682 Office Action dated Jul. 31, 2018.
U.S. Appl. No. 14/875,682 Office Action dated Feb. 22, 2018.
U.S. Appl. No. 14/875,682 Office Action dated Jan. 26, 2017.
U.S. Appl. No. 14/875,682 Final Office Action dated Jul. 18, 2016.
U.S. Appl. No. 14/875,682 Office Action dated Jan. 29, 2016.
U.S. Appl. No. 12/782,678 Final Office Action dated Jul. 31, 2013.
U.S. Appl. No. 12/782,678 Office Action dated Jan. 7, 2013.
U.S. Appl. No. 12/782,678 Office Action dated Oct. 4, 2012.
U.S. Appl. No. 14/308,313 Final Office Action dated Oct. 23, 2015.
U.S. Appl. No. 14/308,313 Office Action dated Apr. 27, 2015.
U.S. Appl. No. 15/333,932 Final Office Action dated Mar. 22, 2018.
U.S. Appl. No. 15/333,932 Office Action dated Aug. 14, 2017.
U.S. Appl. No. 11/586,990 Office Action dated Mar. 18, 2016.
U.S. Appl. No. 11/586,990 Final Office Action dated Dec. 8, 2014.
U.S. Appl. No. 11/586,990 Office Action dated Aug. 12, 2014.
U.S. Appl. No. 11/586,990 Final Office Action dated Apr. 7, 2014.
U.S. Appl. No. 11/586,990 Office Action dated Nov. 20, 2013.
U.S. Appl. No. 11/586,990 Final Office Action dated Apr. 10, 2013.
U.S. Appl. No. 11/586,990 Office Action dated Nov. 23, 2012.
U.S. Appl. No. 11/586,990 Final Office Action dated Feb. 14, 2011.
U.S. Appl. No. 11/586,990 Office Action dated Sep. 15, 2010.
U.S. Appl. No. 11/588,036 Final Office Action dated Jun. 19, 2018.
U.S. Appl. No. 11/588,036 Office Action dated Mar. 16, 2018.
U.S. Appl. No. 11/588,036 Final Office Action dated Mar. 15, 2017.
U.S. Appl. No. 11/588,036 Office Action dated Aug. 31, 2016.
U.S. Appl. No. 11/588,036 Final Office Action dated Aug. 4, 2015.
U.S. Appl. No. 11/588,036 Office Action dated Jan. 15, 2015.
U.S. Appl. No. 11/588,036 Final Office Action dated Apr. 15, 2014.
U.S. Appl. No. 11/588,036 Office Action dated Jan. 6, 2014.
U.S. Appl. No. 11/588,036 Final Office Action dated Oct. 4, 2012.
U.S. Appl. No. 11/588,036 Office Action dated Apr. 27, 2012.
U.S. Appl. No. 11/588,036 Final Office Action dated Feb. 17, 2011.
U.S. Appl. No. 11/588,036 Office Action dated Sep. 14, 2010.
U.S. Appl. No. 11/586,958 Final Office Action dated Jan. 18, 2017.
U.S. Appl. No. 11/586,958 Office Action dated Jun. 23, 2016.
U.S. Appl. No. 11/586,958 Final Office Action dated Aug. 4, 2015.
U.S. Appl. No. 11/586,958 Office Action dated Jan. 14, 2015.
U.S. Appl. No. 11/586,958 Final Office Action dated Mar. 12, 2014.
U.S. Appl. No. 11/586,958 Office Action dated Nov. 6, 2013.
U.S. Appl. No. 11/586,958 Final Office Action dated Feb. 14, 2011.
U.S. Appl. No. 11/586,958 Office Action dated Sep. 30, 2010.
U.S. Appl. No. 11/586,989 Final Office Action dated Dec. 9, 2010.
U.S. Appl. No. 11/586,989 Office Action dated May 11, 2010.
U.S. Appl. No. 11/586,989 Office Action dated Mar. 30, 2009.
U.S. Appl. No. 14/091,327 Office Action dated Mar. 12, 2015.
U.S. Appl. No. 15/180,615 Final Office Action dated Nov. 1, 2018.
U.S. Appl. No. 15/180,615 Office Action dated Apr. 20, 2018.
U.S. Appl. No. 15/180,615 Final Office Action dated May 19, 2017.
U.S. Appl. No. 15/180,615 Office Action dated Nov. 2, 2016.
U.S. Appl. No. 11/586,959 Final Office Action dated Jan. 29, 2016.
U.S. Appl. No. 11/586,959 Office Action dated Jul. 9, 2015.
U.S. Appl. No. 11/586,959 Final Office Action dated Dec. 8, 2014.
U.S. Appl. No. 11/586,959 Office Action dated Jul. 31, 2014.
U.S. Appl. No. 11/586,959 Office Action dated Feb. 12, 2014.
U.S. Appl. No. 11/586,959 Final Office Action dated Aug. 30, 2013.
U.S. Appl. No. 11/586,959 Office Action dated May 8, 2013.
U.S. Appl. No. 11/586,959 Final Office Action dated Oct. 5, 2012.
U.S. Appl. No. 11/586,959 Office Action dated Apr. 27, 2012.
U.S. Appl. No. 11/586,959 Final Office Action dated Feb. 14, 2011.
U.S. Appl. No. 11/586,959 Office Action dated Oct. 1, 2010.
U.S. Appl. No. 12/370,531 Office Action dated Aug. 1, 2013.
U.S. Appl. No. 12/370,531 Final Office Action dated Aug. 3, 2011.
U.S. Appl. No. 12/370,531 Office Action dated Nov. 16, 2011.
U.S. Appl. No. 12/370,531 Final Office Action dated Aug. 1, 2011.
U.S. Appl. No. 12/370,531 Office Action dated Feb. 2, 2011.
U.S. Appl. No. 14/315,694 Office Action dated Mar. 25, 2016.
U.S. Appl. No. 14/315,694 Final Office Action dated Oct. 27, 2015.
U.S. Appl. No. 14/315,694 Office Action dated Apr. 10, 2015.
U.S. Appl. No. 15/385,688 Office Action dated Jun. 13, 2019.
U.S. Appl. No. 15/385,688 Final Office Action dated Dec. 14, 2018.
U.S. Appl. No. 15/385,688 Office Action dated Jun. 5, 2018.
U.S. Appl. No. 15/385,688 Final Office Action dated Jan. 18, 2018.
U.S. Appl. No. 11/588,236 Office Action dated Sep. 9, 2009.
U.S. Appl. No. 11/588,236 Office Action dated Mar. 5, 2009.
U.S. Appl. No. 12/703,188 Office Action dated Apr. 5, 2017.
U.S. Appl. No. 12/703,188 Final Office Action dated Sep. 7, 2016.
U.S. Appl. No. 12/703,188 Office Action dated Apr. 1, 2016.
U.S. Appl. No. 12/703,188 Office Action dated Apr. 1, 2015.
U.S. Appl. No. 12/703,188 Final Office Action dated Jul. 14, 2014.
U.S. Appl. No. 12/703,188 Office Action dated Nov. 21, 2013.
U.S. Appl. No. 12/703,188 Final Office Action dated Oct. 12, 2012.
U.S. Appl. No. 12/703,188 Office Action dated Apr. 6, 2012.
U.S. Appl. No. 15/866,308 Office Action dated Sep. 17, 2019.
U.S. Appl. No. 10/924,009 Supplemental Final Office Action dated Feb. 4, 2009.
U.S. Appl. No. 10/924,009 Final Office Action dated Dec. 5, 2008.
U.S. Appl. No. 10/924,009 Office Action dated Jun. 30, 2008.
U.S. Appl. No. 12/717,108 Final Office Action dated Jan. 31, 2012.
U.S. Appl. No. 12/717,108 Final Office Action dated Jul. 20, 2011.
U.S. Appl. No. 12/717,108 Office Action dated Feb. 9, 2011.
U.S. Appl. No. 14/242,664 Office Action dated Feb. 29, 2016.
U.S. Appl. No. 14/242,664 Office Action dated Aug. 31, 2015.
U.S. Appl. No. 15/391,522 Office Action dated Nov. 27, 2017.
U.S. Appl. No. 15/385,688 Final Office Action dated Feb. 24, 2020.
U.S. Appl. No. 15/866,308 Final Office Action dated Feb. 13, 2020.

ADVERTISING IMPRESSION DETERMINATION

CROSS-REFERENCE TO RELATED APPLICATIONS

The present application is a continuation and claims the priority benefit of U.S. patent application Ser. No. 15/992,014 filed May 29, 2018, which is a continuation and claims the priority benefit of U.S. patent application Ser. No. 15/285,928 filed Oct. 5, 2016, now U.S. Pat. No. 9,984,388, which is a continuation and claims the priority benefit of U.S. patent application Ser. No. 14/336,452, filed Jul. 21, 2014, now U.S. Pat. No. 9,466,074, which is a continuation of U.S. patent application Ser. No. 13/939,178 filed Jul. 10, 2013, now U.S. Pat. No. 8,795,076, which is a continuation and claims the priority benefit of U.S. patent application Ser. No. 11/241,229, filed Sep. 30, 2005, now U.S. Pat. No. 8,574,074 the disclosures of which are incorporated herein by reference.

The present application is related to U.S. patent application Ser. No. 09/780,995 filed Feb. 9, 2001 and entitled "In-Contents Advertising Method, In-Content Advertising Server, and Program-Transferring Medium for Realizing In-Contents Advertising," which claims the priority benefit of Japanese patent application number 2000-241861 filed Jul. 4, 2000 and Japanese patent application number 2000-375096 filed Dec. 8, 2000. The present application is also related to U.S. patent application Ser. No. 10/268,495 filed Oct. 9, 2002 and entitled "System and Method for Camera Navigation," which claims the priority benefit of U.S. provisional patent application No. 60/328,488 filed Oct. 10, 2001. This application is further related to U.S. patent application Ser. No. 11/240,655 filed Sep. 30, 2005 and entitled "Targeted Advertising." The disclosure of all the aforementioned applications is incorporated by reference.

BACKGROUND OF THE INVENTION

Field of the Invention

The present invention generally relates to targeted advertising, such as an advertising system and method for dynamically displaying advertisements in the context of video games (i.e., in-game advertising). More specifically, the present invention provides for the determination and tracking of advertising impressions in response to users interacting with video games having in-game advertising functionality.

Description of the Related Art

One of the many ways the advertising industry governs the success of advertising campaigns is through impressions. Impressions refer to the exposure a user has had to an ad or ad campaign. Impressions are typically indexed in to the number of times a potential consumer views a particular advertisement. For example, a print advertisement located in a kiosk in a shopping center might be viewed by 1,000 shoppers over the course of an afternoon. It could be said that the particular advertisement enjoyed 1,000 impressions as each shopper walked past the kiosk and viewed the goods or services advertised therein.

High-traffic areas offer the opportunity for additional impressions. For example, an advertising kiosk located near the entrance of a popular store in a shopping center might enjoy 10,000 impressions due to high shopper traffic whereas an advertising kiosk located near an unsuccessful store (e.g., a store going out of business) may enjoy significantly less advertising impressions. As advertisers seek to have their goods and services viewed by as many persons as possible, there is obviously a demand for advertisement placement in high traffic areas.

The same theory applies to other advertising media. For example, newspapers and magazines with high circulation enjoy increased advertising revenue because those newspapers and magazines offer the possibility for additional impressions whereas an unpopular or unsuccessful newspaper or magazine as do those publications circulated in small towns or with niche (i.e., limited) readership. An advertisement on a billboard in Times Square in New York City will similarly offer more impressions (and demand higher revenue) than a billboard located adjacent a service road in rural Nebraska.

High traffic areas or high impression opportunities thus become a valuable asset in the advertising community. Assigning value to those assets offers a challenge as it is difficult to accurately measure how many impressions a particular advertisement or advertising opportunity might offer.

For example, television relies on the Nielsen TV ratings system whereby an estimate of the number of people watching any particular television program at any particular time is provided. Based on statistical information provided by these ratings, a determination of which programs are the most watched or the most popular can be made. These programs often demand higher advertising fees as the increased popularity offers the opportunity for additional impressions. For example, the Super Bowl is one of the most watched television events; Super Bowl XVI between the San Francisco 49ers and the Cincinnati Bengals in 1982 saw almost 50% of the televisions in the United States 'tuned-in' to the game. As such, advertising 'spots' for the Super Bowl commonly demand exorbitant costs; a 30-second spot for Super Bowl XXXIV between the St. Louis Rams and the Tennessee Titans in 2000 demanded close to $2M. A similar supply-and-demand theory applies to regularly scheduled programs (e.g., sitcoms). Popular television shows will demand more advertising dollars due to the increased opportunity for advertising impressions whereas less popular shows will demand considerably less.

Other methodologies exist for measuring advertising impressions. For example, and as previously noted, television and magazines traditionally look to circulation to determine advertising rates whereas physical real-estate (e.g., bill boards) will look at a number of factors including location, size of the bill board and general traffic in the area. Radio and the audio media have similar ratings services, for example, those offered by Arbitron Inc., in conjunction with comScore Media Metrix.

Certain advertising models have significant shortcomings. For example, pop-up Internet advertisements that appear in a Web browser are generally viewed as annoying and while usually gaining the attention of the individual 'surfing' the web, also garner their disdain for the interruption of their browsing session often leading to immediately closure of the pop-up window or, as is often the case today, the use of a pop-up blocker whereby pop-up advertisements are prevented from popping-up altogether.

Other technological innovations continue to offer additional advertising challenges. For example, digital video recorders (DVR) like those offered by TiVo® provide the ability to 'skip' over advertisements by fast forwarding through the advertisement. Due to the digital nature of the television program stored on a TiVo® DVR, 'skipping' over advertisements is simple and does not involve the jerkiness, fast-forward/back-up that accompanied VHS tape recorders and video tapes.

The advertising industry is, therefore, increasingly faced with the inability to target its advertisements to individuals due to the decrease in readership in print media, unrefined advertising methodologies on the Internet and the inability to keep audiences 'captive' whereby there is a certain degree of assurance that a consumer views a particular advertisement (e.g., users can now 'skip' over ads while remaining in front of their television during a television program).

The video game industry is quickly becoming one of the last bastions of captive audience advertising. That is, the player of a video game often offers their undivided attention to the video game environment so that they may remain aware of actions taking place in the game (e.g., being attacked by an enemy, discovering a cache of weapons or treasure trove, identifying a 'lane' through which to navigate a running back in a football game). Video games, therefore, offer the opportunity for placing ads before a captive and extremely attentive audience.

There have been—and continue to be—numerous cases wherein actual advertisements of advertisers are deployed and displayed within a video game environment. A classic example is in a driving game, wherein advertisements are pasted onto billboards around a driving course as illustrated in U.S. Pat. Nos. 5,946,664 and 6,539,544, the disclosures of which are incorporated herein by reference. With such in-game advertising, the software publishing company that creates the video game identifies an advertiser, creates texture data based on ad copy provided by the advertiser and places this texture data representative of an advertisement in the video game environment (i.e., posting the advertisement on the billboard).

Online and networked gaming is increasing in popularity throughout the world. With this increase in popularity, there is an expectation that gaming networks assemble standards and evolve into an advertising channel such as television and radio. As a part of this increase and evolution, there is a need for a framework and system for advertisers and media providers to manage and track advertising in video games and other digital environments.

SUMMARY OF THE INVENTION

The present invention may be configured to provide a system and method for deploying and tracking advertisements across a video game network.

The present invention may be configured to provide a method for determining an impression area in a video game environment relative an advertisement in the environment.

The present invention may also be configured to provide a method for identifying an obstruction in the impression area and redefining the impression area based on the presence of the obstruction.

The present invention may also be configured to provide a method for verifying an advertising impression in a video game environment when a video game character is present in an impression area with an unobstructed view of a related advertisement.

The present invention may also be configured to further provide a method for determining the time a video game character is present in an impression area with an unobstructed view of an advertisement.

The present invention may also be configured to provide a system for determining when an advertising impression has been made in a video game environment.

The present invention may also be configured to provide a system for processing a payment based on the presence of a video game character in an impression area in a video game environment.

The present invention may also be configured to allow advertisers to identify popular games and/or effective advertisements to allow for the establishment of proper pricing models, receive feedback on their products, market to various segments and deploy custom programming relating to advertising campaigns in an adaptable in-game advertising network.

DETAILED DESCRIPTION OF AN EXEMPLARY EMBODIMENT

Figure 1:
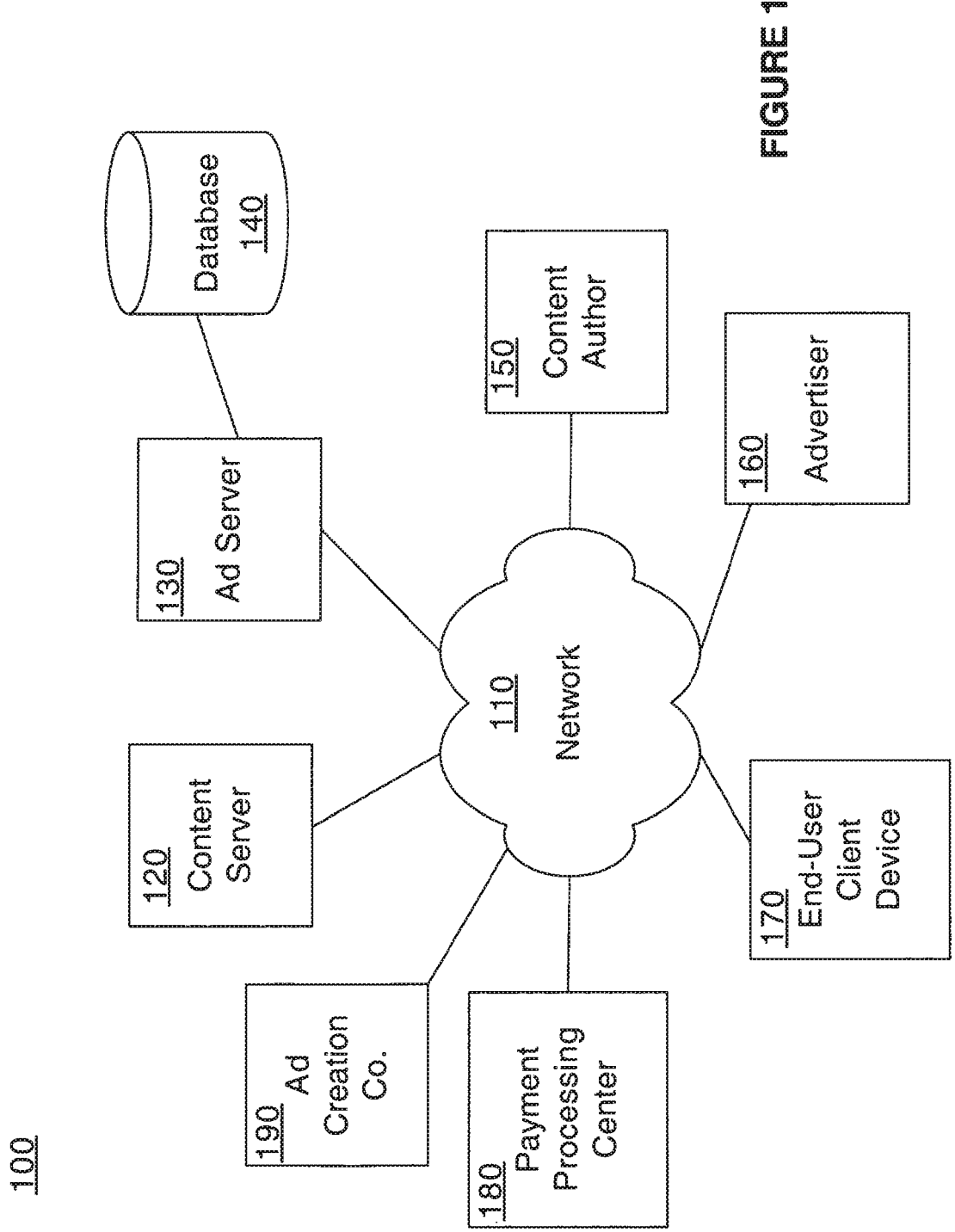
FIG. 1 illustrates one specific exemplary in-game advertising system as may be utilized in an embodiment of the present invention.

FIG. 1 illustrates an exemplary in-game advertising system 100 as may be utilized in an embodiment of the present invention. The in-game advertising system 100 of FIG. 1 comprises a network 110. Network 110 may be, for example, a cable television network, a broadband wireless network or on optical fiber network. The present invention does not impose any limitation with regard to the particular type of communication medium(s), whether the network is homogeneous (e.g., end-to-end wireless) or whether the network is proprietary, open or a combination of the two. Network 110 only need provide the means to communicate amongst the various servers and/or terminals coupled to the network 110 and make up the advertising system 100 of an embodiment of the present invention. Network 110 may be a communications network, a data network or a combination of the two.

As shown in FIG. 1, communicatively coupled to the network 110 is a content server 120 as offered by a content provider 120; an advertising server 130 as offered by an advertising agency, the server comprising or coupled to an advertising database 140, the advertising database 140 comprising advertisement information data. The exemplary system 100 illustrated in FIG. 1 further comprises content authors $150_1 \ldots 150_N$; advertisers $160_1 \ldots 160_N$; and end-user client devices $170_1 \ldots 170_N$. Some embodiments of the present system may further comprise a payment processing center 180 and an advertising content creator 190.

The content server 120 may distribute digital content. Content may be requested from networked devices operating in a gaming network. In one embodiment, the content is requested by end-user client devices $170_1 \ldots 170_N$. The content distributed by content server 120 may comprise video game content (e.g., actual video games, or portions thereof, accessed by end-user client devices $170_1 \ldots 170_N$) as well as other forms of digital media (e.g., music and video). The content server 120 may further provide for the storage of digital content. The content server 120 may store such content locally (e.g., as part of a storage area network) or at a location physically remote from the content server 120 but otherwise communicatively coupled to the server 120 thereby allowing for retrieval and transmission of the content to end-user client devices $170_1 \ldots 170_N$. Content served by the content server 120 may be served as the result of a push or pull operation.

The advertising server 130, as previously noted, may be managed by an advertising agency providing for the distribution of advertising content to larger audiences (e.g., end-users). The advertising server 130 may serve audio, video, audio/video and still image content. Content served by the advertising server 130 may be served as the result of a push or pull transaction. Advertising database is a storage mechanism for advertising content such as the aforementioned video and audio content. While advertising images are the most prevalent type of advertising content, advertising content may further comprise element types such as programs, objects, state data, control data, textures, bitmap images, compressed images, sequencing data, authentication data, public key and private key. Advertising database 140 may be integrated with advertising server 130 or may be physically remote from the advertising server but otherwise providing a communicate coupling allowing for the retrieval of content from the database 140 for subsequent transmission to end-user client devices $170_1 \ldots 170_N$.

Content authors $150_1 \ldots 150_N$ are those entities that develop content for distribution to end-users, for example, video games. Content authors $150_1 \ldots 150_N$ may also develop audio, video and/or audio/video content. Content developed by content authors $150_1 \ldots 150_N$ may be generated in any form of media. For example, content may be developed in an optical disk format or in non-volatile memory such as a flash card. Content may also be provided in a pure data format to be transmitted and hosted by another party. For example, content author $150_1 \ldots 150_N$ may develop a video game but never commercially distribute the content in a physical form of media. Instead, the content may be FTP'd or otherwise transmitted to content server 120 and stored in an appropriate storage means for subsequent delivery to end-user client devices $170_1 \ldots 170_N$.

Advertiser $160_1 \ldots 160_N$ is any entity seeking to place an advertisement in the digital content created by content author $150_1 \ldots 150_N$. Advertiser may be from any field of endeavor and need not necessarily be in the entertainment or video game industry.

End-user client devices $170_1 \ldots 170_N$ are those devices allowing an end-user to access digital content. For example, in the case of a video game, the appropriate end-user client device $170_1 \ldots 170_N$ may be a home entertainment video game system such as a PlayStation3 from Sony Computer Entertainment Inc. In the instance of digital content being, for example, an on-demand movie or other video program, the end-user client device $170_1 \ldots 170_N$ may be a set-top cable box. End-user client device $170_1 \ldots 170_N$ may, in other instances, be a portable device that may be temporarily coupled to a more permanent device (e.g., a desktop computer) to allow for the transfer or updating of digital content via a USB cable as would be the case in, for example, a portable music device such as an MP3 player.

Optional payment processing center 180 allows for the execution of various payment and/or monetary transfer transactions. These payments may be achieved, for example, through direct deposit, automatic funds or wire transfers as is appropriate and/or available. Payment processing center 180 may, for example, be a bank offering these services. In another example, payment processing center 180 may be an on-line escrow agent communicatively coupled to a variety of banks wherein the escrow agent instructs and/or receives notice of various monetary transactions on behalf of various entities in the exemplary in-game advertising system 100 (e.g., advertisers $160_1 \ldots 160_N$ and content providers authors $150_1 \ldots 150_N$).

Advertising content creator 190 is an entity that authors and/or develops advertisements on behalf of advertisers $160_1 \ldots 160_N$ for placement into digital content. In some instances, advertising content creator 190 may only digitally author content. For example, certain advertising copy (be it audio, video, print or any combination of the three) may have already been created in a non-digital format. In those instances, advertising content creator 190 would manipulate (e.g., digitize) the advertising copy so that it may be placed into the greater context of digital content that is offered by the content server 120. In other instances, advertising content creator may take a script for an advertisement and create the same (e.g., film video, record audio and then combine the two with various special effects). Advertising content creator 190 may also utilize program objects and program scripts including commands related to special effects, program elements, control signals, messaging and various protocols. In still other instances, advertising content creator may develop advertisement campaigns from scratch (e.g., the advertising concept for a campaign) and subsequently create the ad content to correspond to that campaign.

Figure 2:
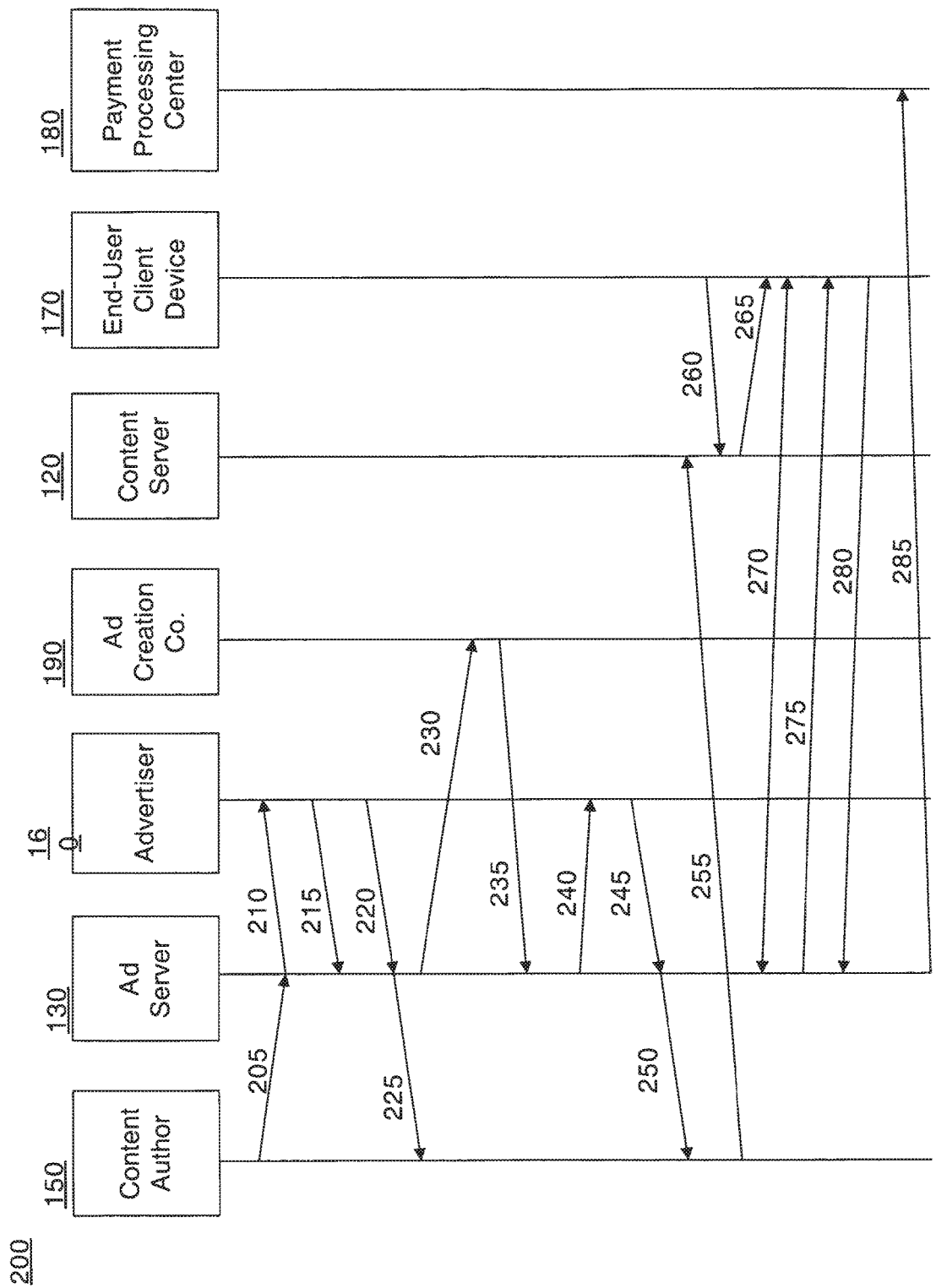
FIG. 2 illustrates one exemplary flow of communication between members of the in-game advertising system as illustrated in FIG. 1.

FIG. 2 illustrates an exemplary flow of communication 200 between members of an exemplary in-game advertising system 100. The content author $150_1 \ldots 150_N$ provides the advertising server 130 with advertisement structure information in step 205. The content and makeup of advertisement structure information is discussed in the context of FIG. 4. The advertisement structure information is registered in the advertising database 140 of the advertisement server 130. The operator of the advertisement server 130 informs the advertiser $160_1 \ldots 160_N$ of advertisement information such as title, contents, etc., of a newly-registered title in informing step 210. Informing of the advertiser $160_1 \ldots 160_N$ may occur by traditional mail, electronic mail, listservs, SMS, instant messenger, chat or any other available communication medium.

The advertiser $160_1 \ldots 160_N$ can access the advertisement server 130 and can view the advertisement information in viewing step 215 and further apply for an advertisement buy from, for example, a web-browser screen in application step 220. Once the advertisers $160_1 \ldots 160_N$ have been established, advertiser specified information such as advertiser name, time slot, and time period of an advertisement are provided to an appropriate content author $150_1 \ldots 150_N$ from the advertisement server 130 in notification step 225. Notification may occur by traditional mail, electronic mail, listservs, SMS, instant messenger, chat or any other available communication medium.

Advertiser specified information and advertisement structure information are also supplied to the advertisement content creator 190 via the advertisement server 130 in ordering step 230. The advertisement content creator 190 creates advertisement content (e.g., the advertisement) based on the advertiser specified information and advertisement structure information. The completed advertisement information such as bitmap data or other graphic, audio and/or video data is delivered by the advertisement content creator 190 to the advertisement server 130 in delivery step 235.

Notification of the receipt of the completed advertisement is communicated by the advertisement server 130 to the advertiser $160_1 \ldots 160_N$ in completion step 240 by traditional mail, electronic mail, listservs, SMS, instant messenger, chat or any other available communication medium.

The advertiser $160_1 \ldots 160_N$ can view the completed advertisement information on the advertisement server 130 in viewing/approval step 245. If the advertiser $160_1 \ldots 160_N$ approves of the completed advertisement content (e.g., by pressing an 'OK' button in a web-interface), the advertisement content is confirmed and an itinerary is by the advertisement server 130 to the content author 250 by traditional mail, electronic mail, listservs, SMS, instant messenger, chat or any other available communication medium in delivery detail confirmation step 250. The itinerary delivered in step 250 may comprise information related to the advertiser, time slot, period, advertising fees and so forth.

In registration step 255, the content provider 120 correlates certain advertisement information and advertisement content with digital contents to be delivered. That is, the content provider 120 recognizes that particular advertisements are to be delivered with particular portions of digital content and so forth. This correlation of information may comprise authoring new derivative files reflecting both advertisement information and digital content/advertising programs), the embedding of metadata in the digital contents or the implementation of object oriented programming wherein certain data files (e.g., digital contents/advertising programs) call upon other distinct files (e.g., advertising information). The metadata may also comprise information as it pertains to advertising information such as how long a game character must be present within an impression area defined within the video game. The metadata may further provide information defining the parameters of the impression area and certain quality factors as are discussed herein. Tracking parameters and feedback information and/or instructions may further be imbedded in the metadata of the advertisement. Such information may also be contemporaneously downloaded with the advertising information as a separate file whereby the advertising information calls upon certain information related to impressions, reporting and so forth.

A user accesses and/or requests digital content (e.g., a driving simulation video game) using end-user client devices $170_1 \ldots 170_N$ in content application step 260. As a result of the application for content, the user may start to download the content in download step 265. Alternatively, if the user already has a particular portion of the digital content, this step may involve presenting the user with an update as to that content. This step may also comprise unlocking digital content that is already in possession of the user. Step 265 may also involve authenticating removable media, accommodating registration with a game network or a game 'lobby' or 'waiting room' and so forth In some embodiments of the present invention, the user may access digital content using permanent physical media (e.g., an optical disc). The physical media may have embodied thereon instruction for accessing the present in-game advertising system 100 as it pertains specifically to advertising content versus actual video game data. In additional embodiments of the present invention, the user may access a combination of advertising content and actual game data via the exemplary in-game system 100 (e.g., new advertising content and new game levels published after the initial release of the game on physical media). Such embodiments are discussed in further detail below.

During the download of content and/or advertisements in step 265, the content provider 120 notifies the advertisement server 130 of the download request as it relates to particular advertising material in step 270, such correlations between content and advertising having previously been made in registration step 255. The advertisement server 130 then transmits the necessary advertisement data corresponding to the user download to the content provider 120 in step 275. If necessary, the advertising data provided to content provider 120 can be updated over time relative the content being downloaded (e.g., new ad copy).

After downloading the digital contents (including advertisement information or content in ad information delivery step 275), the user (through end-user client device 170) renders the advertisement information within the game contents, the advertisement information having been provided via advertisement server 130. As noted above, some embodiments of the present invention may access solely advertising information or a combination of new game content and advertising information rather than an entire game.

The state of the advertisement, such as the number of distributions or impressions made, may be provided to the advertisement server 130 and, if necessary or desired, to the advertiser $160_1 \ldots 160_N$ in advertisement status notification step 280 so that certain determinations made be made, for example, the success of an ad campaign with regard to the number of impressions made.

As a result of the notification in step 270, the advertisement server 130 can track the advertisements that have been or are being downloaded to an end-user client device 170. Utilizing certain ad impression and tracking methodologies as discussed herein, the advertisement server 130 can receive feedback in connection with advertisement impressions. Information concerning impressions or other advertisement feedback may be generated at the end-user client device 170, which has been configured with the necessary software to either directly or indirectly implement impression tracking.

Direct impression tracking may be based on software configured at the end-user client device 170 and that operates in conjunction with a game kernel and is further configured to participate in network communications such that textures and objects or indexes to textures and objects related to an advertising campaign may be received. The tracking software may directly monitor the angle and position of various advertising asserts with respect to changing camera perspectives presented to the user who controls the camera perspective utilizing a game controller. Indirect impression tracking may occur through a server or a session master client in a peer-to-peer network participating, facilitating, arbitrating or interrogating functions associated with the campaign program (e.g., extraction of data necessary to yield the determination of an ad impression). Hence, ad impression determinations may occur at, for example, ad server 130 or advertiser 160 in response to information generated or signals sent from the end-user client device 170.

Ad impression data may be batched or transmitted over the network at periodic intervals. Transmission of impression data may occur in accordance with a schedule or in conjunction with other processes or transmissions used to facilitate game play. Impression data may also be streamed or pulled during an inquiry received over the network. Any network element of the advertising system 100 may facilitate or influence the transmission of impression data.

Advertisement impressions may be calculated in various ways. For example, an advertisement located in a virtual kiosk in a virtual shopping center might be viewed by 1,000 gamers over the course of an afternoon. It could be said that the particular advertisement enjoyed 1,000 impressions as each gamer walked their gaming character past the kiosk and viewed the goods or services advertised therein. Impressions may also be calculated through a time threshold index. For example, an impression may be earned, triggered, counted or computed after a user has been exposed to the advertisement for a particular period of time. In this example, an impression may occur after 30 seconds of exposure by the user to an advertisement. The impression may also be tracked and computed based on one or more user's continuous or distributed exposures to the advertisement on the virtual kiosk or as part of an overall ad campaign.

The advertisement content receiving, impression tracking and impression data feedback transmission systems of the present invention may reside in a single software element or in multiple software elements. Software elements may be distributed in whole, or part, on one or more processors or across a local or wide area network.

Impression tracking software may be provided as a result of downloading a necessary software module during download step 265 or the software having been installed directly on physical media (e.g. an optical disk) read by the end-user client device 170 or, alternatively, installed directly in the end-user client device 170. Tracking software or various components of the software may also be installed in the various other components of the advertising system 100 dependent upon the particular configuration of an embodiment.

Similar or identical advertisement state information may be provided to content author $150_1 \ldots 150_N$. This notification is made so that the advertiser $160_1 \ldots 160_N$ may be properly invoiced by the contents author $150_1 \ldots 150_N$ in accordance with any number of payment plans as are discussed herein. The advertisement server 130 may further provide this information to payment processing center 180 to allow for automatic billing and payment in step 285. These payments may be achieved, for example, through direct deposit, automatic funds or wire transfers or any other money transfer methodology as is appropriate and/or available.

The advertising system 100 and methodology of the present invention and as described in an exemplary embodiment through FIGS. 1 and 2 may be implemented over various communication and data networks.

Figure 3B:
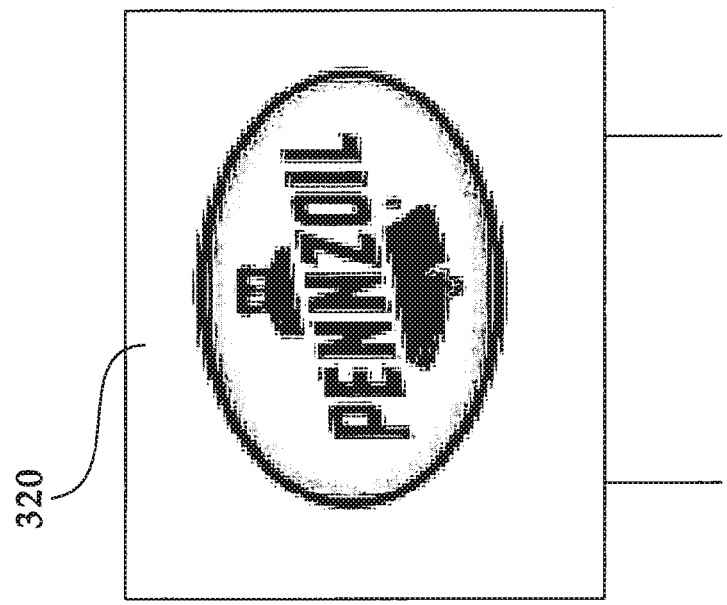
FIGS. 3A and 3B illustrate the exemplary tagging of assets in a video game environment.

It should be noted that in some embodiments of the present invention, certain elements of the in-game advertising system 100 may be combined or removed from the system 100 entirely without compromising the operations of the system 100. For example, an embodiment of the in-game advertising system 100 as described herein may function without the need for a payment processing center 180 as proper remuneration of parties in the system 100 may have been established before hand or subject to analysis of certain information after advertisement delivery. Similarly, the ad server 130 and related database 140 may be operated in conjunction with the advertisement content creator 190 or with content provider 120. Various approval and notification steps may also be omitted in the course of FIG. 2 so long as ad buys remain reserved, as is discussed in the context of tagging in FIG. 3, and the proper advertisements delivered relative those tagged assets. Additionally, exchanges of data or various notifications described above may be of a dual-direction or exchanged between various components of system 100. For example, various notifications may be delivered to the ad server 130 in addition by the ad server 130. In that regard, the present invention is not meant to be limited by the exemplary data flows as depicted in FIG. 2 of the present invention.

While FIGS. 1 and 2 illustrate an in-game advertising system 100 wherein content and advertising were both provided to an end-user client device 170 over network 110, in some embodiments, a user may play game as embodied on a physical media such as an optical disk as may be utilized in, for example, a PlayStation3 gaming console or for use in a desktop computer (e.g., to be inserted into a CD-ROM drive). In these instances, various libraries related to the game (e.g., character generation, user interfaces, recognition of user controls and so forth) may be authored and stamped directly onto the physical media instead of accessed or downloaded via content provider 120.

In such an embodiment, advertising content may be embodied on the physical media as well. As has been previously noted, however, such advertising schemes may be ineffective if the popularity of a game turns out to be overrated (wherein an ad buy was likely overpriced) or underrated (wherein an ad buy was likely under priced). Similarly, the relevance of certain advertisements may expire over the course of time (e.g., an advertised event occurs, the advertiser stops selling the product or goes out of business or the advertisements are mock advertisements pertaining to a fictitious product but remain relevant in the context of the game despite the passage of time).

In such physical media, a software client may be embodied in the physical media, the client comprising the operating routines, resources, instructions and so forth that allow an end-user client device 170 reading the optical media or other physical media to access the in-game advertising system 100 like that described in the present invention. Although the user may not necessarily be receiving video game content (e.g., the user does not download or directly access code and other information related to the actual game), the user may still receive advertising content as the client pertains to the instructions and operations necessary to access in-game advertising system 100 and for advertising content to be provided to the system 100.

Through the provision of such an advertising client on physical media, it becomes possible for a variety of parties that develop games that operate on a particular end-user client device (e.g., the PS3 game console) to interact with the in-game advertising system 100. Access to the advertising client code may be subject to a fee charged by the in-game advertising system 100 operator, the costs of which may be recouped by the third-party game developer who passes those costs onto advertisers $160_1 \ldots 160_N$ that might wish to place content in a particular video game as the popularity and advertising value of that game is assessed.

Figure 3A:
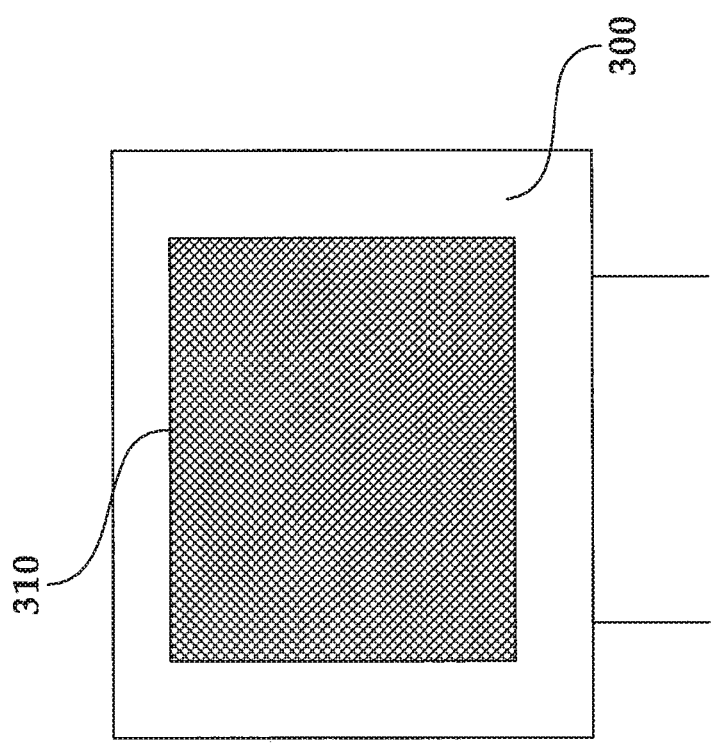

In order to enjoy the advertising opportunities offered by such a system like that described in the present invention, certain objects in a video game may be 'tagged' as subject to advertising. For example, and as shown in FIG. 3A, the face of a billboard 300 may be 'tagged' 310 to indicate that an advertisement may be embedded in that location. In this way, the in-game advertising system 100, via the advertising client embodied in video game software, may identify these tagged assets and provide advertising content that may be imposed through texturing or other graphic rendering techniques that make it appear as if the advertisement was designed specifically for the billboard as shown FIG. 3B (320). Such advertising content may be pushed or pulled to the video game environment at an end-user client device 170 via the advertising server 130.

Alternatively, advertising content may be loaded into a game during development and specific advertising campaigns may be purchased after the release of the game. In such an embodiment, advertisement purchases trigger signaling event that index specific ads embedded in a game and unlock the advertisements. The ads are then associated with one or more tagged advertising assets. Preloaded advertisements may be replaceable in whole or in part over the network by a server or via a peer-to-peer arrangement. The replacement of advertisements may occur based upon a user profile, user interaction with an advertisement or ad campaign, geographic location of the user or control signals, messages or communications in connection with the advertisement.

Tags reflect not only the space where an advertisement may be placed but may also reflect information such as size limitations, coloring and shading requirements, pointers to variables that track state and impression data, functions and programs associated with the advertisement, hyperlinks and mini-games associated with the advertisement, user-profile filters and, in some embodiments, even advertising relevance. It should be noted that the said functions and programs associated with the advertisement may access variables that track state and impression data. Tags may be numbered to reflect individual assets wherein advertisements may be imposed or grouped to reflect that one particular advertiser $160_1 \ldots 160_N$ should have one or more of their advertisements placed in these tagged groups (e.g., all billboards on a city block). The tagging of assets and rules related to the tagging of assets may be imposed by content author 150. Rules embedded in the tagged assets (e.g., ad size) may be recognized by advertisement server 130 to ensure that the proper advertising content is delivered to these tagged areas when called upon in the in-game advertising network 100.

Impressions of or exposure to advertising asset tags are capable of being tracked independently or as a group. Additionally, impressions of or exposure to advertising asset tags are capable of being aggregated against a particular end-user device, versus a particular game or across a network in general. For example, an advertising server 130 may receive ad impression information relating to impressions of specifically tagged assets (e.g., billboard A, billboard B, billboard C, etc.) or assets as they apply to a particular advertiser (e.g., Coke, Pepsi or Sprite) at an end-user device or a plurality of devices. Impressions and exposure may also be aggregated as they pertain to a particular game whereby the number of impressions generated for a particular advertiser in a particular title are determined regardless of the particular asset on which the advertisements were placed. Similar aggregation of impression data can occur across an entire network regardless of the particular game title whereby the total impressions for a particular advertiser are determined against all end-user client devices communicating with the advertising network/system 100. Other aggregation parameters may be utilized at the particular needs of an advertiser.

Tagging is not limited to 'print-like' advertisements (e.g., a billboard). Tagging can also be related to other visual formats such as audio and video. For example, a television in a video game may be tagged as to reflect that the user tuning the television to a particular channel will cause a full motion video advertisement to be streamed. Various other advertisements could be streamed or rendered on additional channels subject to the whim of the game designer and the extent of tagging of assets for advertisement introduction.

Similarly, audio may be tagged for advertising purposes. For example, if a user plays a video game with a radio (e.g., driving an automobile), the game designed can create different channels whereby actual music from actual artists is played interspersed with various advertisement that one might hear over the radio. Similarly, the actual music a user listens to may be Top 40 hits or other popular music rather than a one-time generated, static soundtrack. In that way, the user may play the game today or five years from now and be able to listen to not only relevant advertisement but relevant music that is current and popular the day the user plays the game. Similar attributes may be reserved for providing real-time television programs and the like (e.g., short films, movie previews and so forth).

As a result of tagging and the delivery of relevant advertisements into the user's game environment, tracking of advertisements may take place. That is, through in-game advertising system 100, it may be determined exactly how many times a particular advertisement was introduced to an end-user client device 170 subject to any variety of conditions (e.g., nationwide ad buys over the gaming network or geographic or targeted advertisements). Additionally, and as described in FIGS. 10 and 12, for example, it may be determined how many actual impressions of that advertisement occur.

It should be noted that while most networks and computing devices can provide nearly instant rendering of dynamic advertising information, to identify a particular portion of an environment where such dynamic content may be rendered (e.g., identifying a tag), sending relevant information to the advertising server 130 and retrieving the relevant advertising information may take several seconds. If a user has a slow or congested communications network or a computing device with slower processing power, rendering of that dynamic information may take even longer. If extended delays in rendering information result or, worse, stagnation of game play to wait for the rendering of the dynamic advertising information, user's may lose interest in the video game or seek to deactivate the dynamic advertising aspects of the game.

As such, it is necessary for video games to identify references points in the video game environment (e.g., physical points in the video game or subject to the accomplishment of certain tasks or reaching a certain level) to determine when the in-game advertising system 100 should begin to be accessed to acquire the necessary advertising information. For example, while a user may not have yet reached a billboard tagged to render advertising information, the user may have surpassed a reference point earlier in the game such the content begins to load in the background to provide for instant rendering when the user finally does reach the billboard. An example of such dynamic loading methodology is described in U.S. Pat. No. 6,764,403, which is incorporated herein by reference.

Figure 4:
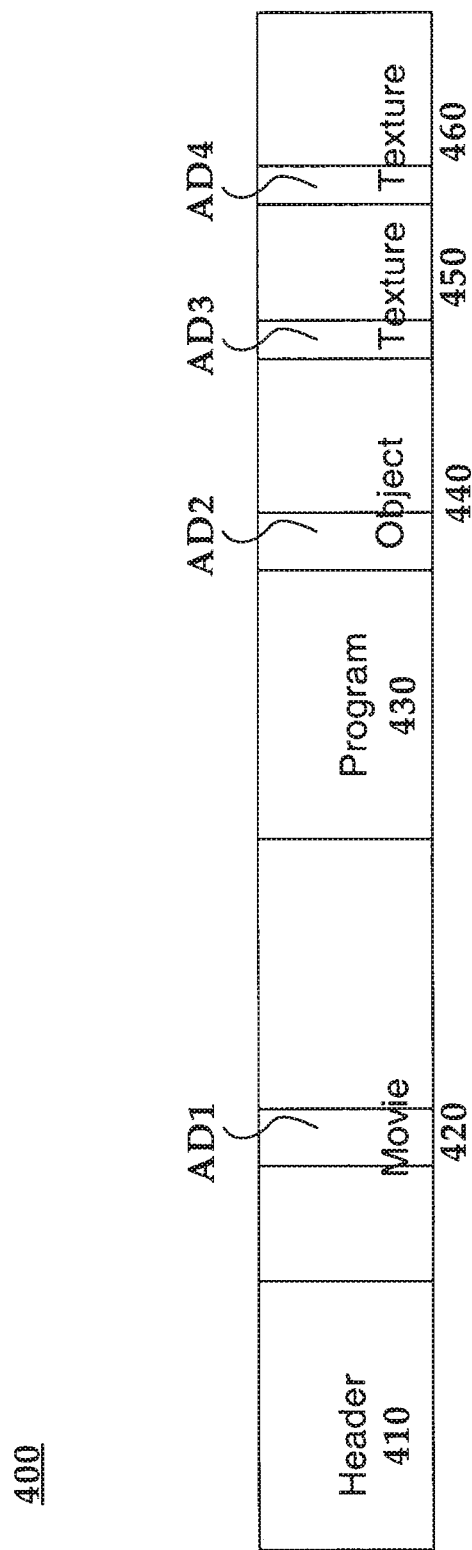
FIG. 4 illustrates exemplary advertising structure information as may be used in an embodiment of the present invention.

FIG. 4 illustrates exemplary advertisement structure information 400 as may be utilized in an embodiment of the present invention. As illustrated in FIG. 4, advertisement structure information 400 comprises a header 410 identifying the content author 150, movie content data 420, which may be a few frames to the entire production, game program data 430, object data 440 and multiple sets of texture data 450-460.

Certain embodiments of advertisement structure information 400 may be abbreviated, that is, it comprises demonstration or short previews of larger portions of content (namely movie content 420 and game program data 430). In other embodiments, only game program data 430 may be present, for example, for game downloads in the context of the present in-game advertising system 100. In even further embodiments, for example, wherein physical media comprises game program information, only header 410 and certain ad information may be present.

Object data 440 comprises coordinate values of information of objects in a game environment, those objects made up of polygon apex data or the like. Texture data 440-450 comprises pattern data of the object data converted from three-dimensional data to two-dimensional data through various conversion techniques known in the art. For example, object data 440 may related to a race car, texture data 450 and 460 would relate to color patterns and logo advertisements on the race car.

In an embodiment of the present invention utilizing advertisement structure information 400, advertisement information $AD_1$ . . . $AD_4$ is embedded in the structure information 400. $AD_1$ may comprise information such as a code indicating that advertisements may be inserted, the nature of the advertisement to be inserted, or information pertaining to frames, resolution and so forth. This data may be linked to the advertisement server 130 whereby advertisements are inserted into a game environment. Advertisement information $AD_1$ . . . $AD_4$ may also be embedded in physical media should it be necessary to download content as is described in certain embodiments of the present invention.

Figure 5:
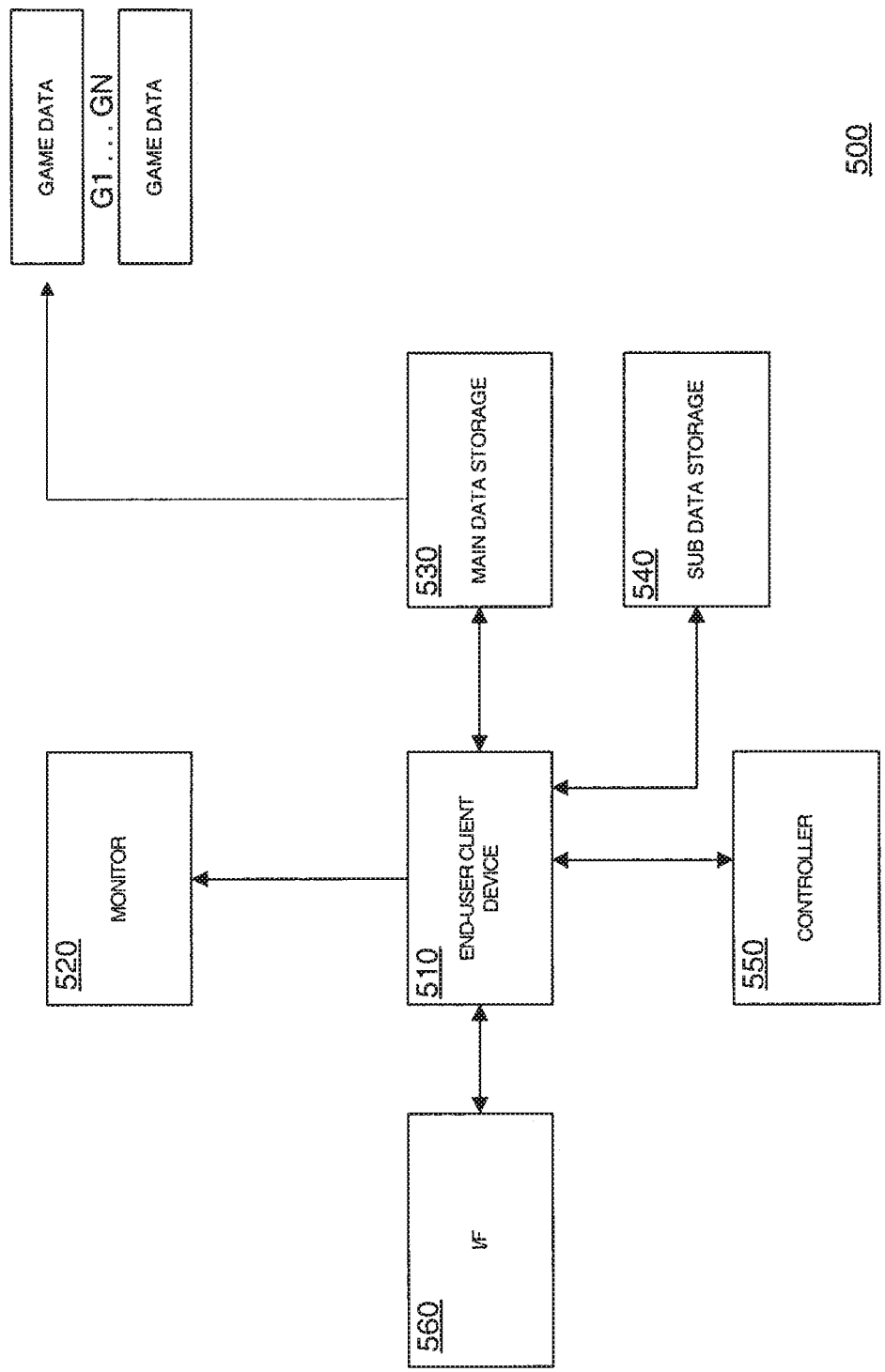
FIG. 5 illustrates an exemplary end-user client device as may be used in an embodiment of the in-game advertising system of FIG. 1.

FIG. 5 is a block diagram illustrating an exemplary end-user client device 500 ($170_1$ . . . $170_N$). End-user client device $170_1$ . . . $170_N$ comprises a user terminal 510, monitor 520, main data storage 530, sub-data storage 540, controller 550, and network interface 560 that coupled the device 500 to network 110. In an entertainment system represented by a home computer, the main data storage 530 may comprise a hard disk drive or a high-speed optical disk drive or the like. Sub-data storage 540 in such an embodiment may comprise flash memory. Game data $G_1$ . . . $G_N$ comprise advertisement information $AD_1$ . . . $AD_4$ (as described in FIG. 4) and is stored in the main data storage 530.

Figure 6:
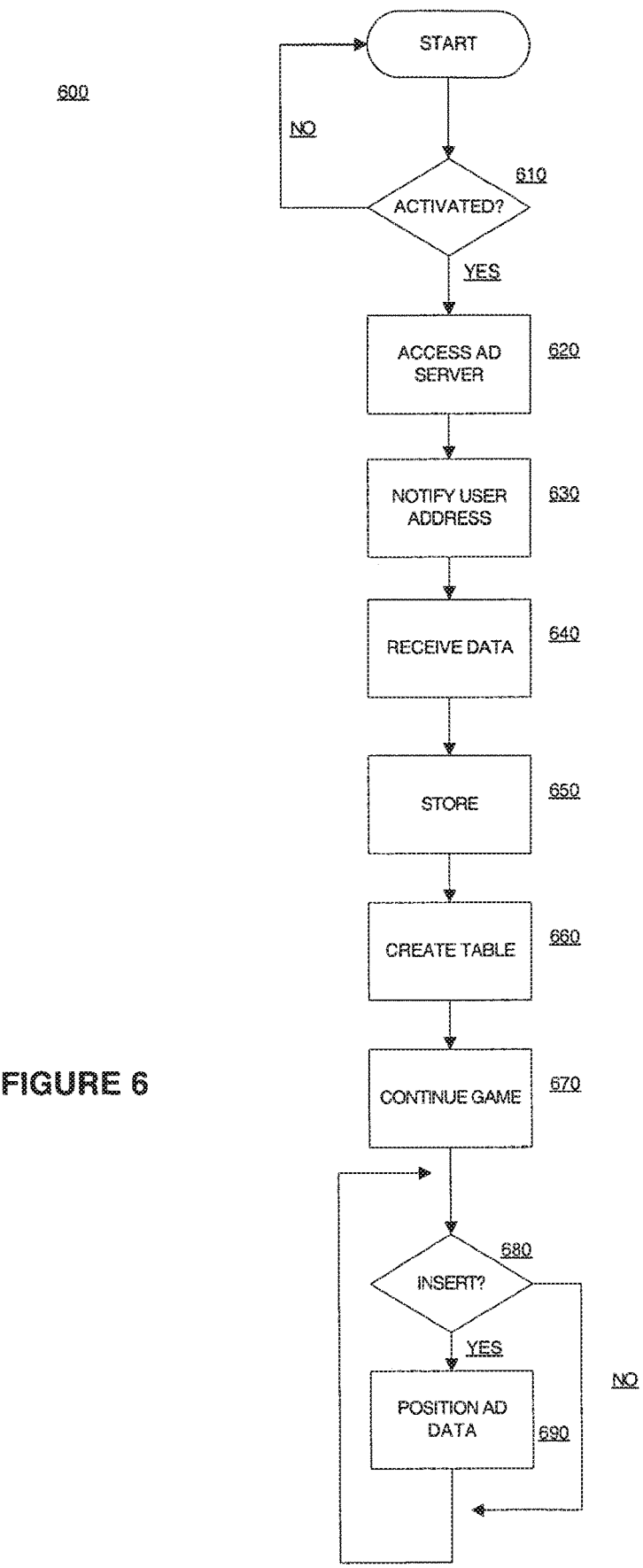
FIG. 6 illustrates an exemplary method of in-game advertising upon activation of game program comprising tagged assets for advertising.

FIG. 6 illustrates a method 600 of in-game advertising upon activation of game program (e.g., a downloaded program or one embodied in a physical media) comprising tagged assets for advertising.

In optional step 610, a determination may be made whether a game program comprising tagged assets has been activated. Once the digital contents have been downloaded or accessed on physical media via end-user client devices $170_1$ . . . $170_N$, an advertisement delivery program on advertisement server 130 may be contacted to request advertising content. If an end-user client device 170 operating a game program with tagged assets has not been activated, the server 130 can await a request or indication delivery of content is or will be necessary. If such a program has been activated, the advertising program may access the advertising server 130 in step 620 and, in step 630, make notification of the title of the digital contents activated on the end-user client device 170 user address (e.g., a network address). Depending on the nature of the advertising content to be delivered (e.g., targeted advertising as discussed herein), the advertisement server 130 reads out the advertisement data in advertisement database 140 and transfers this content to the user's address. In step 640, the end-user client device 170 receives the advertising data under control of the advertising program, records this in the main data storage 530 (FIG. 5) in step 650, and in step 660, generates a table of information indicating addresses in the main data storage for advertisement data, and the position of the advertisement target (i.e., the tagged asset).

Once the game starts or action in the game continues in step 670, a determination is made in step 680 with regard to whether or not the tagged asset has been reached in the game environment; that is, has the user reached the position for inserting advertisement information. If the determination is YES, in step 690 the corresponding advertisement data is positioned at the corresponding position in the memory (i.e., the tagged asset). In some embodiments, it may not be necessary for advertisements to be inserted during game play as tags may be associated with advertising content upon game commencement, upon a level change or in response to a control signal relating to an in-game advertising event.

As has been previously noted, advertising information may be dynamically loaded prior to the content being needed. Larger advertising data—for example, full motion video or audio—may be stored in main memory 530 or a graphics engine buffer (not shown) before action in the game commences. Other embodiments may place object data and/or texture data in the main memory 530 either immediately before the game action starts or before the data is used.

Figure 7:
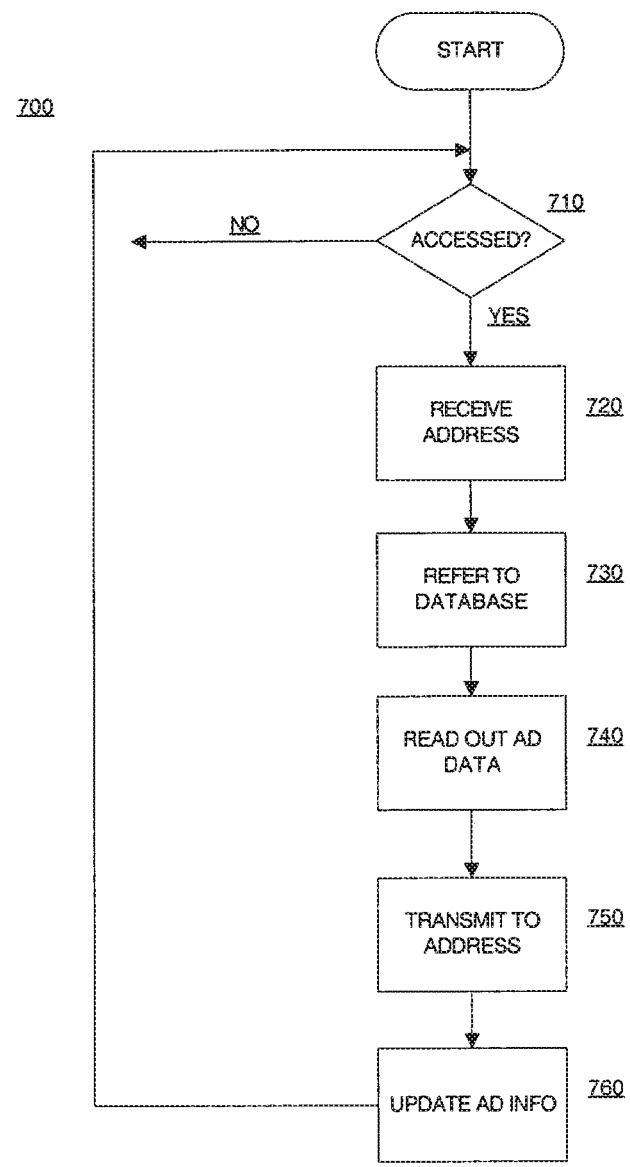
FIG. 7 illustrates an exemplary advertisement output method when game data is provided to a video game client device.

In FIG. 7, an exemplary method 700 for the operation of an advertisement server 130 wherein advertising data is requested by the advertising program is illustrated. In step 710, a determination is made regarding whether or not there is access from the end-user client devices $170_1$ . . . $170_N$ and in the event this determination yields YES, the title of the digital contents and the user address is received from the terminals end-user client devices $170_1$ . . . $170_N$ in step 720, the advertisement database 140 is referred to in step 730 wherein advertisement data corresponding to the title of targeted advertising is read out in step 740. The advertisement data is transmitted to the end-user client devices $170_1$ . . . $170_N$ indicated by the user address received in step 750 and a transmission record for the advertising data is created and/or updated in step 760. This record reflects the number of times an advertisement is pushed to a user and/or, depending on feedback from the game environment, the number of impressions of that advertisement that occur whereby calculations as to payment or future valuation may be made.

The presently described in-game advertising system 100 may also be utilized to provide for the targeting of advertisements. Providing information over a communications network requires proper addressing of that information to an end-user. For example, a network address (e.g., an Internet Protocol address) may be static and assigned to a particular user. Identifying the actual user assigned to this address may be achieved through the network service provider (e.g., an ISP) that is assigned the network address and aware of the address of that user. Alternatively, a user may register with a content provider (e.g., an on-line gaming network), which may require providing specific information (e.g., name, e-mail, billing address and so forth).

In the case of acquiring end-user information from a network provider (e.g., through a commercial information sharing agreement), the acquired information may reflect billing information (i.e., certain geographic information). Similarly, registering with the content provider may reflect certain geographic information of the user (e.g., billing information). As a result of this geographic information, an advertiser may target geographic or region-specific advertisements.

For example, an end-user that resides in Boston may have little interest in receiving information concerning New York Yankee season ticket sales. Similarly, there would likely be little value to advertise a regional product or service such as a restaurant in New York to someone who resides in San Francisco where that product or service is not offered. National advertising campaigns concerning a regional product or service would likely be ineffective relative a return on the advertising investment and may annoy the user receiving those advertisements, because the user may have no interest/access to the product or service being advertised. In contrast, a user in San Francisco might have interest in receiving advertisements related to San Francisco Giants season ticket sales or a concert in the area; that is, geographically relevant advertisements.

By acquiring geographic information of a user (either through direct registration or a service provider), advertisements can be targeted so that the appropriate advertisement is directed to the user. In this way, advertising dollars are ensured a greater return on investment. For example, products localized to Boston are advertised to persons living in the Boston area and products specific to San Francisco are advertised to persons residing in the San Francisco area.

Geographic information may also be inferred from other available information. For example, an IP address may identify a particular region of a country through geo-location. While geo-location via an IP address is not as accurate as explicit registration with a service provider, it provides a greater degree of accuracy than would blind advertisement campaigns. Thus, even dynamic IP addresses that are not consistently associated with any particular user (but instead a service provider who may recycle the address amongst a group of users) may have some advertising value due to geo-location techniques. Geographically-specific advertisements may be provided to the geo-located user, although there remains the possibility that such advertisements may be less accurately targeted than an advertisement with a specific geographic affiliation.

Advertisements may also be more accurately tracked with regard to actual impressions thereby allowing for more accurate determinations of advertising campaign value or proper remuneration to a provider of the advertisement relative those impressions. For example, an advertisement may have 1,000,000 impressions over a 2 week period. While this number may be impressive in a vacuum, when it is learned that 75% of those impressions occurred in a geographic region where the product or service is unavailable, the number of impressions becomes much less valuable. Many of the impressions were wasted on portions of the consuming public that will not or, perhaps even worse, cannot purchase the service or product. Thus, an advertiser can purchase a particular number of impressions with the caveat that those impressions be within a particular geographic region to count against a total overall ad buy.

Direct targeting of users may also take place using variations of the aforementioned identification methodologies. For example, in the registration scenario, a user may provide certain 'likes' or 'dislikes' in a user profile generated during the registration process. A user may indicate favorite sports teams, favorite hobbies, and the like. As a result of the user profile reflecting that a user is a Boston Red Sox fan, the user may be presented with certain advertisements that relate to World Series Memorabilia from the Red Sox 2004 World Series victory, and not a compilation of the New York Yankees World Series victories. Similarly, a user that identifies an affiliation with the San Francisco 49ers may receive 49er related advertisements instead of advertisements related to the Oakland Raiders. Alternative or more generic profile factors may also be implemented and/or utilized as are available and/or relevant to a particular advertiser.

This type of targeted advertising may be extremely useful when a product or service is available nationwide but has limited popularity or sales in particular regions. For example, a product may be available over the Internet (e.g., through Amazon.com) but also available at a number of brick and mortar stores in one particular region of the country (e.g., the West Coast). A user on the East Coast might purchase these products if he was aware of particular sale opportunities or new product releases. If that user does not live on the West Coast where an advertising campaign is in effect, however, they may never receive advertisements related to that product as advertising dollars have been allocated to a in the locale where brick and mortar stores are located. If the East Coast user indicated an affinity for a particular product in a profile, advertisements can be presented to this user via the in-game advertising system 100 even though the user lives in a region where product sales are otherwise low and advertising (in traditional media forms) is low or entirely non-existent. Through such targeted advertising, not only are impressions generated amongst able buyers, but also amongst willing and highly interested buyers making each impression all the more valuable.

Certain learning intelligence may also be implemented to aid in the direct or geographic targeting advertising process. For example, a game user may participate in an on-line baseball league. Registration for that league may be limited solely to a user name and billing information. If the user resides in Southern California, it would be (as a broad-based assumption) unlikely for this game user to be a fan of the Florida Marlins and (as another assumption) probably a fan of the Los Angeles Dodgers or the Anaheim Angels. Such assumptions may prove to be false.

But if the same user, via the on-line baseball league, continually selects the Florida Marlins as his team of choice, the in-game advertising system 100 may recognize the repetitive behavior (e.g., the selection of a particular team, or a particular character in a game). Based on the repetitive behavior of the user, an assumptive profile of a user may be generated.

Further, if the user plays the networked/on-line baseball league fifteen times and elects to play with the Marlins fourteen of those times, it would be an intelligent assumption that the user is a Marlins fan even though the user lives in Southern California. As a result, certain advertisements in the game environment may be directed toward fan merchandise for the Florida Marlins, instead of for the Dodgers or a random advertisement.

Such targeted advertising is not limited to favorites or affiliations of the user. Direct targeting may also utilize demographics such as gender, age, and the nature of the game itself. Gender may be specifically identified or presumed based on the content of a video game. Age may be based on a specific identification or a presumption related to the maturity of a particular game. The nature of the game itself may indicate demographic information of the user or relevant advertising content. For example, a sports game may generate sports advertisement whereas role playing games may generate advertisement specific to the nature of the game such as combat or fantasy. Various combinations or subsets of targeted advertising may also be utilized (e.g., age and gender relative a particular genre of video game).

These intelligent determinations or analyses based on various demographics may take place at the advertisement server 130 via an appropriate software module providing for such deductive or intelligent determinations.

It should be noted that the present disclosure describes numerous inventive components that may operate individually or with other inventive components outlined herein. One such inventive component—tracking what advertisements the user sees—involves monitoring the view perspective of the user (e.g., the point-of-view of the game character or of the actual user via a game camera) and calculating when the user has experienced an ad impression. One embodiment of this method further allows for object occlusion detection. Such impression information may then be returned to an ad server 130 or other component of the system 100 as described in FIG. 2.

Figure 8:
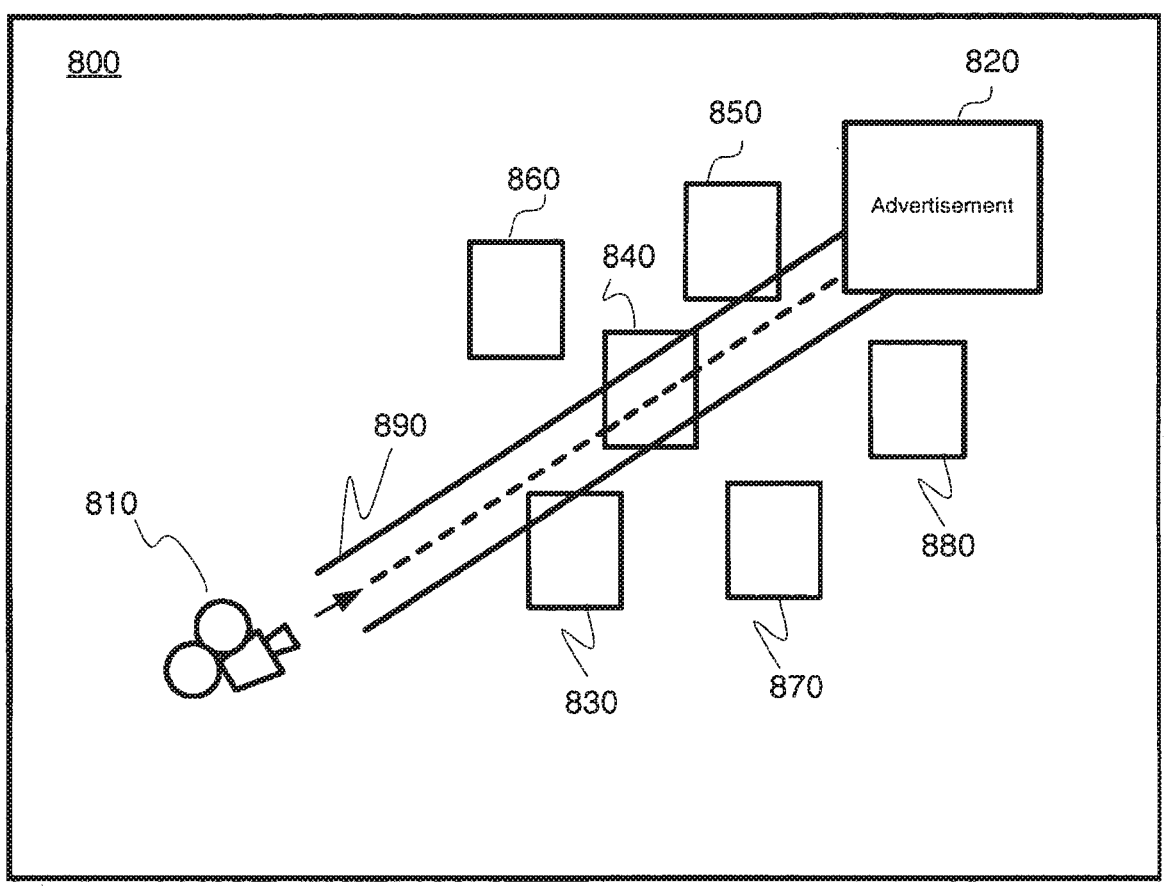
FIG. 8 illustrates line-of-sight obstacles as may be found in a video game environment, in one embodiment in accordance with the present invention.

FIG. 8 illustrates line-of-sight obstacles as may be found in a game environment 800. FIG. 8 illustrates a game character 810 (as reflected by the camera icon), an advertisement 820, one or more obstacles 830-880 and line-of-sight 890 relative the game character 810 and its current viewing orientation to the advertisement 820. It should be noted that any references to a game character in the present disclosure is also inclusive of a game camera as to include various points-of-view of the game character of the video game as well as that of the actual user. In one embodiment, the point-of-view is that of the actual user (player) of the video game such that the impression of an advertisement or other information is actually that of the user as would be most like an advertising impression in the real-world. Obstacles 830-880 may be representative of any object in the gaming environment 800. Walls, corners, pillars, objects (e.g., boxes, signs, rows of lockers, doors, etc.), other game characters, opaque glass or even other advertisements (that is, not advertisement 820) may be representative of the obstacles 830-880.

In an ideal advertising environment, game character 810 and advertisement 820 would be separated by an unbroken line-of-sight. That is, obstacles 830-880 would not break line-of-sight 890 whereby game character 810 (and its controlling user through, for example, a first-person game view) would have a full and uninterrupted view of and exposure to advertisement 820. Such an uninterrupted view of and exposure to advertisement 820 is desirous in that it provides for an advertising impression most like that as would be encountered in the real-world (e.g., reading a newspaper advertisement, viewing a billboard or attentively viewing a television commercial). That is, persons in the real-world are generally able to view an advertisement (or at least position themselves) such that other objects in the environment do not obscure a view of that advertisement.

But as is shown in FIG. 8, line-of-sight 890 is interrupted at multiple points by obstacles 830, 840 and 850. Obstacle 830 may be a stack of boxes whereas obstacle 840 may be a soda machine while obstacle 850 may be a corner in a hallway. The exact nature of obstacles 830, 840 and 850 is irrelevant except for the fact that they are interrupting line-of-sight 890 between game character 810 and advertisement 820. Such a scenario as illustrated in FIG. 8 is common in complex game environments such as those offered by role-playing or first-person adventure games, where users navigate through the gaming environment 800 and the objects that exist therein.

The interruption of the line-of-sight 890 as caused by obstacles 830, 840 and 850 may partially (or wholly) prevent the character 810 from viewing the advertisement 820. Depending on the exact angle of obstacles 830, 840 and 850, the character 810 may be able to see certain portions of advertisement 820, but those portions may be minimal compared to the greater portion of the advertisement 820 obscured by obstacles 830, 840 and 850. In some cases, an advertiser may have paid significant sums of money for the placement of advertisement 820 in game environment 800. However, the advertisement 820 may never be viewed as was intended by the advertiser (e.g., a full-frontal observation of the advertisement 820 for a given period of time in order to allow the game user controlling game character 810 to review and comprehend the advertisement 820). The advertiser may, therefore, have expended certain sums of money with absolutely no end benefit as the user of the game (via character 810) did not view the advertisement 820. This lack of an advertisement impression results even though character 810 is actually standing directly in front of advertisement 820 and has their line-of-sight 890 oriented in the same direction.

Figure 9:
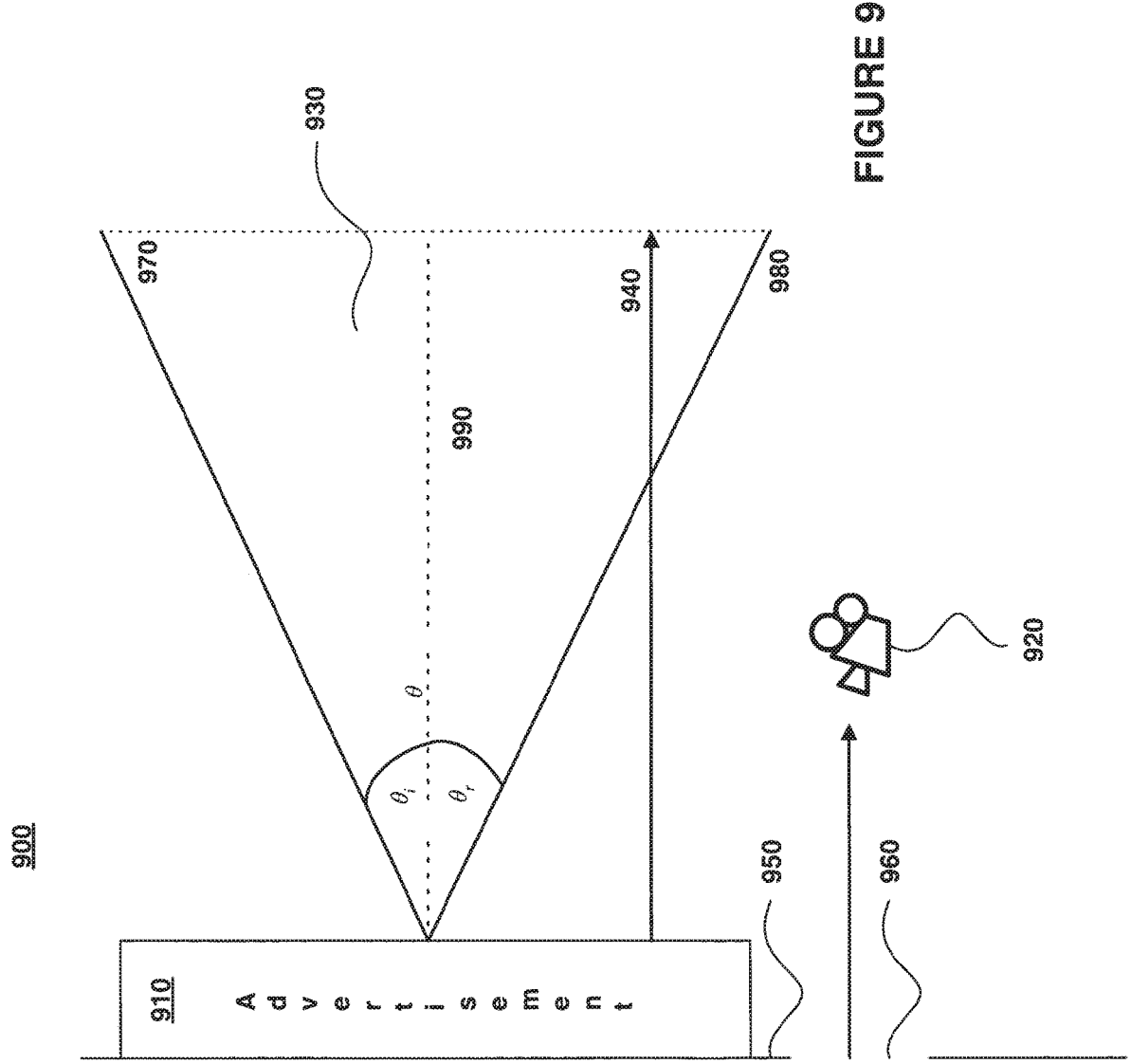
FIG. 9 illustrates a positional relationship between a game character and an advertisement, in one embodiment in accordance with the present invention.

FIG. 9 illustrates a positional relationship between a game character 920 and an advertisement 910 in a game environment 900, in one embodiment in accordance with the present invention. In FIG. 9, advertisement 910 is located at a predetermined position in the game environment 900. This positioning may be along a wall 950 in the game environment 900. For example, advertisement 910 may be a poster advertising an upcoming concert, advertisement 910 having been pushed into the game environment 900 by various components of the in-game advertising system 100 (FIG. 1) (e.g., via asset tagging, whereby the relevance or 'freshness' of the advertisement 910 can be continually updated after the initial release of the game). In the present example, the advertisement 910 (poster) may be positioned on the wall 950 of, for example, a record store in the game environment 900.

The game character 920 may enter this particular portion of the game environment 900 (the record store) through, for example, an entryway 960. As can be seen in FIG. 9, the game character 920, upon initial entry into the game environment 900, may be standing directly adjacent to and oriented toward the advertisement 910. Due to the positioning of the game character 920 relative the advertisement 910, however, the game character may not be able to actually see or be exposed to the advertisement 910 regardless of the orientation of the game character 920 in the general direction of the poster (advertisement 910).

The game character's 920 inability to view the advertisement 910 in FIG. 9 is a result of the game character 920 being outside an impression area 930 defined, in part, by a combination of a first angle $\theta_i$ and a second angle $\theta_r$ relative to a surface vector 940. The first angle $\theta_i$ is the angle measured from a ray 970 to the surface normal 990 ($\theta$) wherein normal incidence is an angle of zero. The second angle $\theta_r$ is the angle measured from a ray 980 to the surface normal 990. The second angle $\theta_r$, at least with regard to isotropic surface, is identical to the first angle $\theta_i$ (i.e., $\theta_i=\theta_r$). In FIG. 9, the first angle $\theta_i$ and the second angle $\theta_r$ each have an angle of about 30° relative the surface normal 990.

The surface vector 940 comprising a unit length (e.g., a distance from the advertisement) further defines the impression area 930 for a predetermined distance from the surface of the advertisement 910. The surface vector 940 relative the advertisement 910 is defined, for example, as being 20 feet. Absent any obstructions in the impression area 930, if the game character 920 is within 20 feet of the advertisement 910 and within the angles defined by first ray 970 and second ray 980 (i.e., +/−30° relative the surface normal 990), then the game character 920 is within the impression area 930.

A user controlling the game character 920 within the impression area and facing the advertisement 910 will be able to view the advertisement 910. That is, an impression will be established for the advertisement 910 as would normally occur in the real world (e.g., while the user is standing in front of a billboard). Alternatively, if the game character 920 is not within the impression area 930 as defined by first ray 970, second ray 980 and surface vector 940, then no impression is generated.

Figure 10:
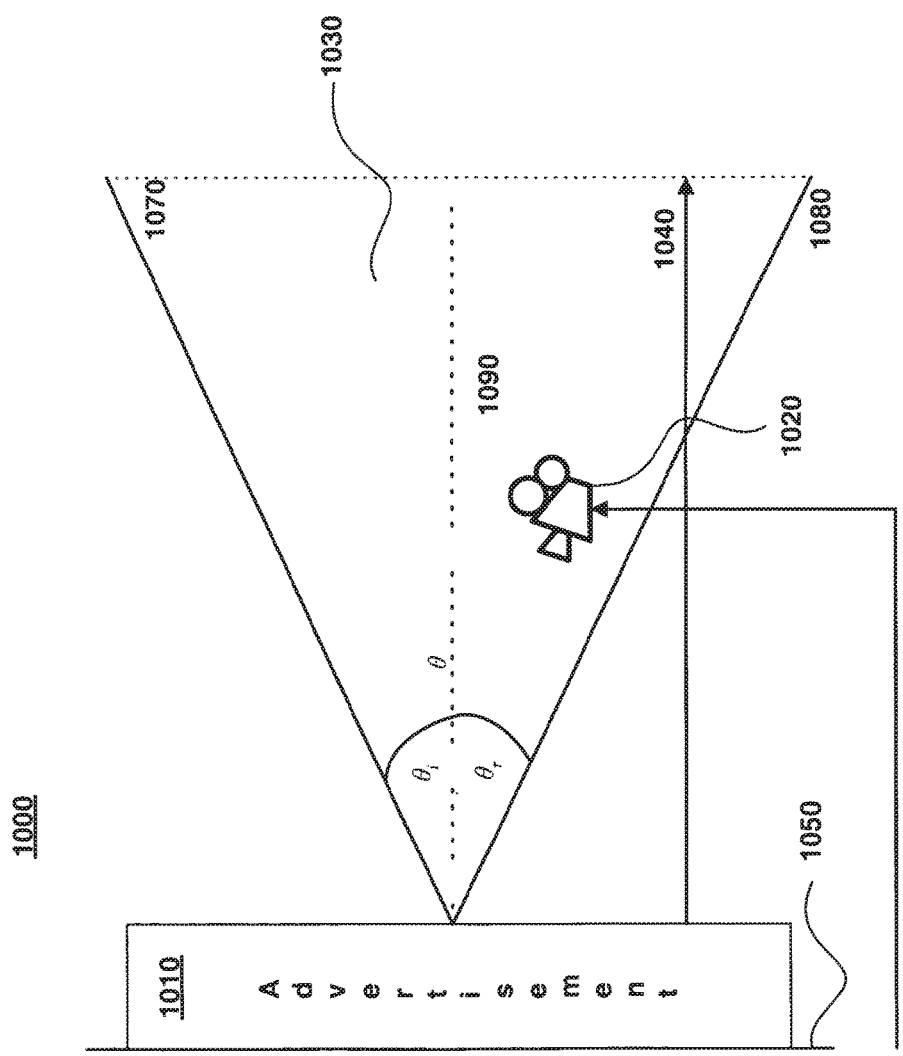
FIG. 10 illustrates a second positional relationship between a game character and an advertisement, in one embodiment in accordance with the present invention.

FIG. 10 illustrates a second positional relationship between a game character 1020 and an advertisement 1010 in a game environment 1000, in one embodiment in accordance with the present invention. The game environment 1000 of FIG. 10 is similar to that illustrated in FIG. 9 with the exception of the position of game character 1020. In FIG. 10, game character 1020 is positioned directly in front of and exposed to the advertisement 1010.

An impression area 1030 is defined in a manner similar to that of FIG. 9. That is, a first ray 1070 and a second ray 1080 relative surface normal 1090 in conjunction with surface vector/distance 1040. Because game character 1030 is located within the impression area 1030 of the advertisement 1010, an advertising impression is generated.

Figure 11A:
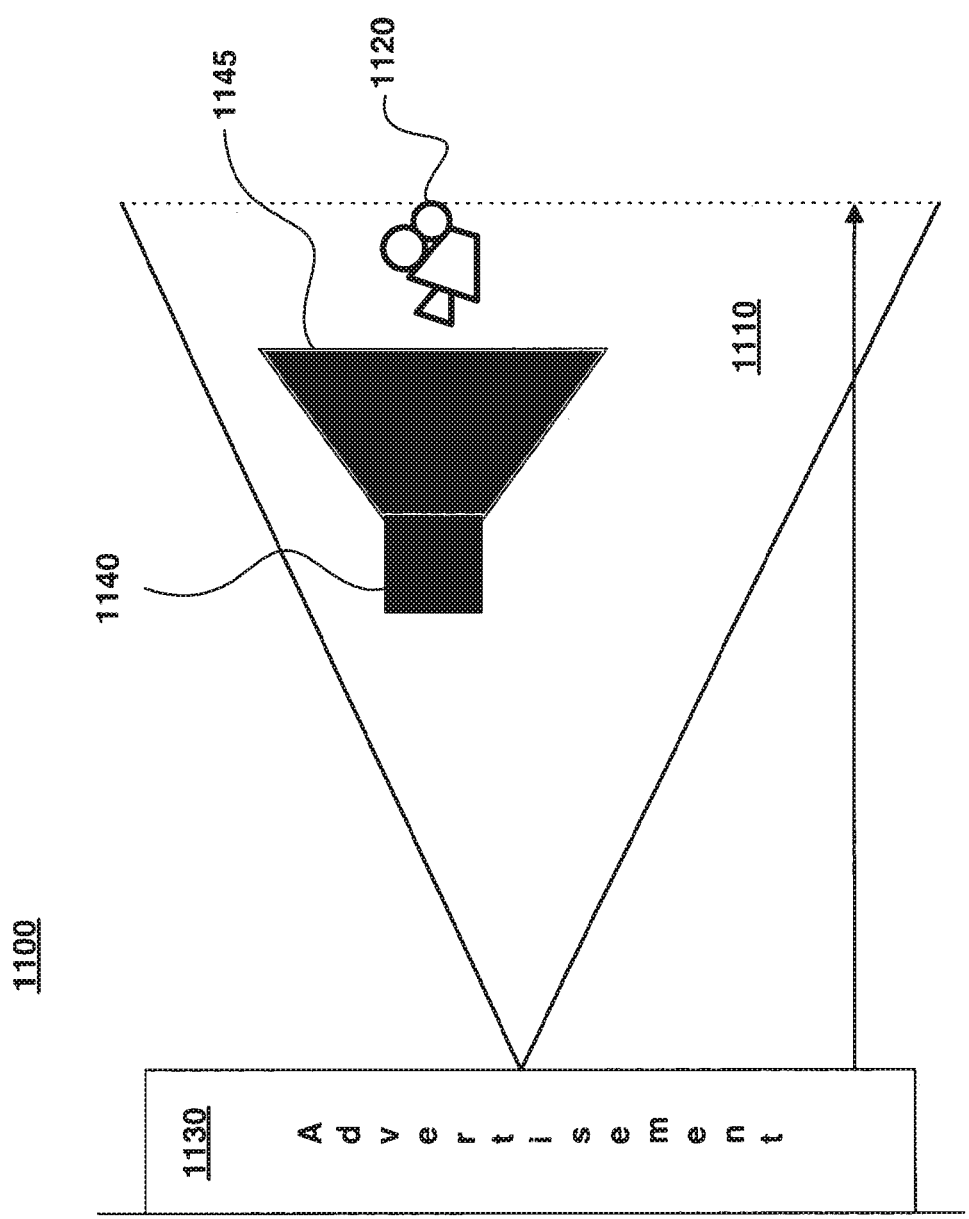
FIGS. 11A and 11B illustrate two positional relationships between a game character and an advertisement relative obstacles in an impression area, in one embodiment in accordance with the present invention.

FIG. 11A illustrates a positional relationship between a game character 1120 and an advertisement 1130 relative an obstacle 1140 in an impression area 1110 in a game environment 1100, in one embodiment in accordance with the present invention. The impression area 1110 of the game environment 1100 is defined in a manner similar to that of FIGS. 9 and 10 (e.g., a first and second ray relative a surface normal with a predetermined distance relative the advertisement 1130). Game character 1120 is positioned within the impression area 1110 and the orientation of the line-of-sight of the game character 1120 is toward the advertisement 1130. The line-of-sight from the game character 1120 to the advertisement 1130 is, however, at least partially obscured by the obstacle 1140 within an obstructed area 1145.

With the increased graphic complexity of many video games, placement of objects about a game environment increasingly provides a challenge to creating advertising impressions. For example, in FIG. 11A, due to the position of the game character 1120 relative the obstacle 1140, the game character 1120 cannot view the advertisement 1130. Therefore, no advertising impression is made to the user controlling the game character 1120.

Figure 12:
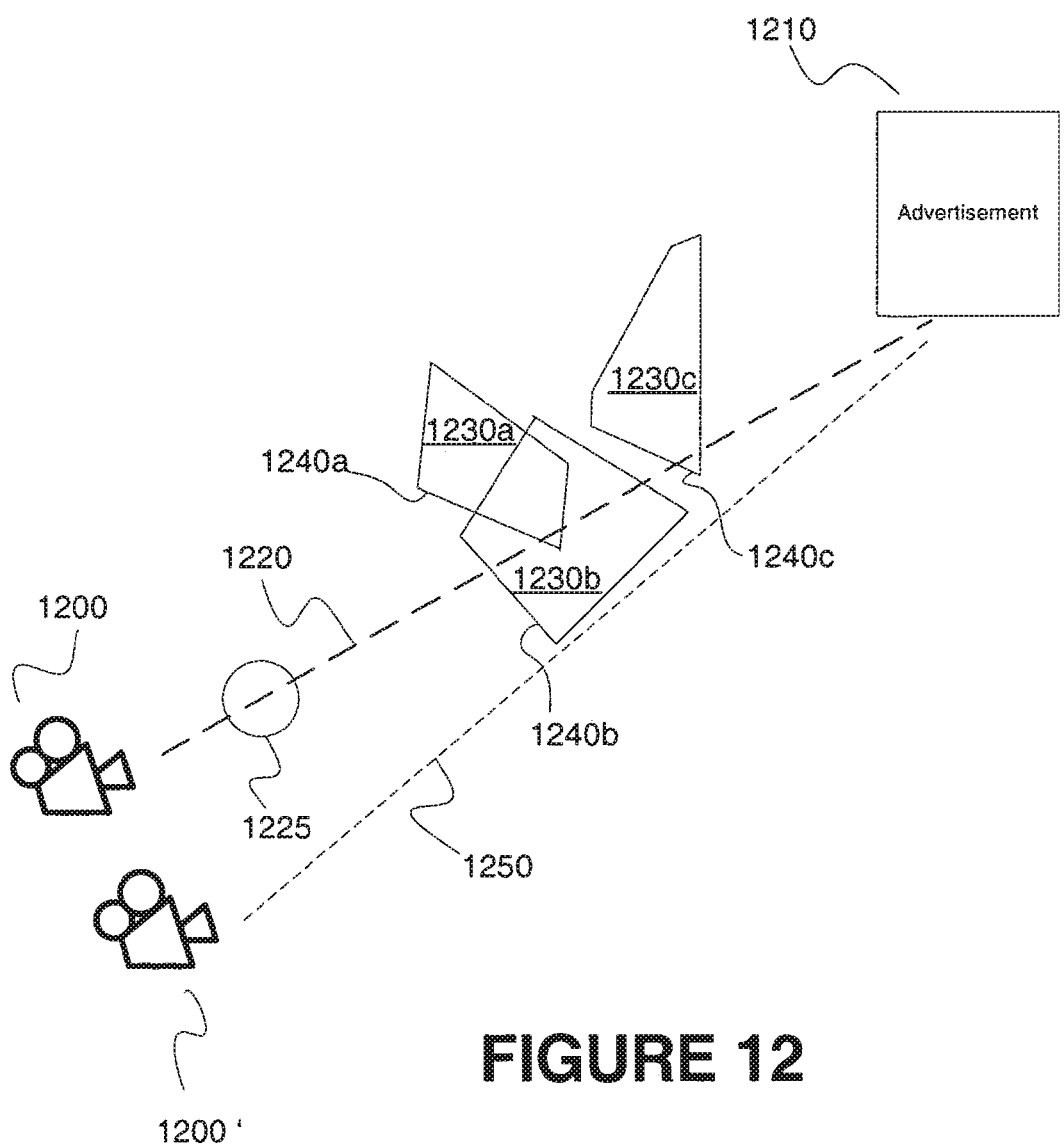
FIG. 12 illustrates an exemplary line-of-sight determination methodology to be used in determining the occurrence of an advertising impression, in one embodiment in accordance with the present invention.

Determining whether a game character falls within an obstructed area can be accomplished by using line-of-sight determination. In FIG. 12, obstructed line-of-sight 1220 is shown between game character 1200 and advertisement 1210, in one embodiment in accordance with the present invention. FIG. 12 also shows unobstructed line-of-sight 1250 between game character 1200 at a different position relative advertisement 1210. The determination of obstruction may be established by testing line-of-sight 1220 (or 1250) between game character 1200 (1200') and advertisement 1210 that passes through a center of obstruction probe 1225.

In some embodiments, obstruction probe 1225 is a spherical object with a predetermined radius r. Obstruction probe 1225 travels along the line of sight 1220 (or 1250) between game character 1200 (1200') and advertisement 1210. If obstruction probe 1225 does not collide with any obstacles, then the line-of-sight between game character 1200 (1200') and advertisement 1210 is unobstructed. If game character 1200 is located in an impression area and oriented toward the advertisement 1210, an impression of the advertisement 1210 is generated. Unobstructed line-of-sight 1250 illustrates the absence of object obstruction between game character 1200' and advertisement 1210, which allows for an advertising impression.

Alternatively, line-of-sight 1220 is obstructed as a result of one or more objects 1230A . . . 1230C, preventing an advertising impression. If the obstruction probe 1225, while traveling along (obstructed) line-of-sight 1220 intersects one or more polygonal sides $1240_a$ . . . $1240_c$ of one or more objects $1230_c$ . . . $1230_c$ where each of one or more objects $1230_a$ . . . $1230_c$ is typically constructed from multiple polygonal sides $1240_a$ . . . $1240_c$, then an unobstructed view of the advertisement 1210 relative the game character 1200 is not possible and no advertising impression is generated notwithstanding the presence of the game character 1200 in an impression area. Such a scenario—an obstructed line-of-sight and absence of an advertising impression despite being in an impression area—is illustrated in the aforementioned FIG. 11A.

In some embodiments of the present invention, partial viewing of and exposure to an advertisement may be sufficient to establish an advertising impression. For example, certain trademarks or logos have established a certain degree of notoriety within the purchasing public. For these famous or easily recognizable trademarks or logos, viewing even a portion of the trademark or logo may be sufficient to establish an advertising impression. Similar 'partial viewing impressions' may be acceptable with regard to slogans, celebrities, famous spokespersons, and so forth. In these instances, even though the obstruction probe 1225 may intersect with an object, if the intersection involves only a small percentage of the probe 1225, then a partial impression may be generated. If the object obscures the advertisement in its entirety—100% of the probe 1225 intersects with the object—then no impression is generated.

The radius r of the obstruction probe 1225 may be reduced whereby a collision with a polygonal sides $1240_a$ . . . $1240_c$ of one or more objects $1230_a$ . . . $1230_c$ may be avoided thus allowing for an unobstructed line-of-sight and, subject to presence in an impression area, establishing an advertising impression. In that regard, the radius r of obstruction probe 1225 may be relative to an advertisement to be viewed.

Information relative the setting of radius r may be part of advertising data pushed to a video game environment by the advertising server 130.

In some embodiments of the present invention, especially those involving third-person points-of-view, it may be possible to overcome obstructed lines-of-sight in an effort to create an unobstructed line-of-sight. For example, in an in-game advertising system 100 (FIG. 1) where payment of advertisement space is made in advance, an advertiser may seek to have their advertisement viewed at any cost. In these instances, a camera tracking the game character may be adjusted to provide an unobstructed line-of-sight to allow for viewing of the advertisement and creating an ad impression. Exemplary systems and methods for providing an unobstructed view of an advertisement or other target are disclosed in U.S. patent application Ser. No. 10/268,495, which has previously been incorporated by reference.

Figure 11B:
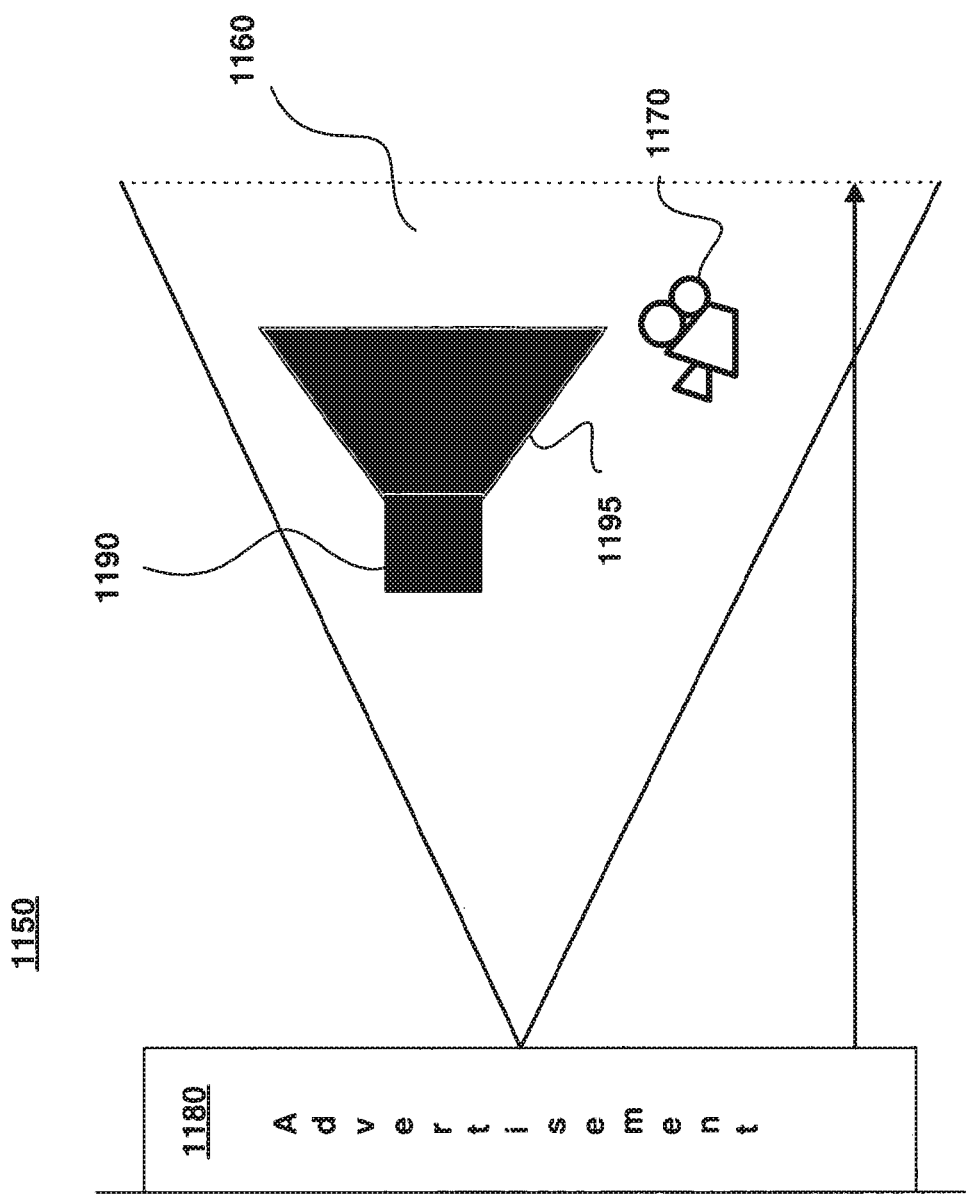

FIG. 11B illustrates a positional relationship between a game character 1170 and an advertisement 1180 relative an obstacle 1190 in an impression area 1160 of a game environment 1150. The impression area 1160 of the game environment 1150 and relative the advertisement 1180 is defined in a manner similar to that of FIGS. 9 and 10 (e.g., a first and second angle relative a surface normal combined with a surface vector). Game character 1170 is positioned within the impression area 1160 but is not in an obstructed area 1195 as would be generated by obstacle 1190 like that described in FIG. 11A. A determination of the lack of an obstruction area 1195 or the game character 1170 not being positioned in an obstruction area 1195 is determined in a manner similar to that as described in FIG. 12. In that regard, an obstruction probe traverses a line-of-sight between the game character 1170 and the advertisement 1180 and does not intersect with a polygonal side of an object. The lack of intersection thus indicates the presence of an unobstructed line-of-sight and the establishment of an advertisement impression resulting from game character's 1170 exposure to the advertisement.

Figure 13A:
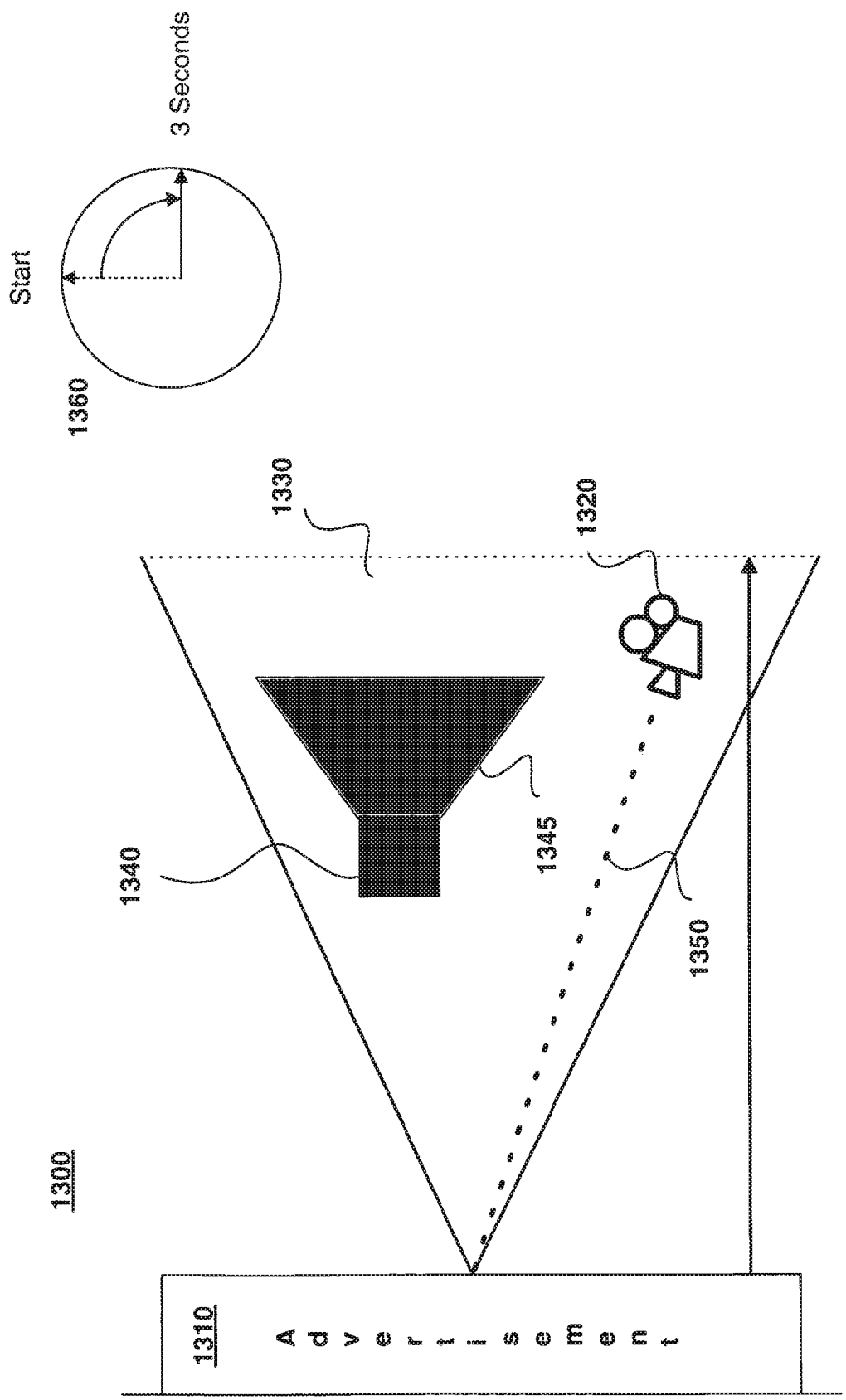
FIGS. 13A-13B illustrates the correlation between an impression counter and a positional relationship of a game character and an advertisement, in one embodiment in accordance with the present invention.

FIG. 13A illustrates the correlation between an impression counter 1360 and the position of a game character 1320 relative an advertisement 1310 in a game environment 1300. Impression counter 1360 measures the time period that the game character 1320 is positioned in impression area 1330 with an unobstructed line-of-sight 1350 relative the advertisement 1310. As can be seen in FIG. 13A, game character 1320 has an unobstructed line-of-sight 1350 of and exposure to advertisement 1310 notwithstanding the presence of object 1340 and obstructed area 1345.

It should be noted that impression counter 1360 is not necessarily a stopwatch or other timing device as depicted in FIG. 13A. Impression counter 1360, in an embodiment of the present invention, is any timing mechanism governed by hardware or software relative an end-user client device 170 (e.g., a gaming console) that may measure the time period that the game character 1320 is positioned in the impression area 1330 with an unobstructed line-of-sight 1350 relative the advertisement 1310 and may utilize various units and/or measurement schemes. In one embodiment, a temporal period is used as a unit of measure (e.g., seconds, fractions of seconds and so forth).

Figure 13B:
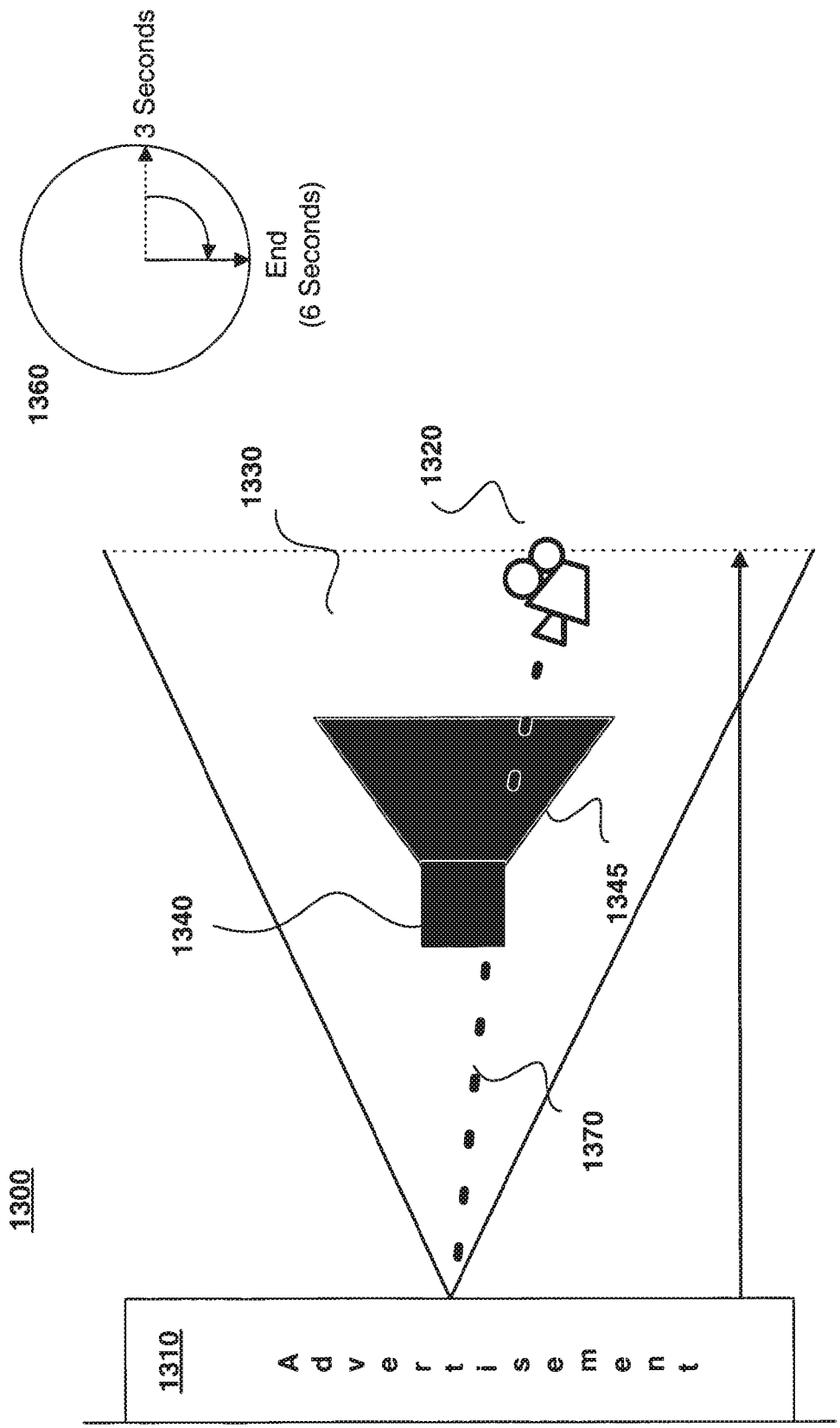

FIG. 13B further illustrates the correlation between an impression counter 1360 and the position of a game character 1320 relative an advertisement 1310 in a game environment 1300. In FIG. 13B, however, the game character 1320 has moved behind the object 1340 and into the obstructed area 1345. Notwithstanding the fact that the game character 1320 remains within the impression area 1330, the game character 1320 has an obstructed line-of-sight 1370 relative advertisement 1310. When the line-of-sight of the game character 1320 relative the advertisement 1310 becomes obstructed (as is reflected in FIG. 13B), the impression counter 1360 terminates. That is, an impression of the advertisement 1310 is no longer being generated as the advertisement 1310 has been obstructed from the game character's 1320 view.

By measuring the length of exposure to an advertisement via impression counter 1360, an advertiser can determine the value of an ad impression or whether an impression has actually been made if the existence of an impression is tied to the duration of presence in the ad impression area (e.g., the time of exposure to the advertisement). For example, a pricing model may be established wherein an advertiser is charged based on the duration of the advertisement impression. The duration of the advertisement impression is reflected by the impression counter 1360. In another pricing model, an advertiser may pay a fee for a certain number of advertisement impressions. An ad impression may be defined as unobstructed exposure to an advertisement for a certain period of time. For example, and as evidenced in FIG. 13B, the game character 1320 is in the defined impression area 1330 but is unable to actually view the advertisement 1310. As such, the advertiser should not have the presence of the game character 1320 in the impression area 1330 with no view of the actual advertisement 1310 constitute an advertisement impression.

The various ad impression determinations may be implemented utilizing software downloads as discussed in the context of FIG. 2 or through software installed on physical media (e.g. a software client on an optical disk) or may be pre-installed in a gaming device. Various modules that interact with the ad impression determination software (e.g., receiving ad impression information for reporting to an advertiser) may be further located in various other aspects of system 100 (e.g., at ad server 130).

As noted, various pricing models may be based upon the existence of advertising impressions or the quality thereof. For example, an advertiser may be satisfied knowing that their advertising content has made it into a video game. Another advertiser may be more demanding and require information related to actual impressions. Using the methodology described in FIG. 12 with regard to determining the existence of unobstructed lines-of-sight it may be determined whether the user actually viewed the advertisement.

Even more specific, it may be determined how long the user viewed the advertisement. For example, if a user is merely scanning around the room for an exit or a particular object, their line-of-sight may intersect with the advertisement but the scanning of the room was too quick to allow for any meaningful consideration or understanding of what the advertisement portrayed. In this scenario, a timer may be implemented as was described in FIGS. 13A and 13B.

On an even more detailed level, it may be possible to determine the quality of the impression. For example, a user may view an advertisement as a result of being in an impression area. That user may, however, be on the very far edge of the impression area and have slight difficulty viewing the advertisement. This might be the case if a user is utilizing a later model television or computer monitor or is utilizing a computing device that has lower graphics processing power. Notwithstanding graphics output considerations, it is possible to further delineate the impression area into quality impression areas whereby the advertisement is viewed in every instance but better or worse depending on the exact placement of the game character when viewing the advertisement.

A game character may be face-to-face with an advertisement. The character, while clearly within the impression area, may be so close to the advertisement that he cannot fully view the advertisement or the copy that he can view is blurred because of the close proximity of the character relative the advertisement in the gaming environment. Similarly, a user may be too far away to fully appreciate the advertisement. Through delineating quality impressions, advertisers can appreciate a minimal impression (e.g., up close or almost too far away) but also have certain assurances with regard to quality impressions as may be subject to the particular whims of the advertiser.

Various pricing schemes may be based upon these various levels or quality of impression whereby a general impression is charged at one rate while a higher quality impression is charged at a different rate. Similarly, the length of time a user is in an impression area can be correlated to a pricing model. For example, if a user is in an impression area for 2-seconds, an impression may have been made but possibly a minimal one due to the complexity of the advertisement. If the user is in the impression area for 10-seconds, a greater impression has been made and has greater value to the advertiser. Limits may be imposed on such an impression counter such that an advertiser is not charged for a 30-minute impression when a user happens to position his game character in front of an advertisement and then leave to attend to another task for half-an-hour. Notwithstanding the presence in the impression area for that period of time, a thirty-minute impression has not truly been made as the user of the game (the controller of the character) has not been subjected to that advertising copy.

Traditional economic aspects of supply and demand may also come into play with various pricing models. For example, if a game is released with great fanfare and is a 'must buy for the holiday season,' ad buys in the game may be more expensive. If the game layer proves to be unpopular for a variety of reasons, the pricing levels may decrease to reflect the demand of the game. These determinations as to supply and demand may be made, in part, based on the location and intrinsic value definition of specific tags, the demand for a tag as driven by the number of times tagged assets in a video game are identified during average, peak and off-peak game play thereby resulting in various requests to the advertising server 130, which may be counted as have been previously described in the context of FIG. 2.

Similarly, certain video games may have indicia identifying a distinct owner as a result of a user profile or information embedded on the game or subject to, for example, a network address. An advertiser may also determine that while 1,000 impressions may have occurred for their advertisement on a particular day that almost half of those were related to a small group of users who continually entered a gaming environment where the advertisement was rendered time-and-again versus 1,000 impressions distributed more equally amongst 800 different, unique game players. The impressions in the latter example are more valuable then the repeated impressions amongst a small group of users in the first example.

Certain embodiments of the exemplary in-game advertising system 100 described in the present invention may also allow for certain interactions with the products advertised in a video game. For example, a game player might approach a vending machine whereby a variety of beverages are available and effectively advertised via their labeling, trademarks or other visual indicia. A user might select a particular beverage for his character to enjoy in the course of the video game by pressing a button on his keypad that corresponds to purchasing a particular beverage from the vending machine. These 'virtual purchases' may be conveyed to advertisers in that the advertisement has not only made an advertising impression in that a user has seen the product or related advertising but taken some sort of positive interaction with the product (e.g., purchasing the product in the video game).

Similar game metrics may be implemented with regard to negative connotations. For example, if four beverages are available, the user's selection of one beverage may reflect negatively as to the other three. By further example, a user may be presented with a vending machine for two competing beverages; if the user takes some action relative one of the vending machines (e.g., destroying it with a weapon), that act too may reflect negatively relative advertising metric information.

Through tracking user interactions with advertisements in a video game environment, the video game effectively becomes a user feedback service similar to an advertising focus group. Feedback may also be registered through explicit interactions wherein a user may expressly provide their opinion of a product or service relative the game environment. For example, the user may be prompted as to their opinion of a particular product; the user may then press 'up' for a positive reflection or 'down' for a negative reflection.

Interactions via, for example, a microphone input are also possible wherein the user provides feedback in connection with the advertisement. Such feedback may be transmitted to an agent on the other end of the communication channel or passed through speech recognition software wherein certain keywords as they relate to a product are recognized and categorized.

To address the feedback features, the impression tracking system may include functions or may interact with functions capable of soliciting or recording user reaction to an advertising campaign. For example, an advertiser may deploy an advertising campaign defined by advertising content that is loaded into a tag with program or pointer to program(s). Such programs may signal the user to perform actions. Other programs may monitor user reaction in and about the advertisement or in response thereto. For example, one such program that may be invoked when accessing a loaded advertisement tag includes a reference to a speech input requirements and definitions.

Advertising beyond the traditional flat, print advertisement may also be implemented utilizing the presently described in-game advertising system 100. For example, in addition to billboards or single page ad copy, rotating billboards may be utilized wherein triangular panels in the billboard rotate relative to one another thereby effectively providing three-billboards-in-one. The billboard panels then rotate every few seconds to reflect a new advertisement on each panel as occurs in the real-world. In this way, a single game asset can be tagged for multiple advertisement introductions.

Other ads in a game environment may be movable. For example, advertisements may be located on the sides of buses that traverse city streets or a series of flyers that might blow down an alley. Television ads with full motion video and audio ads as might be emitted over a radio or a telephone in a gaming environment are also envisioned as being implemented in the present invention.

Just as certain advertisements have higher demand in the real-world (e.g., high traffic areas), certain advertisements in a video game environment may enjoy higher pricing as a result of high traffic areas. For example, advertisements that appear in the beginning of a video game or a level wherein every user will view the advertisement inherently have more value than an advertisement located in a 'secret Easter Egg' level or extremely difficult level that many users may never reach.

Other embodiments of the present invention may include rewards based on user interaction with particular advertisements. For example, if a user provides actual feedback in a video game environment, the user may receive merchandise, points or coupon rewards from the producer of the product as an appreciation for their opinion. Such information concerning where to send a reward may be expressly provided during a feedback session or as a result of an association with a user profile. This latter case would be valuable wherein points or rewards are offered for less explicit interactions (e.g., not in response to an advertiser/feedback query) such as casual interactions or favorable behavior relative an advertised product and points or rewards accumulate over time.

Advertisements, especially those ads that are audible in nature or are full motion video, may be subject to real-time limitations. For example, a user in a video game may be changing the channels of a television in the video game environment. If the user only watches two seconds of the advertisement, an impression may or may not be generated. Such limitations in the case of real-time advertising may be subject not only to an impression area but also an impression time and even an impression time relative particular portions of the advertisement.

For example, an advertisement may be thirty-seconds in length but the first five-seconds do not indicate the nature of the product and the last five-seconds concern legal boilerplate required by the particular advertisement. If an impression time is identified as five-seconds, watching the first or last five-seconds of this particular advertisement would technically constitute an impression notwithstanding the fact that the user knows nothing more about the product after those five-seconds than he did prior. In these cases, limitations as to impressions of particular portions of an advertisement may be implemented. For example, for an advertiser to consider there to have been an impression, the user must not only view five-seconds of the advertisement but those five-seconds must be within the middle 20-seconds of the 30-second advertisement.

Video or audio ads may also be subject to start-stop loops. That is, the advertisement starts when the user accesses the advertisement (e.g., tunes to a radio station playing the advertisement) and then stops when the user leaves the advertisement (e.g., changes the radio to another station). If the user then changes back to the original station with the advertisement, the ad may commence where it left off as if no time has passed. Such a methodology better ensures an impression but does so at the risk compromising reality (i.e., real-time passage of time is not in effect). The tag object may track the state of the advertisement impression, such as the index into the location in a video file to start the next sequence for the one or more tags associated with the advertising video loop.

Video games, radios and televisions that offer the user the ability to change channels may be associated with features to track multiple advertisement impressions and campaigns. When a user changes a channel or directs a virtual character in the game environment to change a channel, new advertisements may be provided. Such advertisement changes may be transitioned with white noise or a familiar blur associated with changing a channel according to the nature of the device. Radio or television devices may be configured with channels that access both traditional programming, advertisement content or other content. Other content may include chat wherein the device facilitates communications. Other content may also include other information in connection with the game. Generally, the mixing of advertisement and other content in such devices may have the benefit of catalyzing user exposure to advertisements since the use of the device and changing of the channels may be necessary to facilitate game play.

Other advertisements may be rendered or emitted in true real-time. For example, if a television advertisement in a video game is two minutes in length and the user changes the channel in the video game after thirty-seconds of viewing the advertisement but comes back to the same channel thirty-seconds later, the advertisement will now be at the 60 second point and not the 30 second point as in a start-stop embodiment.

While real-time advertisements may be more realistic, ensuring an impression becomes more difficult relative the portion of the advertisement the user viewed as has been previously noted. Certain impression, especially in the real-time video and audio sense, may be subject to ongoing impression limitations. For example, an impression may constitute viewing 30 seconds of a one minute advertisement. The user may, at one point in the game, view a first 10-seconds of the advertisement, view a second 10-seconds at a different point in the game and view yet another 10-seconds at another point in the game. In this instance, the user—albeit piecemeal—may have viewed enough of the ad over the course of time to constitute an impression.

Other advertisements may limit an impression opportunity to consecutive time or such piecemeal viewing/listening but within an overall time frame. For example, viewing the advertisement in 10-second snippets may suffice as an advertisement but they must occur within 15 minutes of one another. Other advertisements may require the thirty-seconds to occur consecutively or an impression has not been established.

Figure 14:
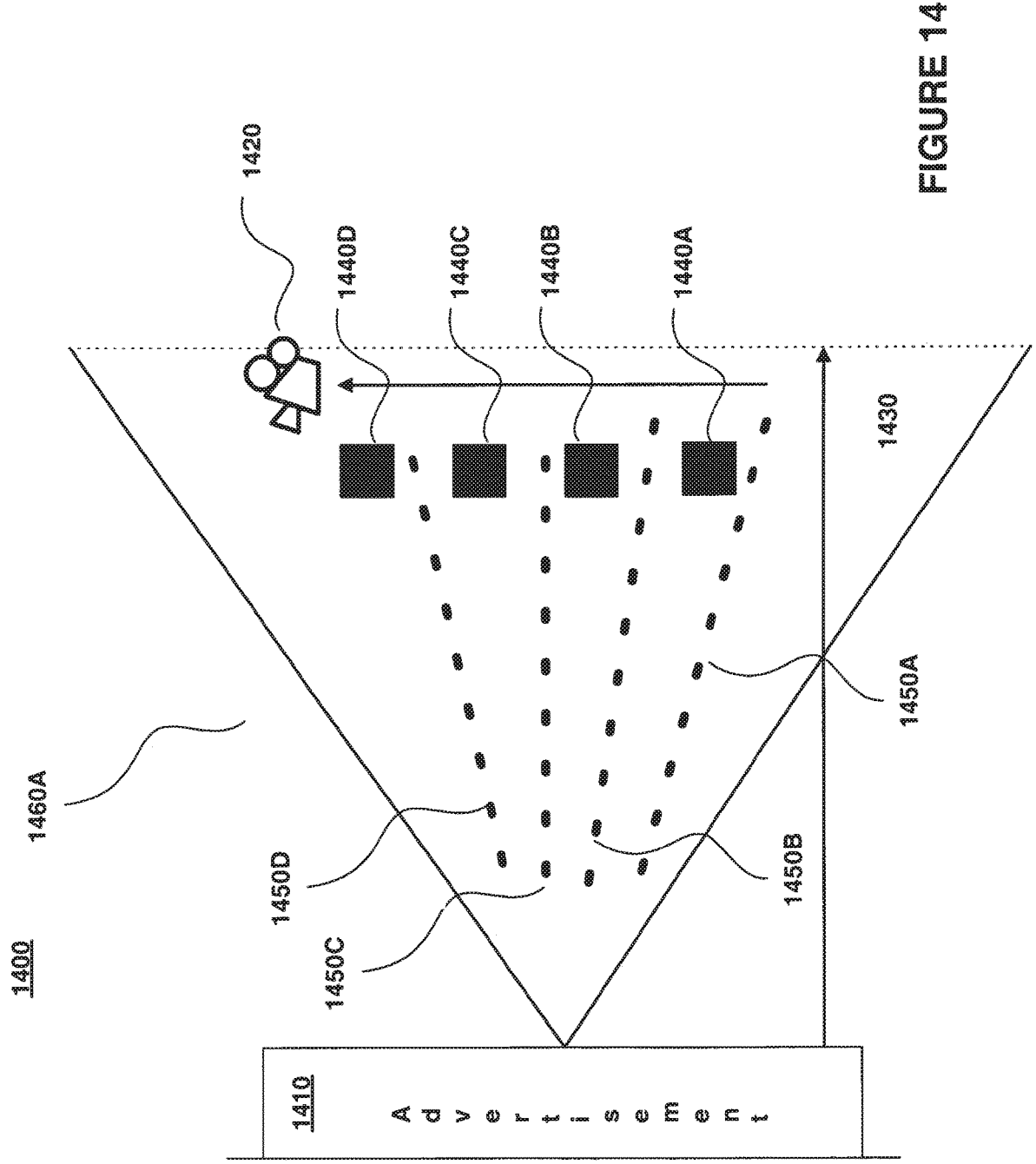
FIG. 14 illustrates an alternative correlation between an impression counter and a positional relationship of a game character and an advertisement, in one embodiment in accordance with the present invention.

Some of these real-time/consecutive impression implications addressed above are reflected in FIG. 14 of the present application. FIG. 14 illustrates the positional relationship of an in-motion game character 1420 relative an advertisement 1410 in an impression area 1430 in a game environment 1400. In FIG. 14, the game character 1420 is positioned in the impression area 1430 of advertisement 1410. The impression area 1430 is also populated with obstacles $1440_A \ldots 1440_D$. As the game character 1420 traverses the game environment 1400, the line-of-sight of the game character changes from an obstructed line-of-sight (as would occur behind obstacles $1440_A \ldots 1440_D$) and an unobstructed line-of-sight $1450_A \ldots 1450_D$. An impression counter (not shown) would move between an on-and-off state as the line-of-sight alternates between obstructed and unobstructed ($1450_A \ldots 1450_D$) lines-of sight.

For example, as the game character 1420 moves past object $1440_A$, the impression counter would begin to measure the existence of an ad impression as provided by unobstructed line-of-sight $1450_A$. As the game character passes behind object $1440_a$, the impression counter would stop measuring the existence of an advertisement impression as a result of now obstructed line-of-sight. Once the game character 1420 emerges from behind object $1440_a$, an unobstructed line-of-sight ($1450_B$) once again exists and the impression counter again would begin to measure the existence of an advertisement impression from the stop point of the previous impression. The measurement of an advertisement impression would continue in a similar fashion as the game character 1420 passes in between remaining objects 1440$_B$ ... 1440$_D$.

In the present embodiment, as the impression counter starts-and-stops, any one segment of time correlating to an advertisement impression may not constitute a single advertisement impression. The ongoing exposure to the advertisement 1410, albeit in an interrupted fashion, may over the course of time constitute an ad impression. For example, by the impression counter reaching a certain time period (e.g., from start point to a point three seconds in time later), this time period may (as a whole) constitute an ad impression. Such a measurement methodology would be desirous in instances where a game character passes by, for example, a number of pillars; a rod iron fence, a series of windows, or a crowded room.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

For example, the embedded advertising 'tags' as described in the present invention may be further applied to digital video and audio signals—television and audio broadcasts, for example—as well as movies filmed in a digital format whereby advertisements or other content may be inserted into previously generated audio and/or video content. On-line media such as on-line magazines, newspapers and blogs may also benefit from the implementation of tagging advertising assets (e.g., particular column inches or steaming news broadcasts) as present-day advertising methodologies such as pop-ads become less effective and/or less popular. Advertising content may be offered by network and/or content providers (e.g., cable providers) whereby advertising content is offered on-demand.

Additionally, the various impression area and occlusion concepts disclosed herein may be applied to audio advertisements or other audible emissions. For example, a radio or other audio emitting object may be defined, in part, by an impression area. Such an impression area would be determined in a manner similar to an impression area as it concerns a visual advertisement. An impression area in the context of audio would be representative of where an audio advertisement or other audio emission may be heard by the character in a game environment as the volume of the audio emission decreases as the character moves further away from the advertisement in three-dimensional space or if the character is located behind an object in which case the occlusion determination concepts become applicable (e.g., does a wall separate the character and the audio signal). The quality of audio impressions may also be determined in a manner similar to quality determinations with visual advertisements with regard to not only distance but the extent to which an intermediate object might absorb the sound, for example, a pane of soundproof glass versus a thinly constructed wall.

The asset tagged to receive an advertisement may be movable and rotatable and may be programmed to dynamically orientate towards the user camera as the user manipulates around the game environment. Ad campaigns may be interleaved with special programming. Special programming may influence ad campaigns, variables in the tags relating to the ad campaigns, or may relate to the game environment. Special programming may influence (e.g., terminate or replace) an ad campaign or modify variables or functions contained in an ad campaign or tag. Special programming may accommodate for dynamic reconfiguration and reuse of an advertising asset. For example, special programming ay be used to communicate special messages, game messages, forum messages, facilitate chat and so forth. Special programming may also be used to transfer control of the advertising asset to the game environment so that the advertising real estate can be used to convey game information and other information.

Notwithstanding the providing of detailed descriptions of exemplary embodiments, it is to be understood that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, method, process, or manner.

What is claimed is:

1. A method for rendering content within an environment, the method comprising:
   defining one or more content areas each at a respective location within an environment associated with a user;
   storing information in memory that associates each of the defined content areas with a respective digital content file; and
   executing instructions stored in memory, wherein execution of the instructions by a processor:
      identifies a location of a user perspective within the environment;
      monitors controls by the user of the identified user perspective to identify at least one line-of-sight path;
      identifies at least one of the content areas along the line-of-sight path, wherein the line-of-sight path is at least partially unobstructed;
      renders the digital content file associated with the identified content area;
      tracks user interaction with the rendered digital content file; and
      updates a display of the rendered digital content file based on the tracked user interaction.

2. The method of claim 1, wherein the digital content file is rendered at a location of the defined content area.

3. The method of claim 1, further comprising updating the stored information to replace the digital content file associated with the identified content area with a different digital content file.

4. The method of claim 3, wherein replacing the associated digital content file is based on the monitored controls.

5. The method of claim 3, wherein replacing the associated digital content file is based on the tracked user interaction.

6. The method of claim 1, further comprising receiving input selecting one of a plurality of different available content channels via an interface, wherein the rendered digital content file is associated with the identified content area based on the content channel selected by the input.

7. The method of claim 1, wherein the digital content file is rendered relative to a surface within the environment.

8. The method of claim 1, wherein tracking the user interactions is further based on speech input detected via a microphone associated with the user.

9. The method of claim 1, wherein the tracked user interactions includes an index of a state of the digital content file, and wherein updating the display of the rendered digital content file is based on the state of the digital content file indicated by the index.

10. A system for rendering content within an environment, the system comprising:
   memory that stores:
      definitions of one or more content areas each at a respective location within an environment associated with a user;
      information associating each of the defined content areas with a respective digital content file;
   a processor that executes instructions stored in the memory, wherein execution of the instructions by the processor:
      identifies a location of a user perspective within the environment,
      monitors controls by the user of the identified user perspective to identify at least one line-of-sight path,
      identifies at least one of the content areas along the line-of-sight path, wherein the line-of-sight path is at least partially unobstructed,
      renders the digital content file associated with the identified content area, and
      tracks user interaction with the rendered digital content file; and
   a screen that displays the rendered digital content file, wherein the display of the rendered digital content file is subsequently updated by the processor based on the tracked user interaction.

11. The system of claim 10, wherein the digital content is rendered at a location of the defined content area.

12. The system of claim 10, wherein the processor updates the stored information to replace the digital content file associated with the identified content area with a different digital content file.

13. The system of claim 12, wherein the processor replaces the associated digital content file based on the monitored controls.

14. The system of claim 12, wherein the processor replaces the associated digital content file based on the tracked user interaction.

15. The system of claim 10, further comprising a user interface that receives input selecting one of a plurality of different available content channels via an interface, wherein the rendered digital content is associated with the identified content area based on the content channel selected by the input.

16. The system of claim 10, wherein the digital content file is rendered relative to a surface within the environment.

17. The system of claim 10, further comprising a microphone associated with the user, wherein the processor tracks the user interactions is further based on speech input detected via the microphone.

18. The system of claim 10, wherein the tracked user interactions includes an index of a state of the digital content file, and wherein the processor updates the display of the rendered digital content file based on the state of the digital content file indicated by the index.

19. A non-transitory computer-readable storage medium, having embodied thereon a program executable by a processor to perform a method for rendering content within an environment, the method comprising:
   defining one or more content areas each at a respective location within an environment associated with a user;
   storing information in memory that associates each of the defined content areas with a respective digital content file;
   identifying a location of a user perspective within the environment;
   monitoring controls by the user of the identified user perspective to identify at least one line-of-sight path;
   identifying at least one of the content areas along the line-of-sight path, wherein the line-of-sight path is at least partially unobstructed;
   rendering the digital content file associated with the identified content area;
   tracking user interaction with the rendered digital content file; and
   updating a display of the rendered digital content file based on the tracked user interaction.

* * * * *